United States Patent
Lim et al.

(10) Patent No.: US 7,471,830 B2
(45) Date of Patent: Dec. 30, 2008

(54) PREPROCESSING DEVICE AND METHOD FOR RECOGNIZING IMAGE CHARACTERS

(75) Inventors: Chae-Whan Lim, Taegukwangyok-shi (KR); Nam-Chul Kim, Taegukwangyok-shi (KR); Ick-Hoon Jang, Kumi-shi (KR); Hwan Kim, Kumi-shi (KR); Jun-Hyo Park, Kyongsan-shi (KR); Chong-Heun Kim, Kyongsangbuk-do (KR); Ki-Taeg Shin, Taegukwangyok-shi (KR); Jeong-Wook Seo, Taegukwangyok-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 799 days.

(21) Appl. No.: 10/798,860

(22) Filed: Mar. 12, 2004

(65) Prior Publication Data

US 2004/0240737 A1 Dec. 2, 2004

(30) Foreign Application Priority Data

Mar. 15, 2003 (KR) .................. 10-2003-0016315

(51) Int. Cl.
*G06K 9/00* (2006.01)
*G06K 9/34* (2006.01)
*G06K 9/36* (2006.01)

(52) U.S. Cl. .................. 382/181; 382/176; 382/290
(58) Field of Classification Search .................. None
See application file for complete search history.

(56) References Cited

U.S. PATENT DOCUMENTS 5,535,013 A 7/1996 Murata
5,809,183 A 9/1998 Serizawa et al.
5,949,916 A * 9/1999 Chun .................. 382/261
5,995,657 A 11/1999 Sunakawa
6,415,064 B1 * 7/2002 Oh .................. 382/289

(Continued)

FOREIGN PATENT DOCUMENTS

JP 08-221512 8/1996

(Continued)

OTHER PUBLICATIONS

Automatic Caption Localization In Compressed Video; Yu Zhong et al.; pp. 385-392.

(Continued)

*Primary Examiner*—Charles Kim
(74) *Attorney, Agent, or Firm*—Roylance, Abrams, Berdo & Goodman, LLP

(57) ABSTRACT

Disclosed is a device and method for recognizing characters in an image. An input part receives the image. A blurring decision part classifies the received image into character blocks and background blocks, calculates an average energy ratio of the character blocks, and compares the average energy ratio with a predetermined threshold to determine whether the received image is blurred. If the received image is not blurred, an image binarization part classifies the received image into character blocks and background blocks, compares pixels in the character blocks with a pixel threshold, binarizes the pixels in the character blocks into a brightness value for a character pixel and a brightness value for a background pixel based on the comparison, and binarizes pixels in the background blocks into the brightness value for a background pixel. A character recognition part recognizes characters in the binarized image.

36 Claims, 59 Drawing Sheets

U.S. PATENT DOCUMENTS

| | | | |
|---|---|---|---|
| 6,449,384 B2* | 9/2002 | Laumeyer et al. | 382/104 |
| 2004/0120598 A1* | 6/2004 | Feng | 382/263 |
| 2004/0252890 A1* | 12/2004 | Lim et al. | 382/191 |

OTHER PUBLICATIONS

Extraction Of Unconstrained Caption Text From General-Purpose Video; David J. Crandall; May 2001; pp. 1-121.

Adaptive, Quadratic Preprocessing Of Document Images For Binarization; San Mo et al.; pp. 992-999.

A Noise-Smoothing Nonlinear Operator For The Preprocessing Of Text And Graphics Images; G Ramponi; pp. 242-245.

A Fast High Precision Algorithm For The Estimation Of Skew Angle Using Moments; George Kapogiannopoulos et al.; pp. 1-5.

Automatic Text Skew Estimation In Document Images; Su Chen et al.; pp. 1153-1156.

Detection Of Text Captions In Compressed Domain Video; Yi Zhang et al.; pp. 201-204.

* cited by examiner $R_\Theta^1$ | $y_4$ | $y_3$ | $y_2$
$y_5$ | $y_0$ | $y_1$
$R_\Theta^2$ | $y_6$ | $y_7$ | $y_8$ $\Theta=0°$ n=1

FIG.28A $R_\Theta^2$ | $y_4$ | $y_3$ | $y_2$
$y_5$ | $y_0$ | $y_1$
$y_6$ | $y_7$ | $y_8$ | $R_\Theta^1$ $\Theta=45°$ n=2

FIG.28B

NURI Telecom CO..LTD.

Yuhwa Securities 8^0 14F
t23-7 Yoido-Dong Younfldeungpo-Gu.
Seoul. Korea.
TEL: +82-2-782-0942
FAX: +82-2-781-0704
E-mail : lowtonce@nuritelecom.com
http://www. nuftelecom. com Chan-Hyun Youn, Ph.D.
Associate Professor
School of Engineering
Information and Communications
University
5W. Hiraam-dong. Yuseong-gu. Daejeon 305-732. KOREA
Tel: '82-42-866-6126 Fax: «82-42-86H1 10
E-mail: chyoun6icu.ac.kr

```
LG Electronics Inc.
  Kyoung - Hyun Cho
Re*«wvh Enpnrrr
   DTVDETT Digiul Srtwruk r»i*pUv R«*4«h IJ
Kumi TV Plant
M2. linp)-ung.dong, Kumi-ol>'. KynungBak ~
Phone: *82-54-470-4566    FAX : .SI-?
Mobile Phone: *82-16-812-fi»¹¹"
,Miiil:ckh215«il,e.com
```

FIG.44B

```
LG Electronics Inc.
  Kyoung - Hyun Cho
Research Engineer
DTVDEPI- Digital iS'dwork Display Roemh Ljt.

Kumi TV Plant
642, Jinpj-ung-dong, Kumj-<il>', KyoungBok 7W3WI Kona
Phone: +82-54-170-4566    FAX : .*S2-54-470-2405
Mobile Phone: *8Z-16-812-63S6
e-Mail]: dth215@1gc.com
```

FIG.44C

PREPROCESSING DEVICE AND METHOD FOR RECOGNIZING IMAGE CHARACTERS

PRIORITY

This application claims priority under 35 U.S.C. § 119 to an application entitled "Preprocessing Device and Method for Recognizing Image Characters" filed in the Korean Intellectual Property Office on Mar. 15, 2003 and assigned Serial No. 2003-16315, the contents of which are incorporated herein by reference.

BACKGROUND OF THE INVENTION

1. Field of the Invention

The present invention relates generally to a device and method for processing an image, and in particular, to a preprocessing device and method for recognizing characters included in an image.

2. Description of the Related Art

Typically, a preprocessing operation is performed in order to recognize image characters. "Preprocessing operation" refers to an operation of processing an image prior to recognition of characters in the image. The image preprocessing operation can include determining whether an input image is appropriate for character recognition, correcting a skew of an object in an input image, properly correcting a size of an input image, and binarizing an input image so that characters in the input image can be recognized.

First, an image received for preprocessing can be an image photographed with a camera. When an object is unfocused or irregularly illuminated during photographing, the photographed image may become blurred. Recognizing characters in such a blurred image reduces the recognition rate. Therefore, it is preferable to determine whether an input image is blurred, prior to recognizing characters in the image. If resolution of the image is too low to recognize characters therein, it is preferable to interrupt a recognition operation and then request a re-input of the image.

Second, a device for recognizing image characters generally recognizes characters included in an image. Because the image is photographed by a camera, an object in the image may be skewed. Therefore, in order to increase the recognition rate, it is preferable to correct a skewed object in the image prior to performing a recognition operation.

Third, a device for recognizing image characters generally recognizes characters from an image. The image is divided into a character region and a background region, and no character is arranged in the background region. For example, assuming that a document subject to character recognition is a business card, an input image becomes an image of the business card. The input image includes a background region outside the business card. In this case, it is possible to improve character recognition performance by extending a size of the image after removing the background region from the image. In addition, typically, a character region is not included in the edges of the business card. Therefore, it is possible to improve recognition performance by searching for a position of a character region in a business card, removing regions other than the character region according to the search results, and then extending the character region by a percentage of the removed regions. Storing such preprocessed image contributes to an increase in memory efficiency.

Fourth, an image is binarized prior to characters in the image being recognized. However, when binarization is performed on the entire photographed image in an irregularly lighted situation, with a shadow thrown thereon, the binarization performance is undesirably deteriorated. In order to improve the binarization performance, it is preferable to classify the image into blocks having a predetermined size and then independently binarize the classified image blocks.

SUMMARY OF THE INVENTION

It is, therefore, an object of the present invention to provide a preprocessing device and method for recognizing image characters.

It is another object of the present invention to provide a preprocessing device and method for determining whether an image subject to character recognition is blurred, prior to recognizing characters in the image.

It is another object of the present invention to provide a device and method for determining whether an image is blurred, by classifying an input image into character blocks and background blocks and analyzing only the character blocks, in an image preprocessing device.

It is further another object of the present invention to provide a device and method for determining whether an image is blurred, by classifying an input image into character blocks and background blocks and analyzing an energy ratio of the character blocks, in an image preprocessing device.

It is yet another object of the present invention to provide a preprocessing device and method for correcting a skew of an object in an image prior to recognizing characters in the image.

It is still another object of the present invention to provide a device and method for correcting a skew of an object in an input image by classifying the image into character blocks and background blocks and calculating a skew of the classified character blocks, in an image preprocessing device.

It is still another object of the present invention to provide a device and method for correcting a skew of an object in an input image by classifying the image into character blocks and background blocks, forming the character blocks into stripes and then calculating a skew angle of the object in the image according to a skew of the stripes, in an image preprocessing device.

It is still another object of the present invention to provide a device and method for correcting a skew of an object in an input image by classifying character blocks prior to binarization, creating candidate stripes by extending the binarized character region, selecting the longest and largest stripe among the generated candidate stripes, and then calculating a skew angle according to a skew of the selected stripe, in an image preprocessing device.

It is still another object of the present invention to provide a device and method for correcting a skew of an object in an input image by classifying character blocks prior to performing binarization, subsampling the binarized character blocks in a horizontal direction, creating candidate stripes by extending the binarized character region, selecting the longest and largest stripe among the created candidate stripes, and then calculating a skew angle according to a skew of the selected stripe, in an image preprocessing device.

It is still another object of the present invention to provide a preprocessing device and method for removing a background region from an image and then extending a character region prior to recognizing characters in the image.

It is still another object of the present invention to provide a device and method for searching for a position of a character region in an image, removing regions outside the character region and then extending the character region, in an image preprocessing device.

It is still another object of the present invention to provide a preprocessing device and method for classifying an image into character blocks and background blocks and then binarizing images of the character blocks prior to recognizing characters in the image.

It is still another object of the present invention to provide a device and method for classifying an image into character blocks and background blocks, growing the classified character blocks to reclassify the character blocks prior to binarization, in an image preprocessing device.

It is still another object of the present invention to provide a device and method for classifying an image into character blocks and background blocks, grouping the classified character blocks with their neighboring blocks to enhance edge components, and separating the character blocks from the grouped blocks prior to binarization of the image, in an image preprocessing device.

It is still another object of the present invention to provide a device and method for classifying an image into character blocks and background blocks, growing the classified character blocks to reclassify the character blocks, grouping the classified character blocks with their neighboring blocks to enhance edge components, and separating the character blocks from the grouped blocks prior to binarization of the image, in an image preprocessing device.

It is still another object of the present invention to provide a device and method for classifying an image into character blocks and background blocks, enhancing edge components of the character blocks using a quadratic filter, and then binarizing pixels of the character blocks and the background blocks, in an image preprocessing device.

It is still another object of the present invention to provide a device and method for classifying an image into character blocks and background blocks, enhancing edge components of the character blocks using an improved quadratic filter, and then binarizing pixels of the character blocks and the background blocks, in an image preprocessing device.

It is still another object of the present invention to provide a preprocessing device and method for determining whether an image to be character-recognized is blurred, and classifying, if the image is not blurred, the image into character blocks and background blocks and then binarizing images of the character blocks, prior to recognizing characters in the image.

It is still another object of the present invention to provide a preprocessing device and method for correcting a skew of an object in an image, classifying the skew-corrected image into character blocks and background blocks and then binarizing images of the character blocks, prior to recognizing characters in the image.

It is still another object of the present invention to provide a preprocessing device and method for removing a background region from an image, extending a character region in the image, classifying an image having the extended character region into character blocks and background blocks, and then binarizing images of the character blocks, prior to recognizing characters in the image.

It is still another object of the present invention to provide a preprocessing device and method for determining whether an image is blurred, and correcting, if the image is not blurred, a skew of an object in the image, classifying the skew-corrected image into character blocks and background blocks, and then binarizing images of the character blocks, prior to recognizing characters in the image.

It is still another object of the present invention to provide a preprocessing device and method for determining whether an image is blurred, and removing, if the image is not blurred, a background region from the image, extending a character region in the image, classifying an image having the extended character region into character blocks and background blocks, and then binarizing images of the character blocks, prior to recognizing characters in the image.

It is still another object of the present invention to provide a preprocessing device and method for correcting a skew of an object in an image, removing a background region from the skew-corrected image, extending a character region in the skew-corrected image, classifying an image having the extended character region into character blocks and background blocks, and then binarizing images of the character blocks, prior to recognizing characters in the image.

It is still another object of the present invention to provide a preprocessing device and method for determining whether an image is blurred, and correcting, if the image is not blurred, a skew of an object in the image, removing a background region from the skew-corrected image, extending a character region in the skew-corrected image, classifying an image having the extended character region into character blocks and background blocks, and then binarizing images of the character blocks, prior to recognizing characters in the image.

It is still another object of the present invention to provide a preprocessing device and method for determining whether an image is blurred, and correcting, if the image is not blurred, a skew of an object in the image, removing a background region from the skew-corrected image, extending a character region in the skew-corrected image, removing noises from an image having the extended character region, classifying the noise-reduced image into character blocks and background blocks, and then binarizing images of the character blocks, prior to recognizing characters in the image.

In accordance with a first aspect of the present invention, there is provided a device for recognizing characters in an image, comprising an input part for receiving the image; a blurring decision part for classifying the received image into character blocks and background blocks, calculating an average energy ratio of the character blocks, and comparing the average energy ratio with a predetermined threshold to determine whether the received image is blurred; an image binarization part for classifying, if the received image is not blurred, the received image into character blocks and background blocks, comparing pixels in the character blocks with a pixel threshold, binarizing the pixels in the character blocks into a brightness value for a character pixel and a brightness value for a background pixel according to the comparison result, and binarizing pixels in the background blocks into the brightness value for a background pixel; and a character recognition part for recognizing characters in the binarized image.

In accordance with a second aspect of the present invention, there is provided a device for recognizing characters in an image, comprising an input part for receiving the image; an object skew correction part for classifying stripes having or exceeding a predetermined length in the received image, calculating direction angles of the classified stripes to measure a skew of an object, determining a skew angle corresponding to the measured skew, and rotating the image by the determined skew angle to correct the skew of the object in the image; an image binarization part for classifying the skew-corrected image into character blocks and background blocks, comparing pixels in the character blocks with a pixel threshold, binarizing the pixels into a brightness value for a character pixel and a brightness value for a background pixel according to the comparison result, and binarizing pixels in the background blocks into the brightness value for a background pixel; and a character recognition part for recognizing characters in the binarized image.

In accordance with a third aspect of the present invention, there is provided a device for recognizing characters in an image, comprising an input part for receiving the image; a Region Of Contents (ROC) extension part for classifying the received image into character blocks and background blocks, extracting a character region by searching for a position of the character blocks in the image, and extending an image of the extracted character region to a size of the received image; an image binarization part for classifying the ROC-extended image into character blocks and background blocks, comparing pixels in the character blocks with a pixel threshold, binarizing the pixels into a brightness value for a character pixel and a brightness value for a background pixel according to the comparison result, and binarizing pixels in the background blocks into the brightness value for a background pixel; and a character recognition part for recognizing characters in the binarized image.

In accordance with a fourth aspect of the present invention, there is provided a device for recognizing characters in an image, comprising an input part for receiving the image; a blurring decision part for classifying the received image into character blocks and background blocks, calculating an average energy ratio of the character blocks, and comparing the average energy ratio with a predetermined threshold to determine whether the received image is blurred; an object skew correction part for classifying, if the received image is not blurred, stripes having or exceeding a predetermined length in the received image, calculating direction angles of the classified stripes to measure a skew of an object, determining a skew angle corresponding to the measured skew, and rotating the image by the determined skew angle to correct the skew of the object in the image; an image binarization part for classifying the skew-corrected image into character blocks and background blocks, comparing pixels in the character blocks with a pixel threshold, binarizing the pixels into a brightness value for a character pixel and a brightness value for a background pixel according to the comparison result, and binarizing pixels in the background blocks into the brightness value for a background pixel; and a character recognition part for recognizing characters in the binarized image.

In accordance with a fifth aspect of the present invention, there is provided a device for recognizing characters in an image, comprising an input part for receiving the image; a blurring decision part for classifying the received image into character blocks and background blocks, calculating an average energy ratio of the character blocks, and comparing the average energy ratio with a predetermined threshold to determine whether the received image is blurred; a Region Of Contents (ROC) extension part for classifying, if the received image is not blurred, the received image into character blocks and background blocks, extracting a character region by searching for a position of the character blocks in the image, and extending an image of the extracted character region to a size of the received image; an image binarization part for classifying the ROC-extended image into character blocks and background blocks, comparing pixels in the character blocks with a pixel threshold, binarizing the pixels into a brightness value for a character pixel and a brightness value for a background pixel according to the comparison result, and binarizing pixels in the background blocks into the brightness value for a background pixel; and a character recognition part for recognizing characters in the binarized image.

In accordance with a sixth aspect of the present invention, there is provided a device for recognizing characters in an image, comprising an input part for receiving the image; an object skew correction part for classifying stripes having or exceeding a predetermined length in the received image, calculating direction angles of the classified stripes to measure a skew of an object, determining a skew angle corresponding to the measured skew, and rotating the image by the determined skew angle to correct the skew of the object in the image; a Region Of Contents (ROC) extension part for classifying the skew-corrected image into character blocks and background blocks, extracting a character region by searching for a position of the character blocks in the image, and extending an image of the extracted character region to a size of the received image; an image binarization part for classifying the ROC-extended image into character blocks and background blocks, comparing pixels in the character blocks with a pixel threshold, binarizing the pixels into a brightness value for a character pixel and a brightness value for a background pixel according to the comparison result, and binarizing pixels in the background blocks into the brightness value for a background pixel; and a character recognition part for recognizing characters in the binarized image.

In accordance with a seventh aspect of the present invention, there is provided a device for recognizing characters in an image, comprising an input part for receiving the image; a blurring decision part for classifying the received image into character blocks and background blocks, calculating an average energy ratio of the character blocks, and comparing the average energy ratio with a predetermined threshold to determine whether the received image is blurred; an object skew correction part for classifying, if the received image is not blurred, stripes having or exceeding a predetermined length in the received image, calculating direction angles of the classified stripes to measure a skew of an object, determining a skew angle corresponding to the measured skew, and rotating the image by the determined skew angle to correct the skew of the object in the image; a Region Of Contents (ROC) extension part for classifying the skew-corrected image into character blocks and background blocks, extracting a character region by searching for a position of the character blocks in the image, and extending an image of the extracted character region to a size of the received image; an image binarization part for classifying the ROC-extended image into character blocks and background blocks, comparing pixels in the character blocks with a pixel threshold, binarizing the pixels into a brightness value for a character pixel and a brightness value for a background pixel according to the comparison result, and binarizing pixels in the background blocks into the brightness value for a background pixel; and a character recognition part for recognizing characters in the binarized image.

BRIEF DESCRIPTION OF THE DRAWINGS

The above and other objects, features and advantages of the present invention will become more apparent from the following detailed description when taken in conjunction with the accompanying drawings in which:

FIGS. 28A through 28D are diagrams illustrating pixel groups formed in respective directions;

FIGS. 43A through 43C are diagrams illustrating a process of recognizing characters in a normal image after preprocessing and without preprocessing according to an embodiment of the present invention; and FIGS. 44A through 44C are diagrams illustrating a process of recognizing characters in an ill-conditioned image after preprocessing and without preprocessing according to an embodiment of the present invention.

DETAILED DESCRIPTION OF THE PREFERRED EMBODIMENTS

In the following description, specific details such as a size of an image and sizes of character and background blocks are provided merely as examples. It should be obvious to those skilled in the art that the invention can be implemented without such specific details or by modifying the same.

In embodiments of the present invention, an input image is assumed to have a size of 640×480 pixels. The term "block" as used herein refers to character and background blocks, and it is assumed herein that each of the blocks has a size of 8×8 pixels. In addition, the term "grouped block" refers to a block made by grouping a central block to be binarized with its 8 neighboring blocks, and it is assumed herein that the grouped block has a size of 24×24 pixels.

In addition, the term "stripe" refers to a plurality of characters arranged densely at regular intervals. In the embodiments of the present invention, a skew of an object in an image is corrected by calculating a direction angle formed by the stripe. Moreover, the term "outside region" refers to a region other than a character region in an image, and refers to a region other than a desired region in an image.

Embodiments of the present invention will now be described in detail with reference to the annexed drawings.

Figure 1:
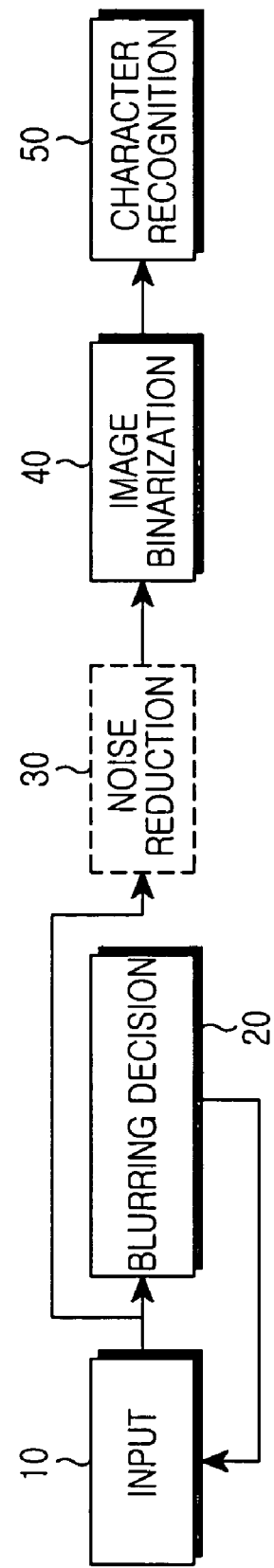
FIG. 1 is a block diagram illustrating a structure of an image preprocessing device according to a first embodiment of the present invention.

FIG. 1 is a block diagram illustrating a structure of a preprocessing device according to a first embodiment of the present invention used in a device for recognizing image characters. Referring to FIG. 1, an input part 10 has a function of receiving an input image. A camera, a scanner, a communication interface including a modem and a network, and a computer can serve as the input part 10. It is assumed herein that the input image is comprised of 640 (column)×480 (row) pixels.

A decision-on-blurring-of-image part (hereinafter referred to as "blurring decision part") 20 classifies an input image into character blocks and background blocks. The blurring decision part 20 calculates an average energy ratio for the character blocks, compares the average energy ratio to a preset threshold, and determines whether the input image is blurred based on a result of the comparison. If it is determined that the input image is blurred, the blurring decision part 20 informs the input part 10 that the input image is blurred, and requests re-input of the image. On the other hand, if the input image is not blurred, the blurring decision part 20 transfers the non-blurred input image to a noise reduction part 30.

The noise reduction part 30 performs a function of reducing noises included in an image output from the input part 10.

Generally, noises are generated when an image is photographed by the camera. Typical noise components among the noise components include Gaussian noises. To reduce the Gaussian noises, various types of noise reduction filters can be used. For example, an image obtained by photographing a business card has a large amount of information at edges of a character region. Therefore, if a simple noise reduction filter is used for the image of a business card, character information can be seriously damaged. Accordingly, it is preferable that the noise reduction part 30 uses a filter capable of reducing image noises while conserving the information at the edges. Herein, it is assumed that the noise reduction part 30 uses a special noise reduction filter such as a directional Lee filter. The noise reduction part 30 is optional.

An image binarization part 40 divides an image output from the input part 10 or an image output from the noise reduction part 30 into blocks having a predetermined size, analyzes pixels in the blocks, and classifies the blocks into character blocks and background blocks according to the analysis. The image binarization part 40 enhances edges of the character blocks and generates noise-reduced pixels using relationships between character pixels of the character blocks and their surrounding pixels, and calculates a threshold for binarizing the pixels. For edge enhancement and noise reduction, the image binarization part 40 can use a quadratic filter (QF) or an improved quadratic filter (IQF). The image binarization part 40 compares pixels of the edge-enhanced, noise-reduced character blocks and background blocks to the threshold, and binarizes the pixels into a first brightness value or a second brightness value based on a result of the comparison.

A character recognition part 50 recognizes characters in the binarized image output from the image binarization part 40.

Figure 2:
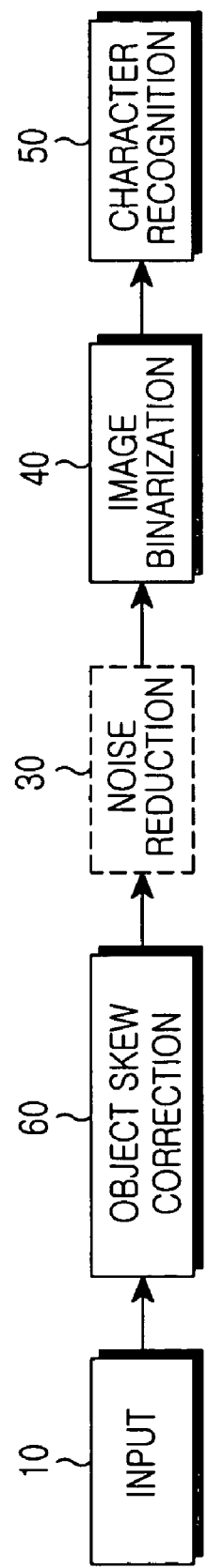
FIG. 2 is a block diagram illustrating a structure of an image preprocessing device according to a second embodiment of the present invention.

FIG. 2 is a block diagram illustrating a structure of a preprocessing device according to a second embodiment of the present invention used in a device for recognizing image characters. Referring to FIG. 2, an input part 10 of the type described earlier has a function of receiving an input image.

An object skew correction part 60 divides an image output from the input part 10 into blocks having a predetermined size, classifies the blocks into character blocks and background blocks, and binarizes pixels in each of the blocks. The object skew correction part 60 performs dilation on a region of the binarized character blocks to generate candidate stripes in which neighboring characters are connected to one another. The object skew correction part 60 selects candidate stripes having or exceeding a predetermined length among the candidate stripes. The object skew correction part 60 calculates direction angles of the selected candidate stripes, accumulates count values of the calculated direction angles according to angles, selects a direction angle having the largest count value, and determines the selected direction angle as a skew angle of a skewed object in the image. The object skew correction part 60 receives an image output from the input part 10 and rotates the image by the determined skew angle to correct a skew of an object in the image. The object skew correction part 60 fills an empty region of the image in which no pixel exists due to the skew correction, by using specified pixels, to generate an image having the same size as the input image.

The noise reduction part 30 of the type described earlier performs a function of reducing noises included in an image output from the object skew correction part 60. The noise reduction part 30 can be interposed between the input part 10 and the object skew correction part 60, or can be omitted.

An image binarization part 40 divides an image output from the object skew correction part 60 or an image output from the noise reduction part 30 into blocks having a predetermined size, analyzes pixels in the blocks, and classifies the blocks into character blocks and background blocks according to the analysis. The image binarization part 40 enhances edges of the character blocks and generates noise-reduced pixels using relationships between character pixels of the character blocks and their surrounding pixels, and calculates a threshold for binarizing the pixels. For edge enhancement and noise reduction, the image binarization part 40 can use the QF or the IQF. The image binarization part 40 compares pixels of the edge-enhanced, noise-reduced character blocks and background blocks to the threshold, and binarizes the pixels into a first brightness value or a second brightness value based on the comparison.

A character recognition part 50 recognizes characters in the binarized image output from the image binarization part 40.

Figure 3:
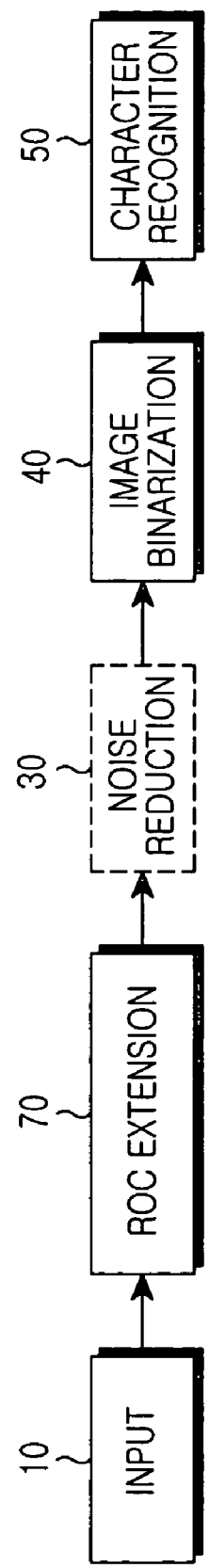
FIG. 3 is a block diagram illustrating a structure of an image preprocessing device according to a third embodiment of the present invention.

FIG. 3 is a block diagram illustrating a structure of a preprocessing device according to a third embodiment of the present invention used in a device for recognizing image characters. Referring to FIG. 3, an input part 10 of the type described earlier has a function of receiving an input image.

A Region Of Contents (ROC) extension part 70 divides an image output from the input part 10 into blocks having a predetermined size, analyzes pixels contained in the blocks, classifies the blocks into character blocks and background blocks according to the analysis, and binarizes pixels in the character blocks. The ROC extension part 70 median-filters the binarized image to remove a character region incorrectly classified due to an image rim or noise, from the image. The ROC extension part 70 horizontally and vertically scans the median-filtered image to search for a position of a character region. The ROC extension part 70 extracts an image of a character region corresponding to the searched position. The ROC extension part 70 extends an image of the extracted character region to a size of the input image The noise reduction part 30 of the type described earlier performs a function of reducing noises included in an image output from the ROC extension part 70. The noise reduction part 30 can be interposed between the input part 10 and the ROC extension part 70, or can be omitted.

An image binarization part 40 divides an image output from the ROC extension part 70 or an image output from the noise reduction part 30 into blocks having a predetermined size, analyzes pixels in the blocks, and classifies the blocks into character blocks and background blocks according to the analysis result.

A character recognition part 50 recognizes characters in the binarized image output from the image binarization part 40.

Figure 4:
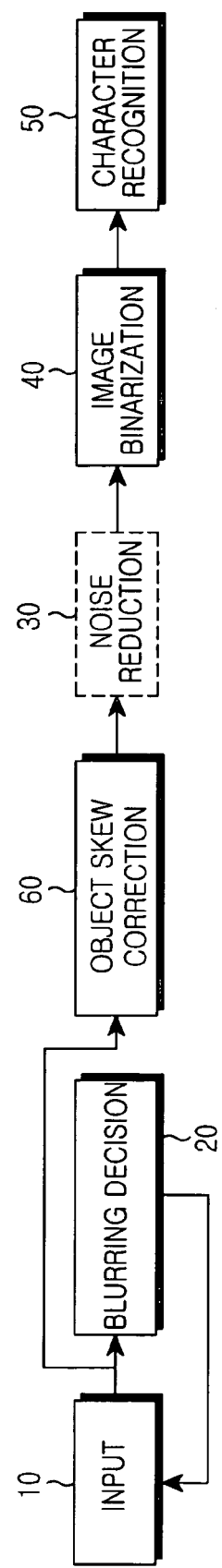
FIG. 4 is a block diagram illustrating a structure of an image preprocessing device according to a fourth embodiment of the present invention.

FIG. 4 is a block diagram illustrating a structure of a preprocessing device according to a fourth embodiment of the present invention used in a device for recognizing image characters. Referring to FIG. 4, an input part 10 of the type described earlier has a function of receiving an input image.

A blurring decision part 20 of the type described earlier classifies an input image into character blocks and background blocks. The blurring decision part 20 calculates an average energy ratio for the character blocks, compares the average energy ratio to with a preset threshold, and determines whether the input image is blurred or not based on according to the comparison. If it is determined that the input image is blurred, the blurring decision part 20 informs the input part 10 that the input image is blurred, and requests re-input of the image. On the other hand, if the input image is not blurred, the blurring decision part 20 transfers the non-blurred input image to an object skew correction part 60.

The object skew correction part 60 of the type described earlier divides an image output from the input part 10 into blocks having a predetermined size, classifies the blocks into character blocks and background blocks, and binarizes pixels in each of the blocks. The object skew correction part 60 performs dilation on a region of the binarized character blocks to generate candidate stripes in which neighboring characters are connected to one another. The object skew correction part 60 selects candidate stripes having a predetermined length or longer among the candidate stripes. The object skew correction part 60 calculates direction angles of the selected candidate stripes, accumulates count values of the calculated direction angles according to angles, selects a direction angle having the largest count value, and determines the selected direction angle as a skew angle of a skewed object in the image. The object skew correction part 60 receives an image output from the input part 10 and rotates the image by the determined skew angle to correct a skew of an object in the image. The object skew correction part 60 fills an empty region of the image in which no pixel exists due to the skew correction, with specified pixels, to generate an image having the same size as the input image.

A noise reduction part 30 of the type described earlier performs a function of reducing noises included in an image output from the object skew correction part 60. The noise reduction part 30 can be interposed between the blurring decision part 20 and the object skew correction part 60, or can be omitted.

An image binarization part 40 of the type described earlier receives an image output from the object skew correction part 60 or an image output from the noise reduction part 30.

A character recognition part 50 of the type described earlier recognizes characters in the binarized image output from the image binarization part 40.

Figure 5:
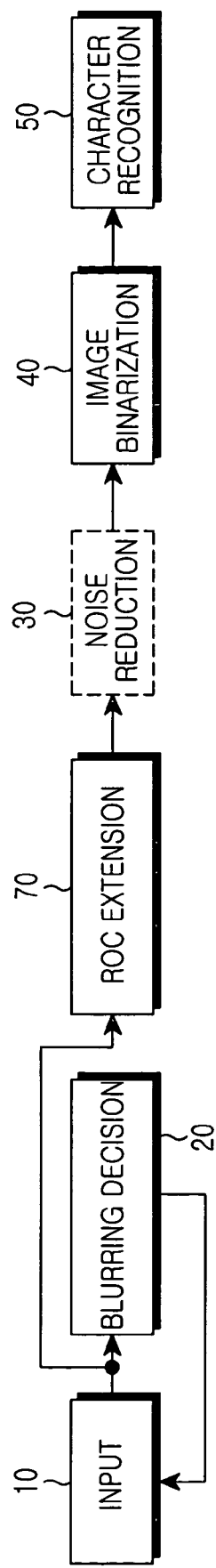
FIG. 5 is a block diagram illustrating a structure of an image preprocessing device according to a fifth embodiment of the present invention.

FIG. 5 is a block diagram illustrating a structure of a preprocessing device according to a fifth embodiment of the present invention used in a device for recognizing image characters. Referring to FIG. 5, an input part 10 of the type described earlier has a function of receiving an input image.

A blurring decision part 20 of the type described earlier classifies an input image into character blocks and background blocks. The blurring decision part 20 calculates an average energy ratio for the character blocks, compares the average energy ratio to a preset threshold, and determines whether the input image is blurred based on the comparison. If it is determined that the input image is blurred, the blurring decision part 20 informs the input part 10 that the input image is blurred, and requests a re-input of the image. On the other hand, if the input image is not blurred, the blurring decision part 20 transfers the non-blurred input image to the ROC extension part 70.

The ROC extension part 70 of the type described earlier divides an image output from the input part 10 into blocks having a predetermined size, analyzes pixels contained in the blocks, classifies the blocks into character blocks and background blocks according to the analysis result, and binarizes pixels in the character blocks. The ROC extension part 70 median-filters the binarized image to remove a character region incorrectly classified due to an image rim or noise, from the image. The ROC extension part 70 horizontally and vertically scans the median-filtered image to search for a position of a character region. The ROC extension part 70 extracts an image of a character region corresponding to the searched position. The ROC extension part 70 extends an image of the extracted character region to a size of the input image.

A noise reduction part 30 of the type described earlier performs a function of reducing noises included in an image output from the ROC extension part 70. The noise reduction part 30 can be interposed between the blurring decision part 20 and the ROC extension part 70, or can be omitted.

An image binarization part 40 of the type described earlier divides an image output from the ROC extension part 70 or an image output from the noise reduction part 30 into blocks having a predetermined size, analyzes pixels in the blocks, and classifies the blocks into character blocks and background blocks according to the analysis result. The image binarization part 40 enhances edges of the character blocks and generates noise-reduced pixels using relationships between character pixels of the character blocks and their surrounding pixels, and calculates a threshold for binarizing the pixels. For edge enhancement and noise reduction, the image binarization part 40 can use a quadratic filter or an improved quadratic filter. The image binarization part 40 compares pixels of the edge-enhanced, noise-reduced character blocks and background blocks with the threshold, and binarizes the pixels into a first brightness value or a second brightness value according to the comparison result.

A character recognition part 50 of the type described earlier recognizes characters in the binarized image output from the image binarization part 40.

Figure 6:
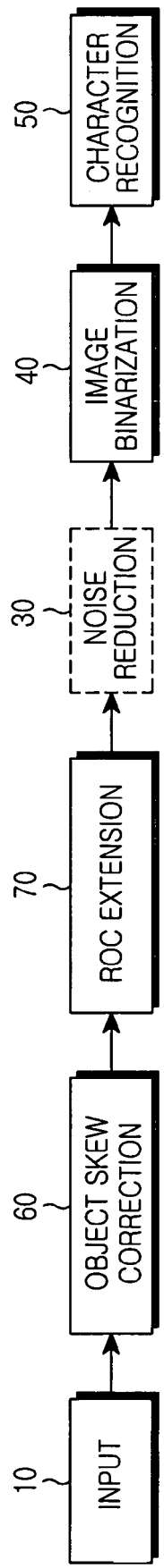
FIG. 6 is a block diagram illustrating a structure of an image preprocessing device according to a sixth embodiment of the present invention.

FIG. 6 is a block diagram illustrating a structure of a preprocessing device according to a sixth embodiment of the present invention used in a device for recognizing image characters. Referring to FIG. 6, an input part 10 of the type described earlier has a function of receiving an input image.

An object skew correction part 60 of the type described earlier divides an image output from the input part 10 into blocks having a predetermined size, classifies the blocks into character blocks and background blocks, and binarizes pixels in each of the blocks. The object skew correction part 60 performs dilation on a region of the binarized character blocks to generate candidate stripes in which neighboring characters are connected to one another. The object skew correction part 60 selects candidate stripes having or exceeding a predetermined length among the candidate stripes. The object skew correction part 60 calculates direction angles of the selected candidate stripes, accumulates count values of the calculated direction angles according to angles, selects a direction angle having the largest count value, and determines the selected direction angle as a skew angle of a skewed object in the image. The object skew correction part 60 receives an image output from the input part 10 and rotates the image by the determined skew angle to correct a skew of an object in the image. The object skew correction part 60 fills an empty region of the image in which no pixel exists due to the skew correction, with specified pixels, to generate an image having the same size as the input image.

An ROC extension part 70 of the type described earlier divides an image output from the object skew correction part 60 into blocks having a predetermined size, analyzes pixels contained in the blocks, classifies the blocks into character blocks and background blocks according to the analysis result, and binarizes pixels in the character blocks. The ROC extension part 70 median-filters the binarized image to remove a character region incorrectly classified due to an image rim or noise, from the image. The ROC extension part 70 horizontally and vertically scans the median-filtered image to search for a position of a character region. The ROC extension part 70 extracts an image of a character region corresponding to the searched position. The ROC extension part 70 extends an image of the extracted character region to a size of the input image.

A noise reduction part 30 of the type described earlier performs a function of reducing noises included in an image output from the ROC extension part 70. The noise reduction part 30 can be interposed between the object skew correction part 60 and the ROC extension part 70, or can be omitted.

An image binarization part 40 of the type described earlier divides an image output from the ROC extension part 70 or an image output from the noise reduction part 30 into blocks having a predetermined size, analyzes pixels in the blocks, and classifies the blocks into character blocks and background blocks according to the analysis result. The image binarization part 40 enhances edges of the character blocks and generates noise-reduced pixels using relationships between character pixels of the character blocks and their surrounding pixels, and calculates a threshold for binarizing the pixels. For edge enhancement and noise reduction, the image binarization part 40 can use a quadratic filter or an improved quadratic filter. The image binarization part 40 compares pixels of the edge-enhanced, noise-reduced character blocks and background blocks with the threshold, and binarizes the pixels into a first brightness value or a second brightness value according to the comparison result.

A character recognition part 50 of the type described earlier recognizes characters in the binarized image output from the image binarization part 40.

Figure 7:
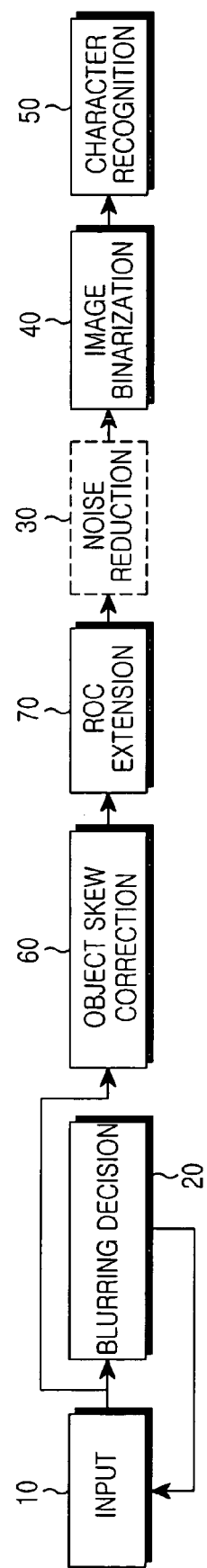
FIG. 7 is a block diagram illustrating a structure of an image preprocessing device according to a seventh embodiment of the present invention.

FIG. 7 is a block diagram illustrating a structure of a preprocessing device according to a seventh embodiment of the present invention used in a device for recognizing image characters. Referring to FIG. 7, an input part 10 of the type described earlier has a function of receiving an input image.

A blurring decision part 20 of the type described earlier classifies an input image into character blocks and background blocks. The blurring decision part 20 calculates an average energy ratio for the character blocks, compares the average energy ratio to a preset threshold, and determines whether the input image is blurred based on the comparison. If it is determined that the input image is blurred, the blurring decision part 20 informs the input part 10 that the input image is blurred, to request re-input of the image. On the other hand, if the input image is not blurred, the blurring decision part 20 transfers the non-blurred input image to an object skew correction part 60.

An object skew correction part 60 of the type described earlier divides an image output from the input part 10 into blocks having a predetermined size, classifies the blocks into character blocks and background blocks, and binarizes pixels in each of the blocks. The object skew correction part 60 performs dilation on a region of the binarized character blocks to generate candidate stripes in which neighboring characters are connected to one another. The object skew correction part 60 selects candidate stripes having or exceeding a predetermined length among the candidate stripes. The object skew correction part 60 calculates direction angles of the selected candidate stripes, accumulates count values of the calculated direction angles according to angles, selects a direction angle having the largest count value, and determines the selected direction angle as a skew angle of a skewed object in the image. The object skew correction part 60 receives an image output from the input part 10 and rotates the image by the determined skew angle to correct a skew of an object in the image. The object skew correction part 60 fills an empty region of the image in which no pixel exists due to the skew correction, with specified pixels, to generate an image having the same size as the input image.

An ROC extension part 70 of the type described earlier divides an image output from the object skew correction part 60 into blocks having a predetermined size, analyzes pixels contained in the blocks, classifies the blocks into character blocks and background blocks according to the analysis result, and binarizes pixels in the character blocks. The ROC extension part 70 median-filters the binarized image to remove a character region incorrectly classified due to an image rim or noise, from the image. The ROC extension part 70 horizontally and vertically scans the median-filtered image to search for a position of a character region. The ROC extension part 70 extracts an image of a character region corresponding to the searched position. The ROC extension part 70 extends an image of the extracted character region to a size of the input image.

A noise reduction part 30 of the type described earlier performs a function of reducing noises included in an image output from the ROC extension part 70. The noise reduction part 30 can be interposed between the blurring decision part 20 and the object skew correction part 60, or between the object skew correction part 60 and the ROC extension part 70, or can be omitted.

An image binarization part 40 of the type described earlier divides an image output from the ROC extension part 70 or an image output from the noise reduction part 30 into blocks having a predetermined size, analyzes pixels in the blocks, and classifies the blocks into character blocks and background blocks according to the analysis result. The image binarization part 40 enhances edges of the character blocks and generates noise-reduced pixels using relationships between character pixels of the character blocks and their surrounding pixels, and calculates a threshold for binarizing the pixels. For edge enhancement and noise reduction, the image binarization part 40 can use a quadratic filter or an improved quadratic filter. The image binarization part 40 compares pixels of the edge-enhanced, noise-reduced character blocks and background blocks with the threshold, and binarizes the pixels into a first brightness value or a second brightness value according to the comparison result.

A character recognition part 50 of the type described earlier recognizes characters in the binarized image output from the image binarization part 40.

So far, a description has been made of a preprocessing device for a system recognizing image characters according to first to seventh embodiments of the present invention.

The first embodiment provides a preprocessing device for determining whether an input image is blurred, and binarizing, if the input image is not blurred, pixels in the image and outputting the binarized values to a character recognition device.

The second embodiment provides a preprocessing device for calculating a skew of an object in an input image, generating a skew-corrected image, binarizing pixels in the skew-corrected image, and outputting the binarized values to a character recognition device.

The third embodiment provides a preprocessing device for extracting a character region from an input image, removing unwanted image region from the extracted character region, extending the extracted character region to a size of the input image, binarizing pixels in the extended character region, and outputting the binarized values to a character recognition device.

The fourth embodiment provides a preprocessing device for determining whether an input image is blurred, and calculating, if the input image is not blurred, a skew of an object in the image, generating a skew-corrected image, binarizing pixels in the skew-corrected image, and outputting the binarized values to a character recognition device.

The fifth embodiment provides a preprocessing device for determining whether an input image is blurred, and extracting, if the input image is blurred, a character region from the image, removing an unwanted image region from the extracted character region, extending the extracted character region to a size of the input image, binarizing pixels in the extended character region, and outputting the binarized values to a character recognition device.

The sixth embodiment provides a preprocessing device for calculating a skew of an object in an input image, generating a skew-corrected image, extracting a character region from the skew-corrected image, removing an unwanted image region from the extracted character region, extending the extracted character region to a size of the input image, binarizing pixels in the extended character region, and outputting the binarized values to a character recognition device.

The seventh embodiment provides a preprocessing device for determining whether an input image is blurred, and calculating, if the input image is blurred, a skew of an object in the image, generating a skew-corrected image, extracting a character region from the skew-corrected image, removing an unwanted image region from the extracted character region, extending the extracted character region to a size of the input image, binarizing pixels in the extended character region, and outputting the binarized values to a character recognition device.

In the first to seventh embodiments, the noise reduction part 30 is provided to improve preprocessing performance, and can be omitted. Though not illustrated, the first to seventh embodiments can implement the preprocessing device without the image binarization part 40. That is, the image binarization part 40 is optional.

In the preprocessing devices according to the first to seventh embodiments, the blurring decision part 20, the object skew correction part 60, the ROC extension part 70, the noise reduction part 30, and the image binarization part 40 can be implemented as follows.

Herein, FIGS. 8 through 14E are given to describe a structure of the blurring decision part 20. FIGS. 15 through 21H are given to describe a structure of the object skew correction part 60. FIGS. 22 through 26H are given to describe a structure of the ROC extension part 70. FIGS. 27A through 28D are given to describe a structure of the noise reduction part 30. FIGS. 30 through 40G are given to describe a structure of the image binarization part 40.

First, a detailed structure of the blurring decision part 20 shown in FIGS. 1, 4, 5 and 7 will now be described herein below with reference to FIG. 8.

Figure 8:
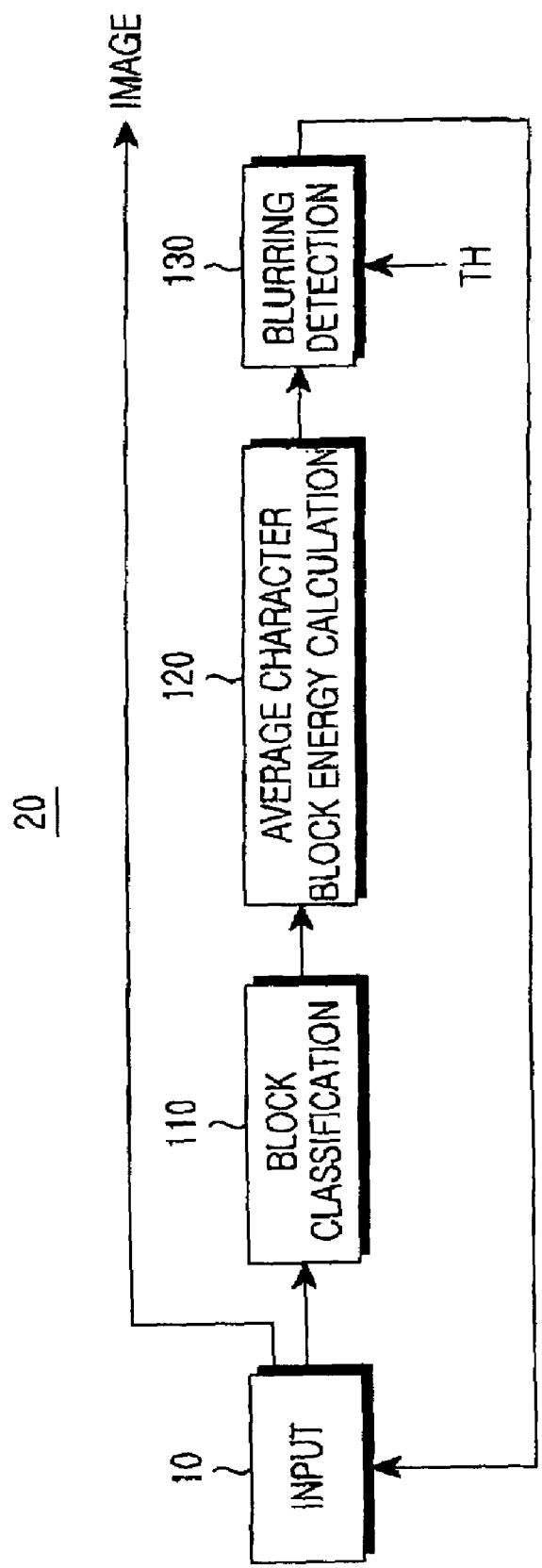
FIG. 8 is a block diagram illustrating a detailed structure of the blurring decision part according to an embodiment of the present invention.

FIG. 8 is a block diagram illustrating a detailed structure of the blurring decision part 20 according to an embodiment of the present invention. Referring to FIG. 8, a block classification part 110 divides an image received from the input part 10 into blocks having a preset size, analyzes pixels included in the blocks, and classifies the blocks into character blocks and background blocks according to the analysis result. The block classification part 110 classifies the blocks into character blocks and background blocks in order to determine whether the image is blurred, using only a region in which characters are included. It is assumed herein that each of the blocks has a size of 8×8 pixels.

An average character block energy calculation part 120 calculates an average energy ratio of character blocks output from the block classification part 110. The average character block energy calculation part 120 calculates an average energy ratio of character blocks in order to determine whether the image is blurred, using only the region in which characters are included.

A blurring detection part 130 compares the average energy ratio of character blocks output from the average character block energy calculation part 120 with a predetermined threshold TH, and determines whether the image is blurred based on the comparison. If it is determined that the image is blurred, the blurring detection part 130 requests re-input of the image by notifying the input part 10 of the result of the determination.

Figure 9:
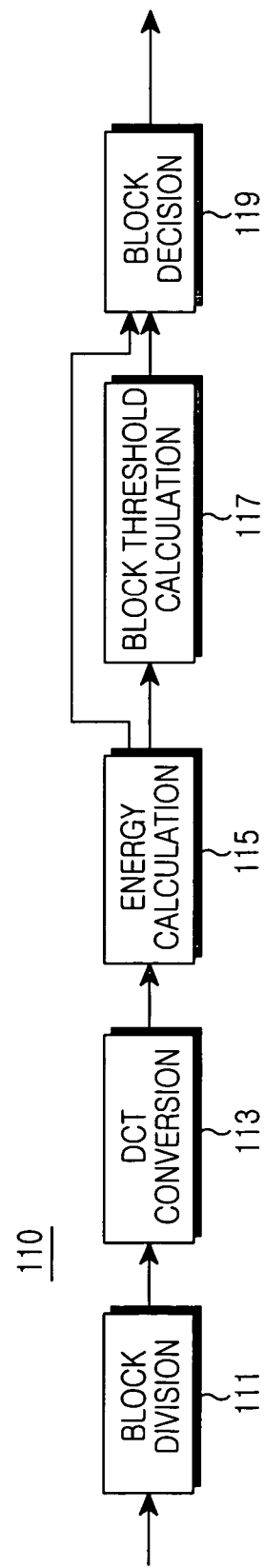
FIG. 9 is a block diagram illustrating a detailed structure of the block classification part of FIG. 8 according to an embodiment of the present invention.

FIG. 9 is a block diagram illustrating a detailed structure of the block classification part 110. The block classification part 110 divides the image into blocks having a preset size, and classifies the blocks into character blocks and background blocks. The block classification part 110 classifies the blocks in order to determine whether the image is blurred, using only the region in which characters are included.

Referring to FIG. 9, a block division part 111 divides the image into blocks having a predetermined size. If the image has a size of 640×480 pixels and each of the blocks has a size of 8×8 pixels, the block division part 111 divides the image into 4800 blocks.

Figure 10A:
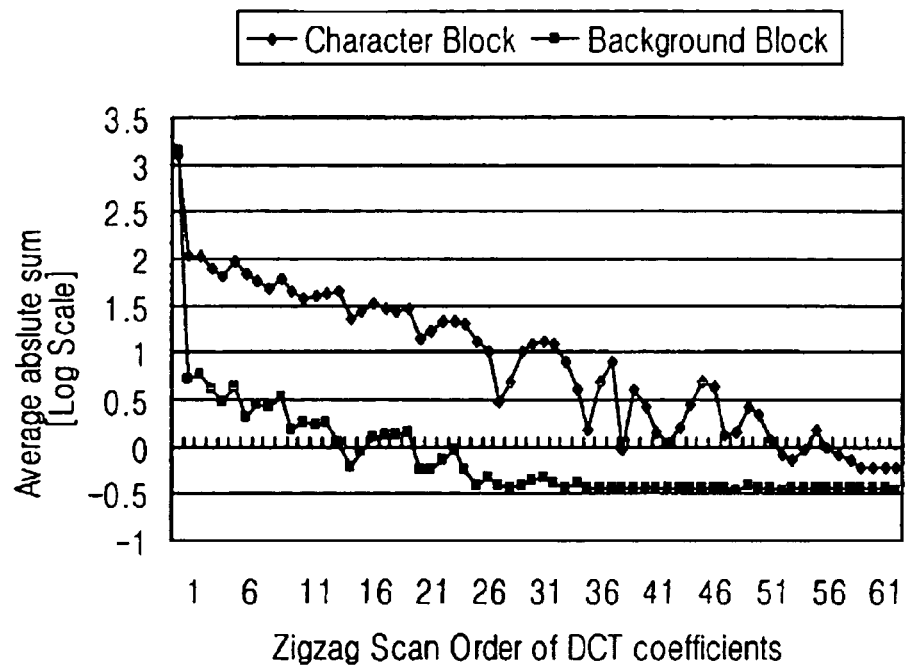
FIGS. 10A through 10C are graphs illustrating a method of setting positions of dominant Discrete Cosine Transform (DCT) coefficients by the energy calculation part of FIG. 9.
Figure 10B:
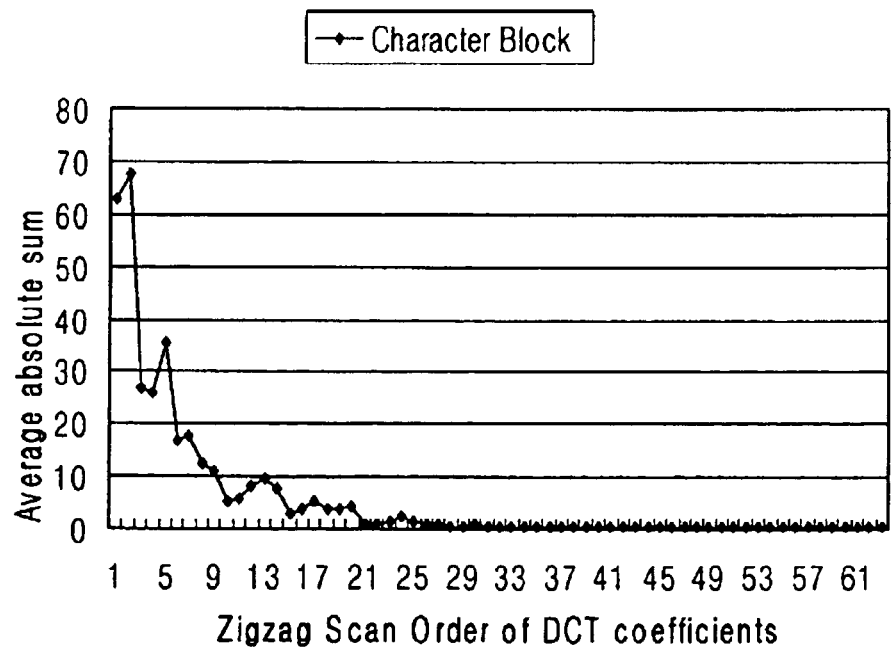
Figures 10C, 11:
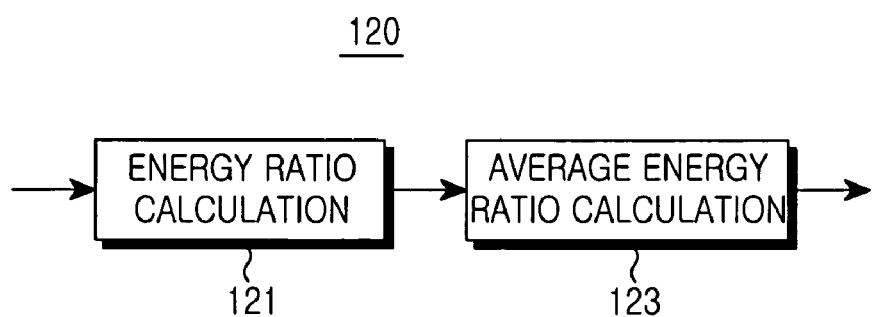
FIG. 11 is a block diagram illustrating a detailed structure of the average character block energy calculation part of FIG. 8 according to an embodiment of the present invention.

The blocks output from the block division part 111 are applied to a discrete cosine transform (DTC) conversion part 113 where they are subjected to DTC conversion. An energy calculation part 115 calculates a sum of absolute values of dominant DCT coefficients in the DCT-converted blocks. In this case, an energy distribution value of DCT coefficients for the character blocks is larger than that of the background blocks. FIG. 10A is a graph illustrating a comparison of energy distributions of DCT coefficients for character blocks and background blocks. In FIG. 10A, a Y axis represents an average sum of the absolute values in a log scale, and an X axis represents a zigzag scan order of DCT coefficients. As illustrated in FIG. 10A, DCT coefficients for the character blocks have larger values than the DCT coefficients for the background blocks. FIG. 10B is a graph illustrating an energy distribution characteristic of DCT coefficients for the character blocks. In FIG. 10B, a Y axis represents an average sum of the absolute values in a normal scale, and an X axis represents a zigzag scan order of DCT coefficients. As illustrated in FIG. 10B, some of the DCT coefficients are large in an average sum of their absolute values. Therefore, in the embodiment of the present invention, it is assumed that dominant DCT coefficients used during block classification are $D_1$ to $D_9$ as illustrated in FIG. 10C. Accordingly, the sum of absolute values of the dominant DCT coefficients in a $k^{th}$ block can be calculated by $$S^k = \sum_{i=1}^{9} |D_i^k| \qquad (1)$$

In Equation (1), $|D_i^k|$ denotes an $i^{th}$ dominant DCT coefficient of the $k^{th}$ block, and $S^k$ denotes the sum of the absolute values of the dominant DCT coefficients in the $k^{th}$ block. Thus, in the embodiment of the present invention, a sum of absolute values of the dominant DCT coefficients $D_1$ to $D_9$ is calculated.

The energy calculation part 115 performs the calculation of Equation (1) on all blocks (at k=0, 1, 2, . . . , 4799). Energy values $S^k$ (k=0, 1, 2, . . . , 4799) of the respective blocks are applied to a block threshold calculation part 117.

The block threshold calculation part 117 sums up the energy values $S^k$ (k=0, 1, 2, . . . , 4799) calculated block by block, and calculates an average value $<S^k>$ by dividing the summed energy value for all the blocks by the total number TBN of the blocks. The average value $<S^k>$ is calculated by Equation (2) below. The average value $<S^k>$ becomes a threshold Cth used for determining whether the blocks are character blocks or background blocks.

$$\langle S^k \rangle = \frac{1}{TBN} \sum_{k=1}^{TBN} S^k \qquad (2)$$
$$= Cth$$

In Equation (2), TBN denotes the total number of the blocks.

A block decision part 119 sequentially receives energy values (the sums of absolute values of the dominant DCT coefficients) of the respective blocks, output from the energy calculation part 115, and determines the blocks as character blocks or background blocks by comparing the received block energy values with the threshold Cth. As shown in Equation (3) below, the block decision part 119 determines a $k^{th}$ block as a character block if $S^k \geq Cth$, and classifies the $k^{th}$ block as a background block if $S^k < Cth$.

IF $S^k \geq Cth$ then CB else BB  (3)

Pixels of the blocks classified by the block classification part 110 can have gray levels between 0 and 255. An image of a character block output from the block classification part 110 is input to the average character block energy calculation part 120. The average character block energy calculation part 120 calculates an energy ratio of each of the classified character blocks, and then calculates an average energy ratio of the character blocks in the entire image, using the calculated energy ratios.

FIG. 11 is a block diagram illustrating a detailed structure of the average character block energy calculation part 120. Referring to FIG. 11, an energy ratio calculation part 121 calculates an energy ratio of the DCT coefficients in each of the character blocks classified by the block classification part 110. For an M×M character block, an energy ratio of the DCT coefficients can be calculated by $$R^k = \frac{\sum_{m}\sum_{n}\limits_{(m,n)\in\Omega_L} |L_{m,n}^k|}{\sum_{m}\sum_{n}\limits_{(m,n)\in\Omega_L} |L_{m,n}^k| + \sum_{m}\sum_{n}\limits_{(m,n)\in\Omega_H} |H_{m,n}^k|} \qquad (4)$$

where, $$\Omega_L = \left\{ (m,n) \,|\, m, n = 0, \ldots, M-1, m+n = 1, \ldots, \frac{M}{4} \right\};$$

$$\Omega_H = \left\{ (m,n) \,|\, m, n = 0, \ldots, M-1, m+n = \frac{M}{4}+1, \ldots, \frac{3M}{4} \right\};$$

$L_{m,n}^k$ denotes a DCT coefficient of a low-frequency component in a (m, n) point of the $k^{th}$ block; and $H_{m,n}^k$ denotes a DCT coefficient of a high-frequency component in a (m, n) point of the $k^{th}$ block.

As mentioned above, it is assumed herein that each block has a size of 8×8 pixels (i.e., M=8). In order to calculate an energy ratio of the character blocks, an experiment is made to verify the propriety of selecting positions of the DCT coefficients of a low-frequency component and a high-frequency component, and positions of the DCT coefficients for calculating a DCT energy ratio in each character block are calculated. The experimental results show variations in average energy ratios of the character blocks by increasing the blurring level. According to the experimental result, among the DCT coefficients for calculating an energy ratio of DCT coefficients of each character block, $L_{m,n}$ corresponds to DCT coefficients of low-frequency components at points where m+1=1 and 2, and $H_{m,n}$ corresponds to DCT coefficients of high-frequency components at points where m+n=3, 4, 5 and 6.

In this manner, the energy ratio calculation part 121 calculates an energy ratio $R^k$ of DCT coefficients for each character block using Equation (4) above. An average energy ratio calculation part 123 calculates an average energy ratio $<R^k>$ of the DCT coefficients in the entire image. That is, the average energy ratio calculation part 123 calculates the average energy ratio $<R^k>$ of the DCT coefficients in the entire image using the energy ratios $R^k$ calculated by the energy ratio calculation part 121 in accordance with Equation (5) below.

$$\langle R^k \rangle = \frac{1}{TCN} \sum_{k=1}^{TCN} R^k \quad (5)$$

In Equation (5), TCN denotes the total number of character blocks.

If the average energy ratio $<R^k>$ for the entire image is calculated as described above, the blurring detection part 130 compares the average energy ratio $<R^k>$ with an experimentally obtained threshold Bth in accordance with Equation (6) below, to determine whether the input image is blurred. If $<R^k> \geq Bth$, the blurring detection part 130 determines that the input image is blurred, and then requests the input part 10 to re-input the image. On the other hand, if $<R^k> < Bth$, the blurring detection part 130 determines that the input image is not blurred, and then applies the input image to the noise reduction part 30 or the image binarization part 40 for character recognition.

IF $<R^k> \geq Bth$ then blurred image else non-blurred image (6)

In Equation (6), the threshold Bth is experimentally selected based on whether character information of the image can be visually recognized, and on binarization performance of the image.

Figure 12:
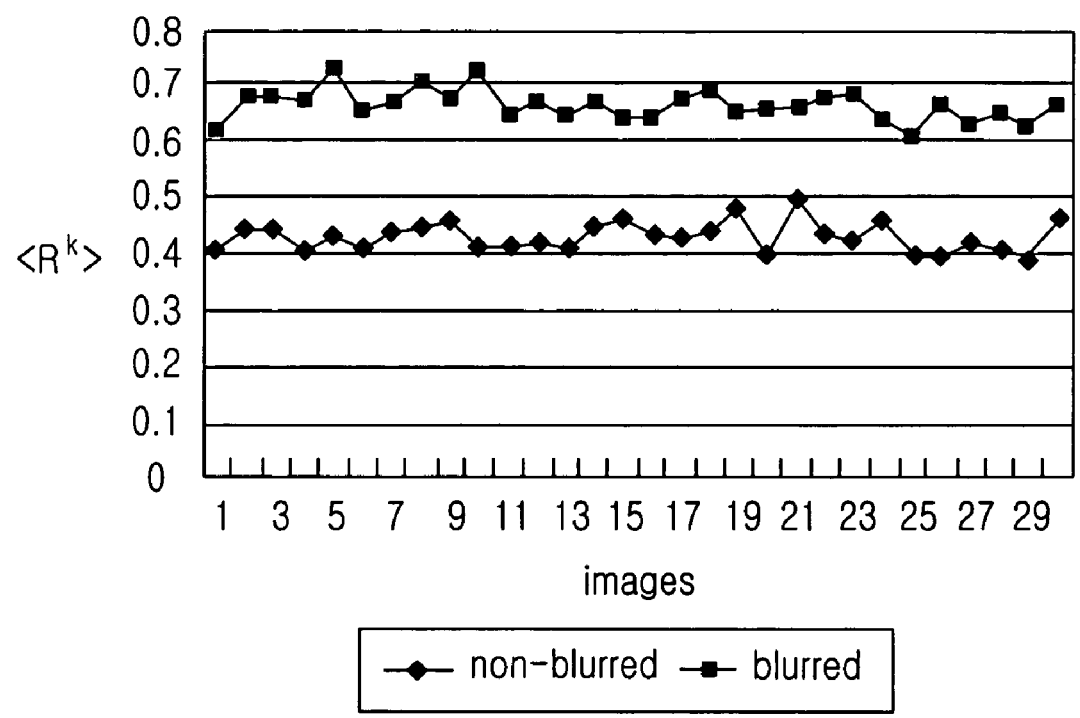
FIG. 12 is a graph illustrating average energy distribution of dominant DCT coefficients.

FIG. 12 is a graph illustrating application results of Equation (5) for a blurred image and a non-blurred image. In FIG. 12, a horizontal axis represents different image samples and a vertical axis represents an average energy ratio $<R^k>$. It can be noted from FIG. 12 that a blurred image and a non-blurred image show different distributions of the average energy ratio $<R^k>$. This proves that applying Equation (5) to determine blurring is reasonable.

Figure 13:
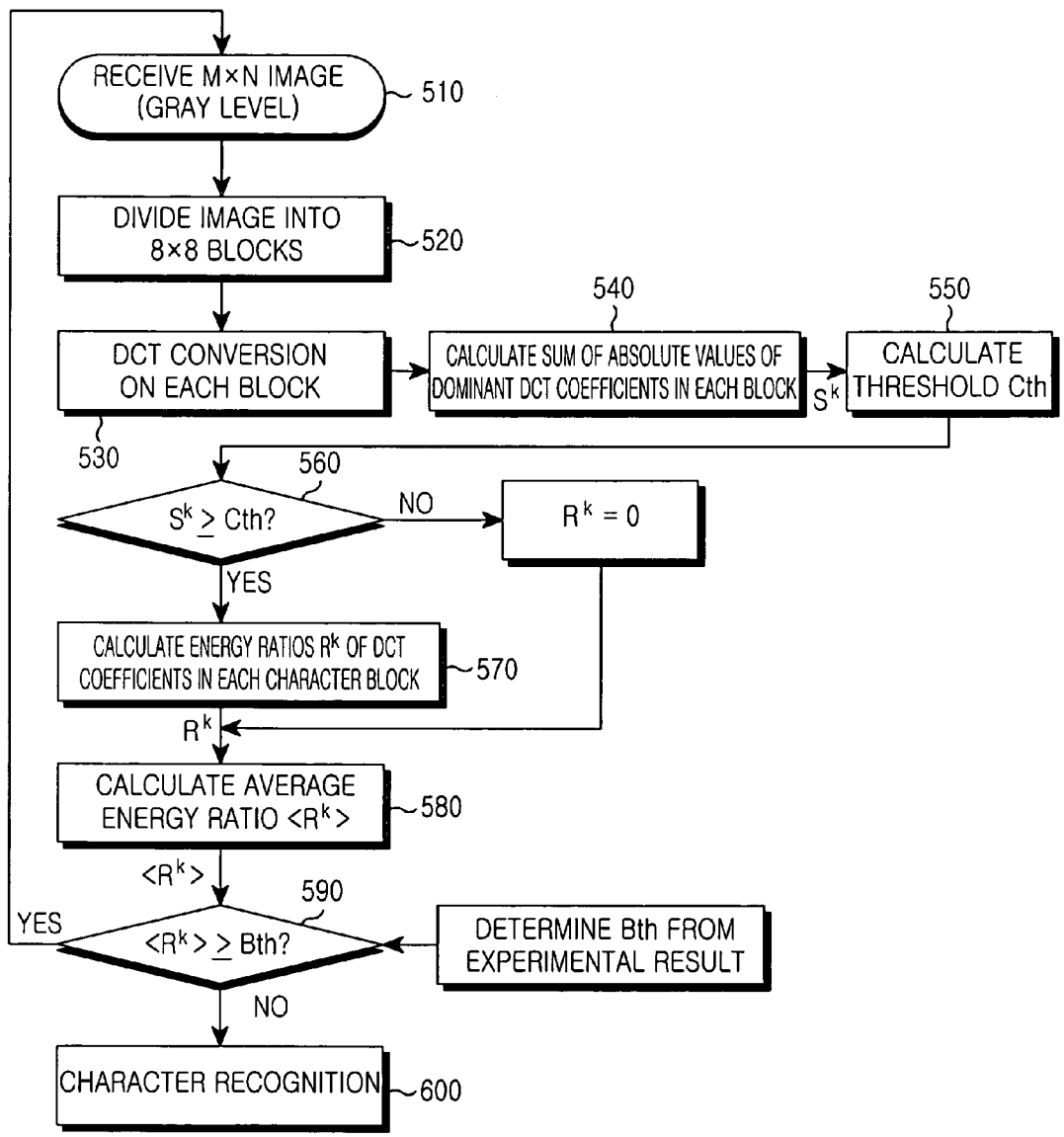
FIG. 13 is a flowchart illustrating a procedure for determining using the blurring decision part whether an input image is blurred according to an embodiment of the present invention.

FIG. 13 is a flowchart illustrating a procedure for determining whether an input image is blurred, according to an embodiment of the present invention. FIGS. 14A through 14E are diagrams illustrating images generated in the process of performing the procedure of FIG. 13.

Figure 14A:
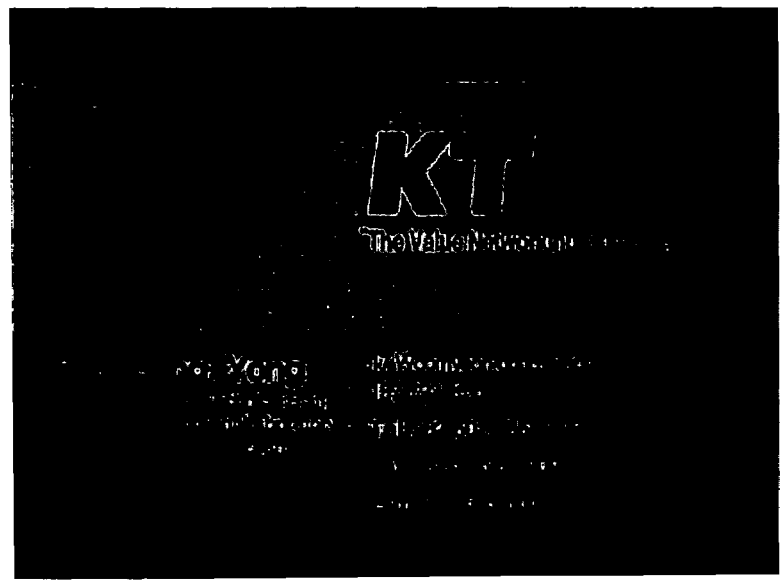
FIGS. 14A through 14E are diagrams illustrating images generated in the process of performing the procedure of FIG. 13.
Figure 14B:
Figure 14C:
Figure 14D:
Figure 14E:
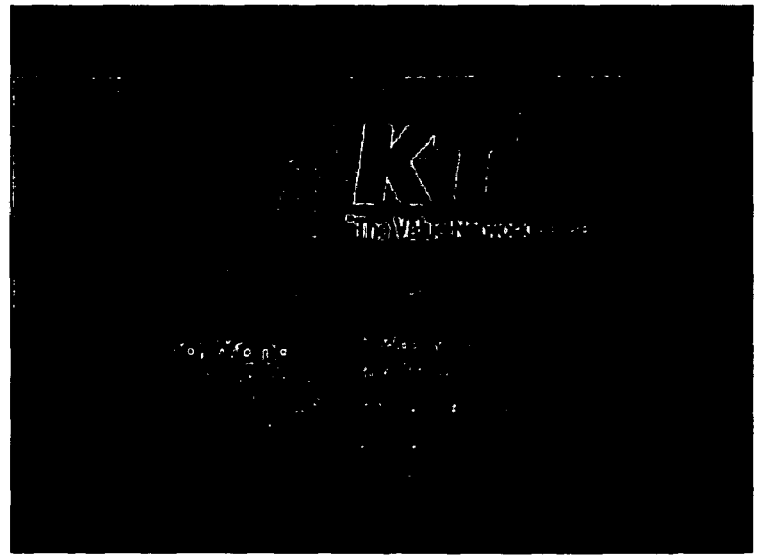

Referring to FIG. 13, an input image shown in FIG. 14A is received in step 510. The received image has a size of 640× 480 pixels. In step 520, the image of FIG. 14A is divided into blocks having a predetermined size, shown in FIG. 14B. Each of the blocks has a size of 8×8 pixels, and the number of the divided blocks is 4800. Thereafter, in step 530, each of the divided blocks is DCT-converted. In step 540, sums $S^k$ (k=BN=0, 1, . . . , 4799) of absolute values of the dominant DCT coefficients in the DCT-converted blocks are calculated in accordance with Equation (1), providing the calculation results as energies of the respective blocks. In step 550, a block threshold Cth (=$<S^k>$) is calculated by averaging the sums of absolute values of the dominant DCT coefficients of the blocks in accordance with Equation (2). The block threshold Cth is a value determined by averaging the sums of absolute values of the dominant DCT coefficients of the blocks in the entire image, and becomes a block threshold used for classifying the blocks as character blocks and background blocks. Thereafter, in step 560, sums $S^k$ of absolute values of the dominant DCT coefficients for the blocks are sequentially received, and compared with the block threshold Cth in accordance with Equation (3). As a result of the comparison, if the value $S^k$ is larger than or equal to the block threshold Cth, the corresponding block is classified as a character block, and if the value $S^k$ is smaller than the block threshold Cth, the corresponding block is classified as a background block. FIG. 14C illustrates the classified character block. In step 570, energy ratios $R^k$ of the DCT coefficients are calculated for the blocks classified as character blocks in accordance with Equation (4). In step 580, an average energy ratio $<R^k>$ of the character blocks in the entire image is calculated by summing energy ratios of the DCT coefficients of the character blocks and averaging the sums in accordance with Equation (5). In step 590, the average energy ratio $<R^k>$ of the character blocks is compared with the threshold Bth for blurring decision in accordance with Equation (6). If the average energy ratio $<R^k>$ of the character blocks is higher than or equal to the threshold Bth, the input image is determined as a blurred image, and the procedure returns to step 510. FIG. 14D illustrates an example of the image determined as a blurred image. However, if the average energy ratio $<R^k>$ of the character blocks is lower than the threshold Bth, the input image is determined as a non-blurred image, and the procedure proceeds to step 600 where the decision result is reported to the character recognition part 50. The character recognition part 50 then performs an operation of recognizing characters in the image received from the input part 10. FIG. 14E illustrates an example of an image determined as a recognizable image by the blurring decision part 20.

Second, a detailed structure of the object skew correction part 60 shown in FIGS. 2, 4, 6 and 7 will now be described herein below with reference to FIG. 15.

Figure 15:
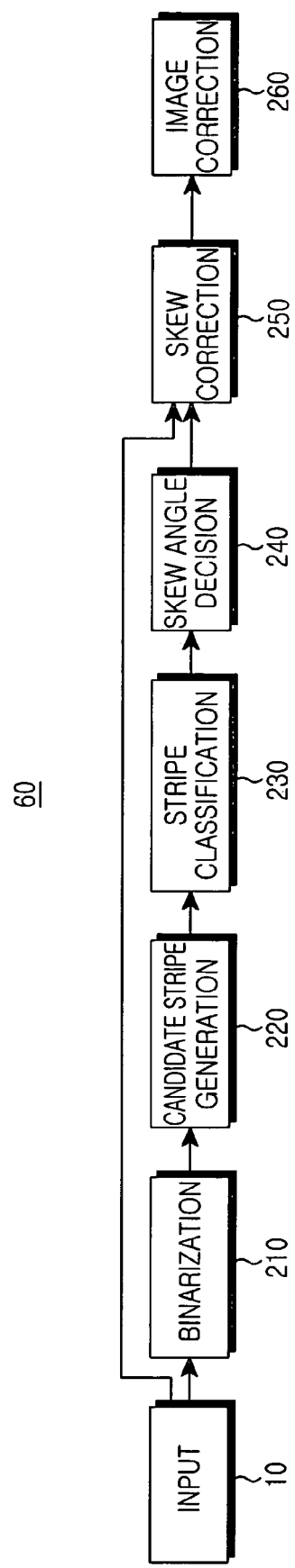
FIG. 15 is a block diagram illustrating an example of a detailed structure of the object skew correction part according to an embodiment of the present invention.

FIG. 15 is a block diagram illustrating an example of a detailed structure of the object skew correction part 60 according to an embodiment of the present invention. Referring to FIG. 15, a binarization part 210 divides an image received from the input part 10 into blocks having a predetermined size, classifies the divided blocks into character blocks and background blocks by analyzing pixels included in the divided blocks, and then binarizes the pixels in each of the blocks. The binarization part 210 classifies the blocks into character blocks and background blocks in order to binarize a region where characters are included and then classify character strings using the binarization result. As mentioned above, it is assumed herein that each of the blocks has a size of 8×8 pixels.

A candidate stripe generation part 220 performs dilation on a region of the character blocks and then generates candidate stripes in which neighboring characters are connected. The candidate stripe generation part 220 performs dilation on the region of the binarized character blocks and then generates candidate stripes in which neighboring characters are connected. Further, the candidate stripe generation part 220 performs erosion in the region of the character blocks in order to prevent the candidate stripes neighboring up and down in the dilation process from being connected with each other.

A stripe classification part 230 classifies stripes having a predetermined size or above among the candidate stripes. The stripe classification part 230 calculates a blob size and/or eccentricity using instances of the binarized candidate stripes and then classifies the stripes having the predetermined size or above. The stripes are used as objective signals for calculating a direction angle of an object contained in the image, skewed with respect to a horizontal axis of the image. That is, the stripe classification part 230 performs a function of classifying stripes for calculating a direction angle using the stripe where the binarized characters are connected to each other.

A skew angle decision part 240 calculates direction angles of the classified stripes, accumulates count values of the direction angles angle by angle, selects a direction angle having the largest count value, and determines the selected direction angle as a skew angle of a skewed object in the image. The skew angle decision part 240 calculates the direction angles of the character strings, accumulates the count values of direction angles angle by angle, and determines a direction angle having the largest count value as a skew angle.

A skew correction part 250 receives an input image signal output from the input part 10, and rotates the image signal by the skew angle determined by the skew angle decision part 240 to correct a skew of an object in the input image.

An image correction part 260 inserts an image signal into corners of the skew-corrected image. If the skew correction part 250 corrects the skew of the object in the image, regions having no pixel occur due to the rotation of the image. The image correction part 260 performs a function of filling specified pixels in an empty region of the image, caused by the skew correction. Because the specified pixels are not related to characters, an output of the skew correction part 250 does not affect the process of recognizing characters in the image.

An output of the skew correction part 250 or the image correction part 260 can be output to the ROC extension part 70, the noise reduction part 30, or the image binarization part 40.

Figure 16:
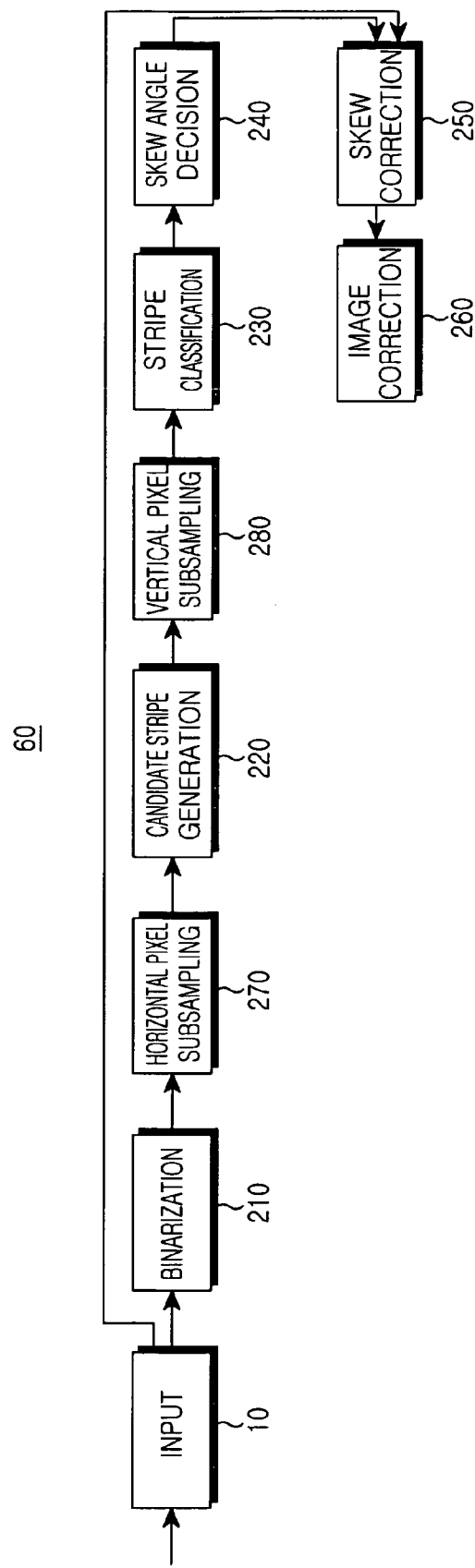
FIG. 16 is a block diagram illustrating another example of a detailed structure of the object skew correction part according to an embodiment of the present invention.

FIG. 16 is a block diagram illustrating another example of a detailed structure of the object skew correction part 60 according to an embodiment of the present invention. Referring to FIG. 16, the binarization part 210 divides an image received from the input part 10 into blocks having a predetermined size, classifies the divided blocks into character blocks and background blocks by analyzing pixels included in the divided blocks, and then binarizes the pixels in each of the blocks. The binarization part 210 classifies the blocks into character blocks and background blocks in order to binarize a region where characters are included and then classify character strings using the binarization result. As mentioned above, it is assumed herein that each of the blocks has a size of 8×8 pixels.

A horizontal pixel subsampling part 270 performs horizontal subsampling on the binarized image to reduce horizontal pixels of the image. The horizontal pixel subsampling part 270 reduces the horizontal pixels in order to generate candidate stripes such that character strings are densely combined in the horizontal direction.

The candidate stripe generation part 220 performs dilation on a region of the character blocks and then generates candidate stripes in which neighboring characters are connected. The candidate stripe generation part 220 performs dilation on the region of the binarized character blocks and then generates candidate stripes in which neighboring characters are connected. Further, the candidate stripe generation part 220 performs erosion on the region of the character blocks in order to prevent the candidate stripes neighboring up and down in the dilation process from being connected with each other.

A vertical pixel subsampling part 280 performs vertical subsampling on the image converted into the candidate stripes at a reduction ratio of the horizontal pixels, to reduce vertical pixels. The vertical pixel subsampling part 280 recovers an original aspect ratio from an aspect ratio changed due to the horizontal subsampling by the horizontal pixel subsampling part 270. Even though the horizontal pixels are increased in number, the vertical pixel subsampling part 280 can perform the same function.

The stripe classification part 230 classifies stripes having a predetermined size or above among the vertical-subsampled candidate stripes. The stripe classification part 230 calculates a blob size and/or eccentricity using moments of the binarized candidate stripes and then classifies the stripes having the predetermined size or above. The stripes are used as objective signals for calculating a direction angle of an object in the image, skewed with respect to a horizontal axis of the image. That is, the stripe classification part 230 performs a function of classifying stripes for calculating a direction angle using the stripe in the form where the binarized characters are connected to each other.

The skew angle decision part 240 calculates direction angles of the classified stripes, accumulates count values of the direction angles angle by angle, selects a direction angle having the largest count value, and determines the selected direction angle as a skew angle of a skewed object in the image. The skew angle decision part 240 calculates the direction angles of the stripes, accumulates the count values of direction angles angle by angle, and determines a direction angle having the largest count value as a skew angle.

The skew correction part 250 receives an input image signal output from the input part 10, and rotates the image signal by the skew angle determined by the skew angle decision part 240 to correct a skew of an object in the input image.

The image correction part 260 inserts an image signal into corners of the skew-corrected image. If the skew correction part 250 corrects the skew of the object in the image, regions having no pixel occur due to the rotation of the image. The image correction part 260 performs a function of filling specified pixels in an empty region of the image, caused by the skew correction. Because the specified pixels are not related to characters, an output of the skew correction part 250 does not affect the process of recognizing characters in the image.

An output of the skew correction part 250 or the image correction part 260 can be output to the ROC extension part 70, the noise reduction part 30, or the image binarization part 40.

An operation of the object skew correction part 60 shown in FIGS. 15 and 16 will now be described in detail. For simplicity, an operation of only the object skew correction part 60 shown in FIG. 16 will be described herein.

An input image has a size of N×M pixels. In the embodiment of the present invention, it is assumed that the input image has a size of 640 (N)×480 (M) pixels. In addition, the input image can be a color image or a gray image having no color information. In the embodiment of the present invention, it is assumed that the input image is a gray image.

The binarization part 210 divides the input image into blocks, classifies the blocks into character blocks and background blocks, and binarizes classified block images.

Figure 17:
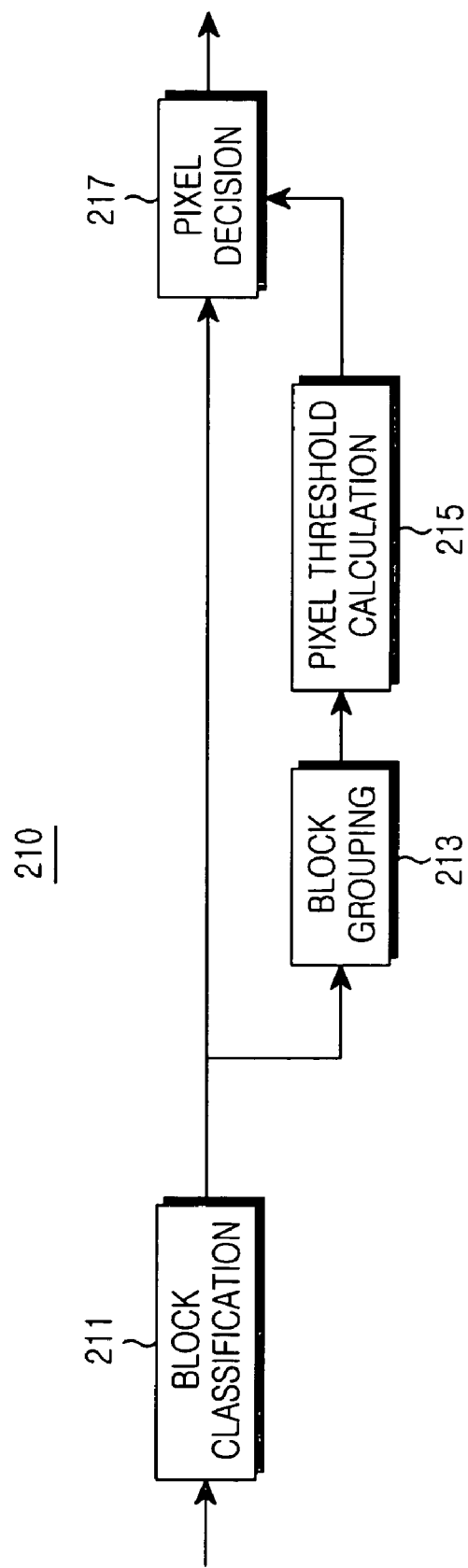
FIG. 17 is a block diagram illustrating a detailed structure of the binarization part shown in FIGS. 15 and 16 according to an embodiment of the present invention.

FIG. 17 is a block diagram illustrating a detailed structure of the binarization part 210 according to an embodiment of the present invention. The binarization part 210 divides the input image into blocks having a predetermined size, classifies the blocks into character blocks and background blocks, and binarizes pixels of the classified block images into character pixels and background pixels. The binarization part 210 classifies the blocks into the character blocks and background blocks and then binarizes the block image pixels in order to detect a skew angle of an object in the image by detecting direction angles of character strings in the process of correcting the skew of the object in the image.

Referring to FIG. 17, a block classification part 211 divides the input image into blocks having a preset size, and classifies the divided blocks into character blocks and background blocks. A block grouping part 213 groups each of the character blocks with its 8 adjacent blocks, and a pixel threshold calculation part 215 generates a threshold from the grouped blocks. A pixel decision part 217 collectively converts pixels of the background blocks output from the block classification part 211 into background pixels having a second brightness value using the threshold output from the pixel threshold calculation part 215. The pixel decision part 217 binarizes the pixels of the character blocks into character pixels having a first brightness value and background pixels having the second brightness value based on the threshold.

Figure 18:
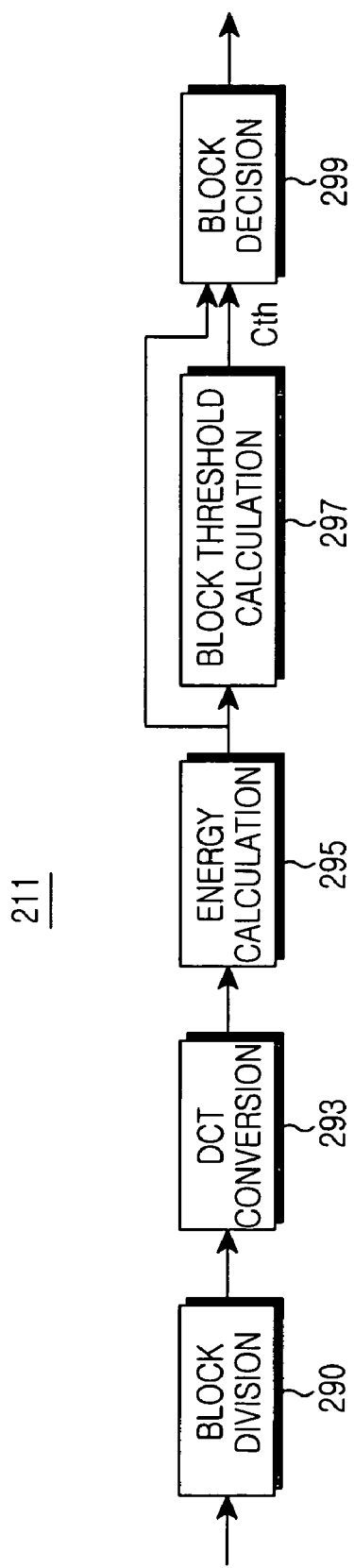
FIG. 18 is a block diagram illustrating a detailed structure of the block classification part shown in FIG. 17 according to an embodiment of the present invention.

FIG. 18 is a block diagram illustrating a detailed structure of the block classification part 211 shown in FIG. 17 according to an embodiment of the present invention. Referring to FIG. 18, the block classification part 211 can be identical in structure to the block classification part 110 of the blurring decision part 20. Therefore, the block classification part 211 of FIG. 18 has the same structure as the block classification part 110 of FIG. 9. Also, the block classification part 211 is identical to the block classification part 110 in the operation of classifying blocks in an image. Therefore, a detailed discussion of FIG. 18 is not necessary since the components of FIG. 18 are discussed above with reference to FIG. 9.

The pixels of character blocks classified by the block classification part 211 can have gray levels between 0 and 255. An image of a character block output from the block classification part 211 is input to the block grouping part 213 and the pixel decision part 217.

The classified blocks output from the block classification part 211 are applied to the block grouping part 213. At this time, the binarization part 210 collectively converts the background blocks into background pixels having a predetermined brightness value in order to classify character strings of the image. Therefore, it is assumed that the binarization part 210 does not perform block grouping and threshold calculation operations on the background blocks.

The block grouping part 213 groups each of the character blocks output from the block classification part 211 with its 8 adjacent blocks, generating a grouped block having a size of 24×24 pixels. The character block has a size of 8×8 pixels. If a threshold for distinguishing background pixels from character pixels is determined using only one character block having such a size and a binarization process is performed based on the determined threshold, discontinuity between blocks in the binarized image can occur as a size of a block is very small and a difference between the threshold and adjacent character block values is very large. Thus, it is possible to improve binarization reliability by generating the grouped block to extend a region on which binarization is to be performed.

The pixel threshold calculation part 215 calculates a pixel threshold Pth for classifying each pixel of the character block as a character or background pixel. The pixel threshold calculation part 215 generates the pixel threshold Pth, and the pixel threshold Pth is used for classifying each pixel of the character block as a character or background pixel and binarizing the character or background pixel. The pixel threshold Pth can be selected using Otsu's method or Kapur's method that selects a gray value having the maximum between-class variance between two types of pixels. It is assumed that the pixel threshold Pth is calculated using Otsu's method. The calculation of the pixel threshold Pth using Otsu's method is based on Equation (7) below. The method proposed by N. Otsu is disclosed in "A Threshold Selection Method from Gray-Level Histograms", *IEEE Trans. Systems, Man and Cybernetics*, Vol. SMC-9, No. 1, pp. 62-66, January 1979, which is incorporated herein by reference.

$$Th_1 = \arg\max_T \sigma_B^2(T) \tag{7}$$

$$\sigma_B^2(T) = P_1(\mu_1(T)-\mu)^2 + P_2(T)(\mu_2(T)-\mu)^2$$

$$= P_1(T)P_2(T)(\mu_1(T)-\mu_2(T))^2$$

$\sigma_B^2(T)$: between-class variance $T$: gray value $\mu$: mean of the total pixels $\mu_i(T)$: mean of each class defined by $T$ $P_i(T)$: relative frequency of each class The pixel decision part 217 binarizes the character block pixels output from the block classification part 211 into character and background pixels using the pixel threshold Pth, and collectively binarizes the background block pixels into background pixels. In other words, the pixel decision part 217 compares the pixel threshold Pth corresponding to the received character block image with values of the character block pixels, classifies image pixels as character pixels if the values of the character block pixels are equal to or larger than the pixel threshold Pth, and classifies image pixels as background pixels if the values of the character block pixels are smaller than the pixel threshold Pth. The pixel decision part 217 performs a binarization operation by converting the character pixels into pixels having a brightness value "α" and converting the background pixels into pixels having a brightness value "β" according to the classification results. A method for binarizing character block pixels by the pixel decision part 217 is defined as $$y_B(m,n) = \begin{cases} \alpha, & \text{if } y(m,n) \geq Pth \\ \beta, & \text{otherwise} \end{cases} \tag{8}$$

In Equation (8), y(m, n) denotes pixels of the character block output from the block classification part 211, Pth is the pixel threshold, and $y_B$ (m, n) denotes pixels of the binarized character blocks.

The pixel decision part 217 receives pixels of the background block output from the block classification part 211, and collectively converts the background block pixels into pixels having the brightness value "β".

The image binarized by the binarization part 210 can be input to the candidate stripe generation part 220 or the horizontal pixel subsampling part 270. Here, it is assumed that the binarized image is input to the horizontal pixel subsampling part 270.

The horizontal pixel subsampling part 270 performs horizontal subsampling on the binarized image at a preset ratio. Assuming that a subsampling ratio is 2:1, the horizontal pixel subsampling part 270 performs horizontal subsampling on the binarized image at the subsampling ratio of 2:1, to reduce the number of horizontal pixels of the binarized image by ½. The horizontal pixels are reduced in order to allow the candidate stripe generation part 220 to densely arrange character strings in the form of a stripe.

The candidate stripe generation part 220 receives the binarized image output from the binarization part 210 or receives the horizontally-subsampled binarized image output from the horizontal pixel subsampling part 270. The candidate stripe generation part 220 makes stripes out of the characters in the received image. The candidate stripe generation part 220 can be implemented by a morphological filter consisting of a dilation part and an erosion part. The morphological filter performs dilation and erosion on a character region so that characters are close to one another. The dilation part performs dilation on the binarized character region, such that neighboring characters are close to one another generating character strings in which characters are close to one another. Here, the generated character strings will be referred to as "candidate stripes." The erosion part performs erosion on the generated candidate stripes. Adjacent up and down candidate stripes connected by the dilation operation can be separated by the erosion operation. Such a morphological filter is disclosed in a reference entitled "Digital Image Processing," by R. C. Gonzalez, R. Woods, et al., $2^{nd}$ ed., Prentice Hall, pp. 519-560, 2002, which is incorporated herein by reference.

The vertical pixel subsampling part 280 vertically subsamples the image output from the candidate stripe generation part 220 at a preset ratio. Here, it is assumed that a subsampling ratio is 2:1 like in the horizontal pixel subsampling part 270. The vertical pixel subsampling part 280 can be used for converting the ratio of width to length of the image reduced by the horizontal pixel subsampling into an original image aspect ratio. The vertical pixel subsampling part 280 vertically reduces the image by ½ to output the reduced image. Here, a horizontal pixel extension part can be used in place of the horizontal pixel subsampling part 280, so as to achieve size restoration to the original image.

The stripe classification part 230 can receive a binarized image output from the binarization part 210, an image output from the candidate stripe generation part 220, or an image output from the vertical pixel subsampling part 280. Here, it is assumed that the stripe classification part 230 receives the image output from the vertical pixel subsampling part 280.

The stripe classification part 230 labels stripe numbers for the candidate stripes generated from the binarized image. The candidate stripes having the labeled stripe numbers are used for calculating a direction angle. The stripe classification part 230 analyzes the candidate stripes having the labeled stripe numbers, and detects stripes having a predetermined length or above and having a long shape. The candidate stripe classification method uses a blob size and eccentricity based on a moment. Equation (9) below defines a centroid moment to be used for calculating a blob size and eccentricity, the blob size is calculated at p=0 and q=0 in Equation (9). Equation (10) shows a method for calculating the eccentricity using the centroid moment. The eccentricity calculation method is disclosed in a reference entitled "Digital Image Processing Algorithms," by Pitas, Prentice Hall, pp. 326-331, 1993, which is incorporated herein by reference.

$$\mu_{pq} = \sum_x \sum_y (x - \bar{x})^p (y - \bar{y})^q \tag{9}$$

$\bar{x}$: horizontal centroid of object
$\bar{y}$: vertical centroid of object $$e = \frac{4\mu_{11}^2 + (\mu_{20} - \mu_{02})^2}{(\mu_{20} + \mu_{02})^2} \tag{10}$$

In Equation (10), the eccentricity e denotes a length of a candidate stripe.

The blob size $\mu(=\mu_{00})$ and eccentricity e calculated by Equations (9) and (10) are compared with preset thresholds μth and eth, respectively, to select candidate stripes as valid stripes. Here, the thresholds μth and eth are experimentally calculated. Where μ≧μth and/or e≧eth, a corresponding candidate stripe is classified as a valid stripe. However, when any one or both of the blob size μ and the eccentricity e are smaller than their thresholds μth and eth, the candidate stripe is not selected as a valid stripe. Under this condition, it is determined that the corresponding candidate stripe is not appropriate for calculation of a direction angle, so the stripe is not selected as a valid stripe. In the embodiment of the present invention, a candidate stripe satisfying both of the conditions of μ≧μth and e≧eth is selected as a valid stripe. In an alternative embodiment of the present invention, a candidate stripe satisfying any one of the conditions can also be determined as a valid stripe.

Figure 19:
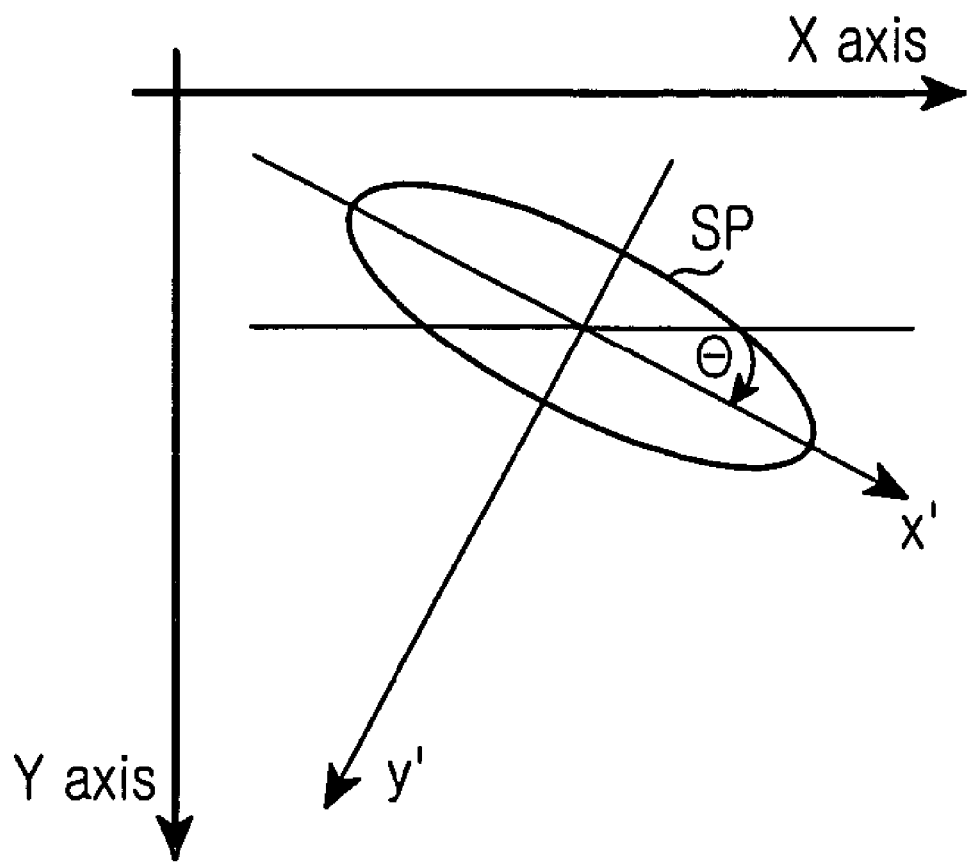
FIG. 19 is a diagram illustrating a procedure for calculating a skew angle of a stripe by the skew angle decision part of FIGS. 15 and 16 according to an embodiment of the present invention.
Figure 20:
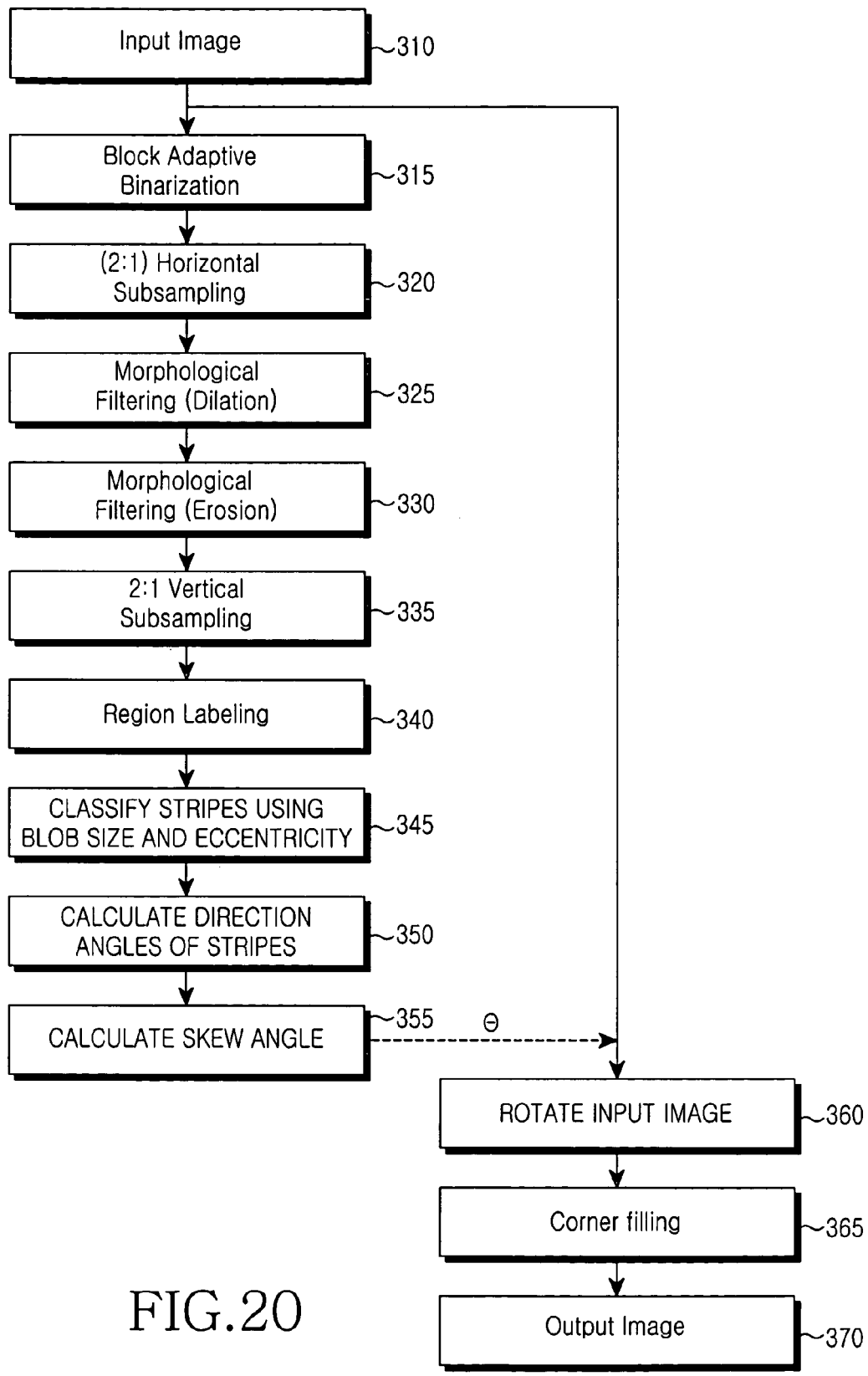
FIG. 20 is a flowchart illustrating a procedure for correcting a skew of an object in an image using an object skew correction part according to an embodiment of the present invention.

The stripes classified by the stripe classification part 230 are input to the skew angle decision part 240, and the skew angle decision part 240 calculates a direction angle θ for each of the classified stripes, and accumulates count values of calculated direction angles. A direction angle having the largest count value is determined as a skew angle. FIG. 19 is a diagram illustrating a procedure for calculating a skew angle of a stripe by the skew angle decision part 240 according to an embodiment of the present invention. In FIG. 19, SP denotes a stripe classified by the stripe classification part 230, and an x' axis and a y' axis are coordinate axes indicating a position where the stripe SP is located. The skew angle decision part 240 calculates a direction angle θ between the x' axis and a real X axis for each of stripes output from the stripe classification part 230, and accumulates count values of the calculated directions angles θ. The direction angle θ for the stripe SP can be calculated by $$\theta = \frac{1}{2} \arctan\left(\frac{2\mu_{11}}{\mu_{20} - \mu_{02}}\right) \tag{11}$$

After calculating direction angles θ for all stripes, the skew angle decision part 240 analyzes the accumulated count values of direction angles θ, and determines a direction angle θ having the largest count value as a skew angle. That is, the skew angle decision part 240 determines a direction angle θ associated with the largest number of stripes as the skew angle.

If the skew angle is determined, the skew correction part 250 rotates an input image output from the input part 10 by the skew angle determined by the skew angle decision part 240 to correct a skew of image signals. In other words, the skew correction part 250 rotates the image on the basis of a rotation matrix if the skew angle is determined. Here, an inverse mapping rotation method can be used in rotating the image. The inverse mapping rotation method is disclosed in a reference entitled "Handbook of Computer Vision and Applications," by B. Jahne, et al., Academic Press, Vol. 2, pp. 94-95, 1999, and a reference entitled "Computer Vision", by L. G. Shapiro and G. C. Stockman, Prentice Hall, pp. 415-418, 2001, both of which are incorporated herein by reference.

If the skew correction part 250 rotates the image, blank spaces having no pixel are formed at the corners of the image. The blank spaces can affect the following character recognition process. The image correction part 260 performs a function of filling specified pixels in the blank spaces formed at the corners of the skew-corrected image. When filling the pixels in the blank spaces formed at the corners of the skew-corrected image, the image correction part 260 can fill the blank spaces with pixels having the pixel values closest to the blank spaces. The image correction part 260 can also collectively correct the blank spaces with a brightness value used for binarization.

When characters are recognized from the input image, stripes of character strings are extracted from the input image, direction angles are calculated according to skews of the stripes, a direction angle having the largest count value among the calculated direction angles is determined as a skew angle, and the image is rotated by the determined skew angle. In this manner, it is possible to correct the skew-corrected image. In addition, blank spaces formed at the corners of the image during skew correction are filled with pixels having a specific brightness value, contributing to an increase in a recognition rate.

A procedure for correcting a skew of an object in an image according to an embodiment of the present invention will now be described with reference to FIGS. 20 and 21A through 21H.

Figure 21A:
FIGS. 21A through 21H are diagrams illustrating images generated in each process of FIG. 20.

An image shown in FIG. 21A is received in step 310. The image shown in FIG. 21A is subject to adaptive block binarization in step 315, creating a binarized image shown in FIG. 21B. In the binarization process, the received image is divided blocks having a predetermined size, and the divided blocks are classified into character blocks and background blocks. Each of the character blocks is grouped with its 8 adjacent blocks, making a grouped block, and a pixel threshold used for classifying pixels of a block image into character pixels and background pixels is created from the grouped block. Thereafter, pixels of the classified character blocks are compared with the pixel threshold to classify the pixels into character pixels and background pixels, and all pixels of the background blocks are collectively converted into background pixels. That is, in step 315, pixels of the input image shown in FIG. 21A are binarized into character pixels and background pixels shown in FIG. 21B.

Figure 21B:
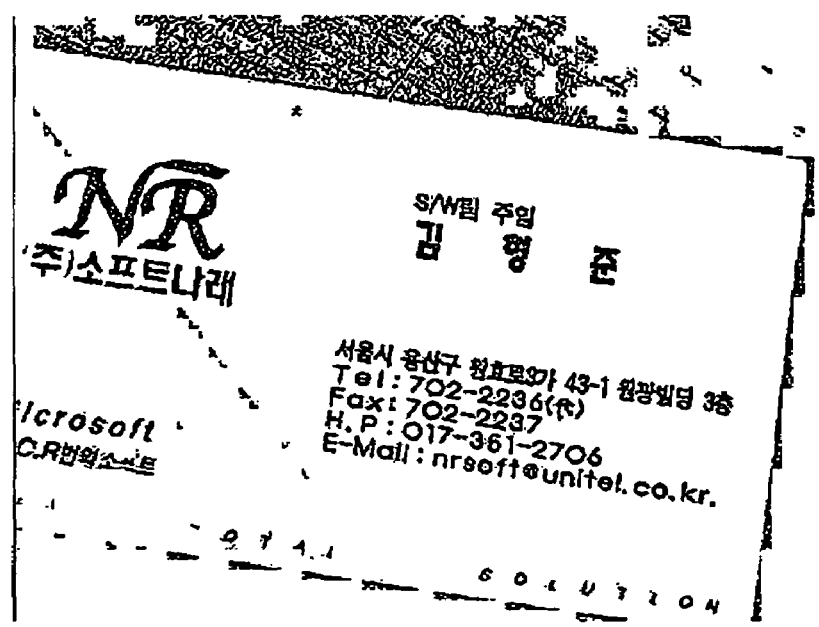
Figure 21C:
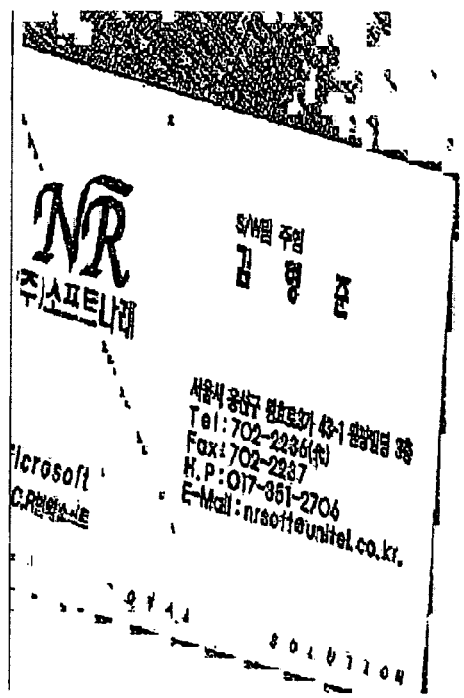
Figure 21D:
Figure 21E:
Figure 21F:
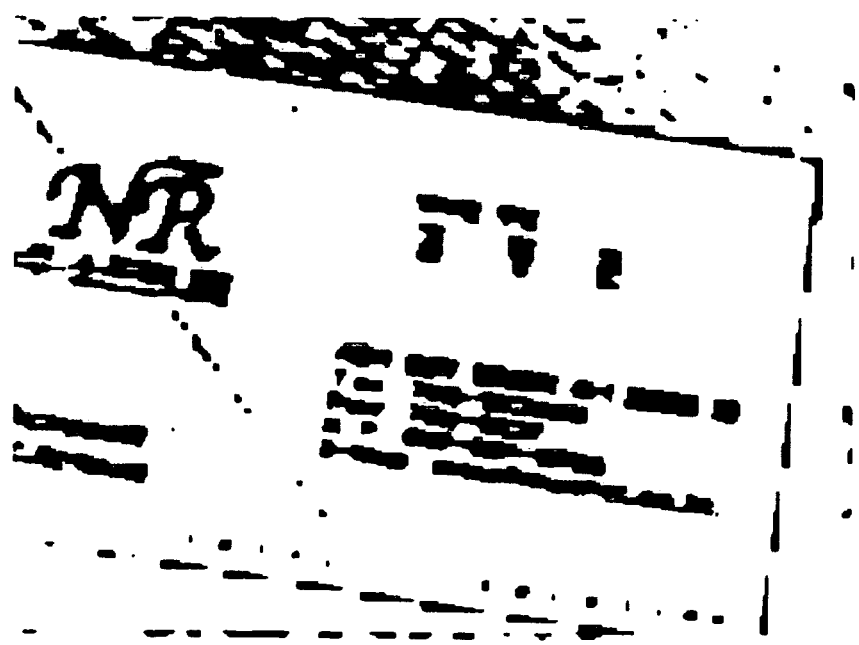

In step 320, the binarized image of FIG. 21B is converted into an image shown in FIG. 21C through horizontal subsampling. FIG. 21C illustrates a resultant image obtained by performing 2:1 horizontal subsampling on the image shown in FIG. 21B, and the reason for performing vertical pixel subsampling is to allow character strings to be appropriately arranged in the form of a stripe in the following candidate stripes generation process. Thereafter, in steps 325 and 330, the horizontal-subsampled image shown in FIG. 21C is subject to morphological filtering, creating candidate stripes. That is, in step 325, binarized character regions of the image shown in FIG. 21C undergo dilation to connect neighboring characters to each other, thereby generating candidate stripes shown in FIG. 21D. In step 330, the adjacent up and down candidate stripes connected in the dilation process are separated as shown in FIG. 21E. After the morphological filtering is performed, the image of FIG. 21E undergoes 2:1 vertical subsampling in step 335 to recover an original aspect ratio of the image. FIG. 21F illustrates a resultant image determined by performing 2:1 vertical subsampling on the morphologically-filtered binarized image. The reason for performing the vertical pixel subsampling is to calculate a skew angle of a character string from the reduced image.

In step 340, candidate stripes in the image of FIG. 21F are labeled, and in step 345, a blob size and eccentricity of each of the candidate stripes are calculated, and stripes used for calculating direction angles are selected. In step 350, direction angles of the selected stripes are calculated and count values thereof are accumulated. When the direction angles of the selected stripes are completely calculated, a direction angle having the largest count value among the accumulated direction angles is determined as a skew angle of the image in step 355.

Figure 21G:
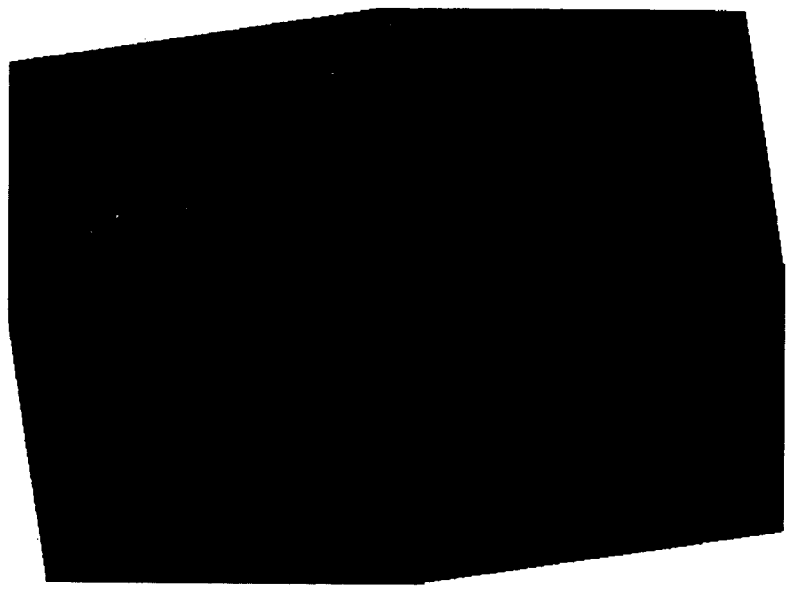
Figure 21H:

If the skew angle is determined, the input image is rotated by the skew angle in step 360 to correct a skew of the image as shown in FIG. 21G. The skew-corrected image of FIG. 21G has blank spaces at its corners in which no pixel exists due to rotation of the image. In order to correct the blank spaces, the corners of the image are filled in step 365 with a value of the horizontal pixel closest to the corners of the image as shown in FIG. 21H. Thereafter, in step 370, the skew/pixel-corrected image of FIG. 21H is output to the ROC extension part 70, the noise reduction part 30, or the image binarization part 40.

Third, a detailed structure of the ROC extension part 70 shown in FIGS. 3, 5, 6 and 7 will now be described herein below with reference to FIG. 22.

Figure 22:
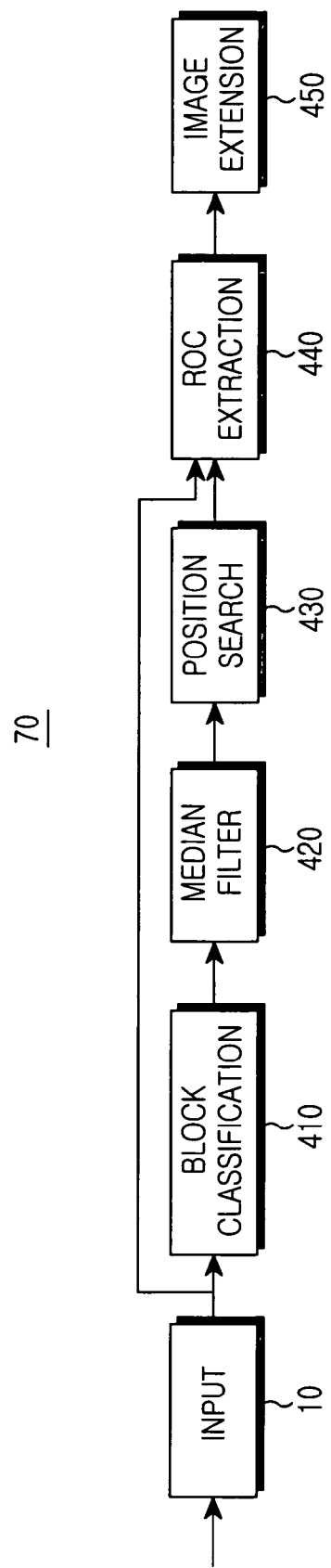
FIG. 22 is a block diagram illustrating an example of a detailed structure of a Region Of Contents (ROC) extension part according to an embodiment of the present invention.

FIG. 22 is a block diagram illustrating an example of a detailed structure of the ROC extension part 70 according to an embodiment of the present invention. Referring to FIG. 22, the ROC extension part 70 can receive an input image from the input part 10 or the object skew correction part 60. It is assumed herein that the input image is comprised of 640 (column)×480 (row) pixels.

A block classification part 410 divides the input image received from the input part 10 into blocks having a preset size, classifies the divided blocks into character blocks and background blocks by analyzing pixels included in the divided blocks, and then converts pixels in the classified character blocks into pixels having a specific value.

A median filter 420 performs median filtering on an image output from the block classification part 410 to remove a character region erroneously classified by edges or noises from the image. That is, the image after being subject to block classification can include isolated character blocks generated by edges or noises. The median filter 420 has a function of removing character blocks (isolated character blocks) erroneously classified by the noises in the block classification process.

A position search part 430 horizontally and vertically scans the median-filtered image and searches for a position of the character region. The position search part 430 horizontally scans the median-filtered image and searches for a point x1 at the leftmost character block and a point x2 at the rightmost character block. Further, the position search part 430 vertically scans the median-filtered image, and searches for a point y1 at the topmost character block and a point y2 at the bottommost character block. A position of the character region in the image is determined according to a result of the search. In this case, left top and right bottom points of the character region are (x1, y1) and (x2, y2). The left top and right bottom points (x1, y1) and (x2, y2) of the character region are determined based on an aspect ratio of the input image, such that distortion of the image can be prevented when an image extension part 450 extends the image.

An ROC extraction part 440 extracts an image of the character region searched by the position search part 430. In other words, the ROC extraction part 440 receives information on the left top and right bottom points (x1, y1) and (x2, y2) of the character region searched by the position search part 430, and extracts an image located between the left top and right bottom points (x1, y1) and (x2, y2) of the character region from the input image. As a result, an image output from the ROC extraction part 440 becomes an image of the character region in which a background region is removed from the input image.

The image extension part 450 extends the image of the extracted character region to a size of the input image. The image extension can be implemented by interpolation. It is assumed herein that the image extension is implemented by bilinear interpolation. Here, the image extension is achieved by the interpolation operation so that a size of the extracted character region can be equal to that of the input image.

An image output from the image extension part 450 is applied to the noise reduction part 30 or the image binarization part 40.

Figure 23:
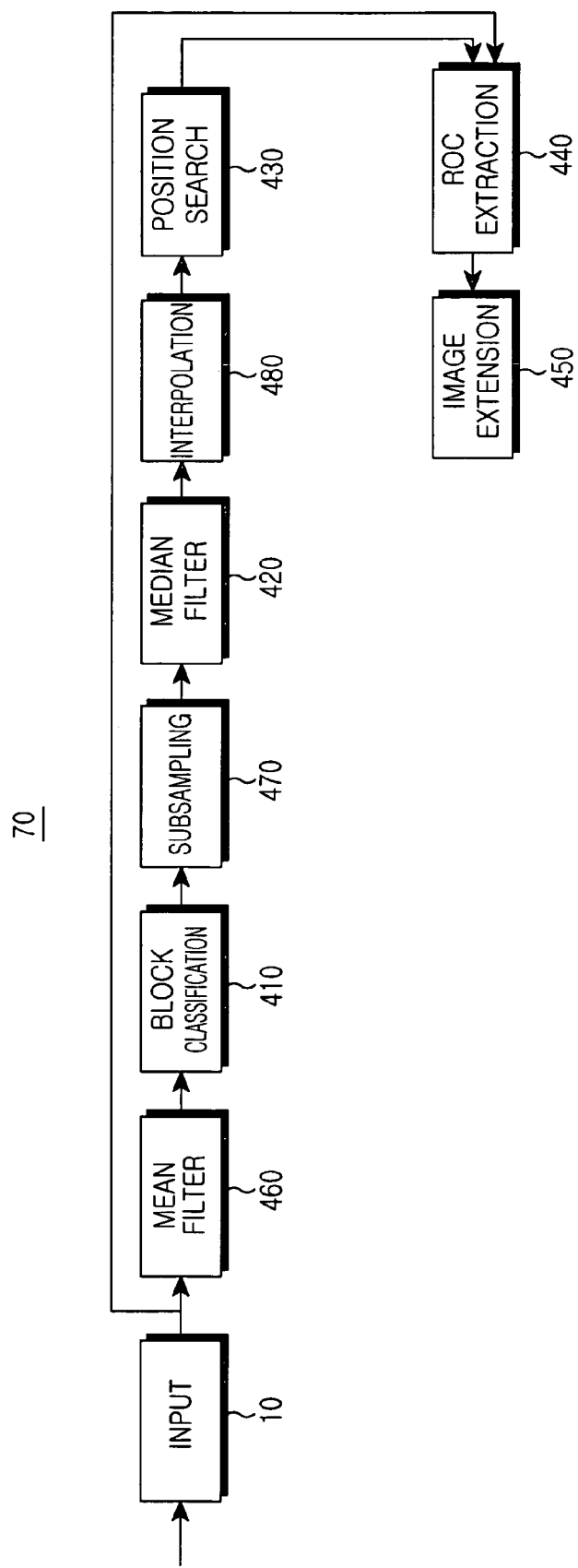
FIG. 23 is a block diagram illustrating another example of a detailed structure of the ROC extension part according to an embodiment of the present invention.

FIG. 23 is a block diagram illustrating another example of a detailed structure of the ROC extension part 70 according to an embodiment of the present invention. Referring to FIG. 23, the ROC extension part receives an input image from the input part 10 or the object skew correction part 60. It is assumed herein that the input image is comprised of 640 (column)×480 (row) pixels.

A mean filter 460 performs mean filtering on the input image to blur the input image. The mean filtering is performed to reduce the influence of a background region outside a character region in the following block classification process by blurring the input image.

The block classification part 410 divides an image output from the mean filter 460 into blocks having a predetermined size, analyzes pixels included in the divided blocks, classifies the blocks into character blocks and background blocks according to the analysis result, and converts pixels in the character blocks into pixels having a specified value. The block classification part 410 classifies the blocks into the character blocks and background blocks in order to extract a character region by converting the pixels in the character blocks into the pixels having a specified value. Here, it is assumed that each of the blocks consists of 8×8 pixels.

A subsampling part 470 subsamples an image output from the block classification part 410 to reduce the number of image pixels. The subsampling part 470 reduces the number of image pixels in order to increase a filtering rate by decreasing a filter window in the following median filtering process. In the embodiment of the present invention, it is assumed that a pixel reduction ratio is $(2:1)^2$. In this case, the subsampling part 470 performs 2:1 subsampling on horizontal pixels and performs 2:1 subsampling on vertical pixels, such that the number of pixels in the image is reduced to ¼ of the input image.

The median filter 420 performs median filtering on an image output from the subsampling part 470 to remove erroneously classified character blocks from the input image. The median filter 420 performs a function of removing the isolated character blocks erroneously classified as character blocks due to noises in the block classification process.

An interpolation part 480 performs interpolation on pixels in an image output from the median filter 420 to extend the image. In the embodiment of the present invention, it is assumed that an interpolation ratio is $(2:1)^2$. In this case, the interpolation part 480 performs 2:1 interpolation on horizontal and vertical pixels of the image output from the median filter 420 to extend the image four times. The interpolation operation is performed to extend a size of the image reduced by the subsampling process to that of an original image in order to search for a correct position of the character region.

The position search part 430 horizontally and vertically scans the median-filtered image to search for a position of the character region. The position search part 430 horizontally scans the median-filtered image to search for a point x1 at the leftmost character block and a point x2 at the rightmost character block. Further, the position search part 140 vertically scans the median-filtered image to search for a point y1 at the topmost character block and a point y2 at the bottommost character block. A position of the character region in the image is determined according to a result of the search. At this time, left top and right bottom points of the character region are (x1, y1) and (x2, y2). The left top and right bottom points (x1, y1) and (x2, y2) of the character region are determined based on an aspect ratio of the input image, such that the distortion of the image can be prevented when the following image extension part 450 extends the image.

The ROC extraction part 440 extracts an image of the character region searched by the position search part 430. The ROC extraction part 440 receives information on the left top and right bottom points (x1, y1) and (x2, y2) of the character region searched by the position search part 430, and extracts an image located between the left top and right bottom points (x1, y1) and (x2, y2) of the character region from the input image output. As a result, an image output from the ROC extraction part 440 becomes an image of the character region in which a background region is removed from the input image.

The image extension part 450 extends an image of the extracted character region to a size of the input image. The image extension can be implemented by interpolation. It is assumed herein that the image extension is implemented by bilinear interpolation. Here, the image extension is achieved by the interpolation operation so that a size of the image of the extracted character region can be equal to that of the input image.

An image output from the image extension part 450 is applied to the noise reduction part 30 or the image binarization part 40.

Operation of the ROC extension device illustrated in FIG. 23 will now be described. The ROC extension device of FIG. 23 further includes the mean filter 460 in front of the block classification part 410, the subsampling part 470 in front of the median filter 420, and the interpolation part 480 after the median filter 420, compared with the ROC extension device illustrated in FIG. 22. The other components of the ROC extension part 70 in FIG. 23 are identical in operation to those of the ROC extension part 70 in FIG. 22.

Herein, an operation of the ROC extension part 70 will be described in detail with reference to FIG. 23.

An input image has a size of N×M pixels. As mentioned above, it is assumed herein that the image has a size of 640 (N)×480 (M) pixels. The input image can be a color image or grayscale image having no color information. In the embodiment of the present invention, it is assumed that the image is a grayscale image.

The mean filter 460 receiving the input image performs mean filtering on the input image, making a blurred image so that the background region outside the character region of the image does not affect a character region classification process by the following block classification part 410. Such a mean filter is disclosed in a reference entitled "Digital Image Processing," by R. C. Gonzalez, R. Woods, et al., 2nd ed., Prentice Hall, pp. 119-123, 2002, which is incorporated herein by reference.

The mean-filtered image is applied to the block classification part 410. The block classification part 410 divides an image output from the mean filter 460 into blocks having a predetermined size, analyzes pixels contained in the blocks, classifies the blocks into character blocks and background blocks according to the analysis result, and converts pixels of the classified character blocks into pixels having a specified value.

Figure 24:
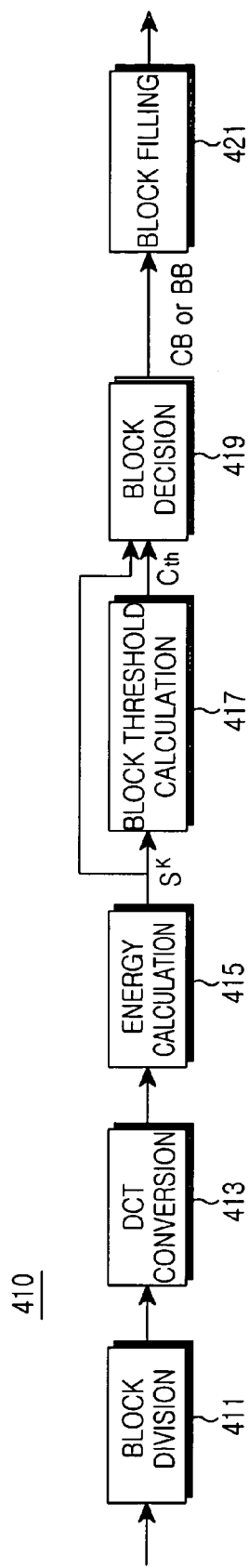
FIG. 24 is a block diagram illustrating a detailed structure of the block classification part shown in FIGS. 22 and 23 according to an embodiment of the present invention.

FIG. 24 is a block diagram illustrating a detailed structure of the block classification part 410 shown in FIGS. 22 and 23 according to an embodiment of the present invention. The block classification part 410 can be constructed in the same way as the block classification part 110 of the blurring decision part 20. Therefore, the block classification part 410 of FIG. 24 is identical to the block classification part 110 of FIG. 9 not only in structure but also in an operation of classifying blocks in the image. Therefore, a detailed discussion of FIG. 24 is not necessary since the components of FIG. 24 are discussed above with reference to FIG. 9.

Pixels in the character blocks classified by a block decision part 419 can have gray levels between 0 and 255. A block filling part 421 then converts pixels of a character block classified by the block decision part 419 into pixels having a first brightness value, and converts pixels of a background block into pixels having a second brightness value. In the embodiment of the present invention, it is assumed that the block filling part 421 converts the pixels in the character block into white pixels, and converts the pixels in the background block into black pixels. Thus, the block filling part 421 fills the character blocks of the image with the white pixels and fills the background blocks of the image with the black pixels. In this manner, the block classification part 410 classifies the blocks into character blocks and background blocks and then fills the character blocks and background blocks with pixels having different brightness values, in order to appropriately display character regions.

Thereafter, the subsampling part 470 subsamples an image output from the block classification part 410 to reduce the number of horizontal and vertical pixels. The subsampling part 470 reduces the number of image pixels in order to increase a filtering rate by decreasing a filter window in the following median filtering process by the median filter 420. In the embodiment of the present invention, it is assumed that the subsampling ratio is $(2:1)^2$. In this case, the number of pixels of the image output from the block classification part 410 is reduced to ¼. That is, a size of the reduced image is 320×240 pixels.

Then the median filter 420 performs median filtering on an output image of the subsampling part 470 to remove background blocks and incorrectly classified character blocks from the input image. The median filter 420 performs a function of removing the isolated blocks erroneously classified as character blocks due to the noise in the block classification process. Such a median filter is disclosed in a reference entitled "Fundamental of Digital Image Processing," by A. K. Jain, Prentice Hall, pp. 246-249 which is incorporated herein by reference.

After the image is median-filtered, the interpolation part 480 performs interpolation on horizontal and vertical pixels of an image output from the median filter 420 to extend the image to a size of the input image. In the embodiment of the present invention, it is assumed that an interpolation ratio is $(2:1)^2$. The interpolation operation is performed to extend a size of the image reduced by the subsampling process to that of an original image in order to search for a correct position of the character region.

The position search part 430 horizontally and vertically scans the median-filtered image to search for a position of the character region. The position search part 430 horizontally scans the median-filtered image to search for a point x1 at the leftmost character block and a point x2 at the rightmost character block, and stores a result of the search. Further, the position search part 430 vertically scans the median-filtered image to search for a point y1 at the topmost character block and a point y2 at the bottommost character block, and stores a result of the search. The left top and right bottom points (x1, y1) and (x2, y2) of the character region in the image are determined according to the results of the searches. The left top and right bottom points (x1, y1) and (x2, y2) of the character region are determined based on an aspect ratio of the input image, such that distortion of the image can be prevented when the following ROC extension part 70 extends the image. In the embodiment of the present invention, since a ratio of width to length of the input image is 4:3 (i.e., 640:480 pixels), the left top and right bottom points (x1, y1) and (x2, y2) of the character region are determined so that a ratio of width to length of the character region searched by the position search part 430 also becomes 4:3.

The ROC extraction part 440 extracts an image of the character region searched by the position search part 430. That is, the ROC extraction part 440 receives information on the left top and right bottom points (x1, y1) and (x2, y2) of the character region searched by the position search part 430, and extracts an image located between the left top and right bottom points (x1, y1) and (x2, y2) of the character region from the input image output from the input part 10. On the basis of the left top and right bottom points (x1, y1) and (x2, y2) of the character region, the ROC extraction part 440 extracts, as character region pixels, pixels arranged between the point x1 and the point x2 in the horizontal direction and pixels arranged between the point y1 and the point y2 in the vertical direction from the image. An image output from the ROC extraction part 440 becomes an image of the character region in which a background region is removed from the input image.

The image extension part 450 extends an image of the extracted character region to a size of the input image. The image extension can be implemented by interpolation. In the embodiment of the present invention, it is assumed that the image extension is implemented by bilinear interpolation defined as $$v(x,y)=(1-\Delta x)(1-\Delta y)u(m,n)+(1-\Delta x)\Delta y\, u(m,n+1)+\Delta x(1-\Delta y)u(m+1,n)+\Delta x\Delta y\, u(m+1,n+1)$$

where $\Delta x = x-m$ $$\Delta y = y-n \quad (12)$$

Here, the image extension is achieved by the interpolation operation so that a size and aspect ratio of the image of the extracted character region can be equal to that of the input image. The bilinear interpolation is disclosed in a reference entitled "Numerical Recipies in C," by W. H. Press, S. A. Teukolsky, et al., 2nd ed., Cambridge, pp. 123-125, 1988, which is incorporated herein by reference.

The ROC-extended image can be applied to the noise reduction part 30 or the image binarization part 40.

Figure 25:
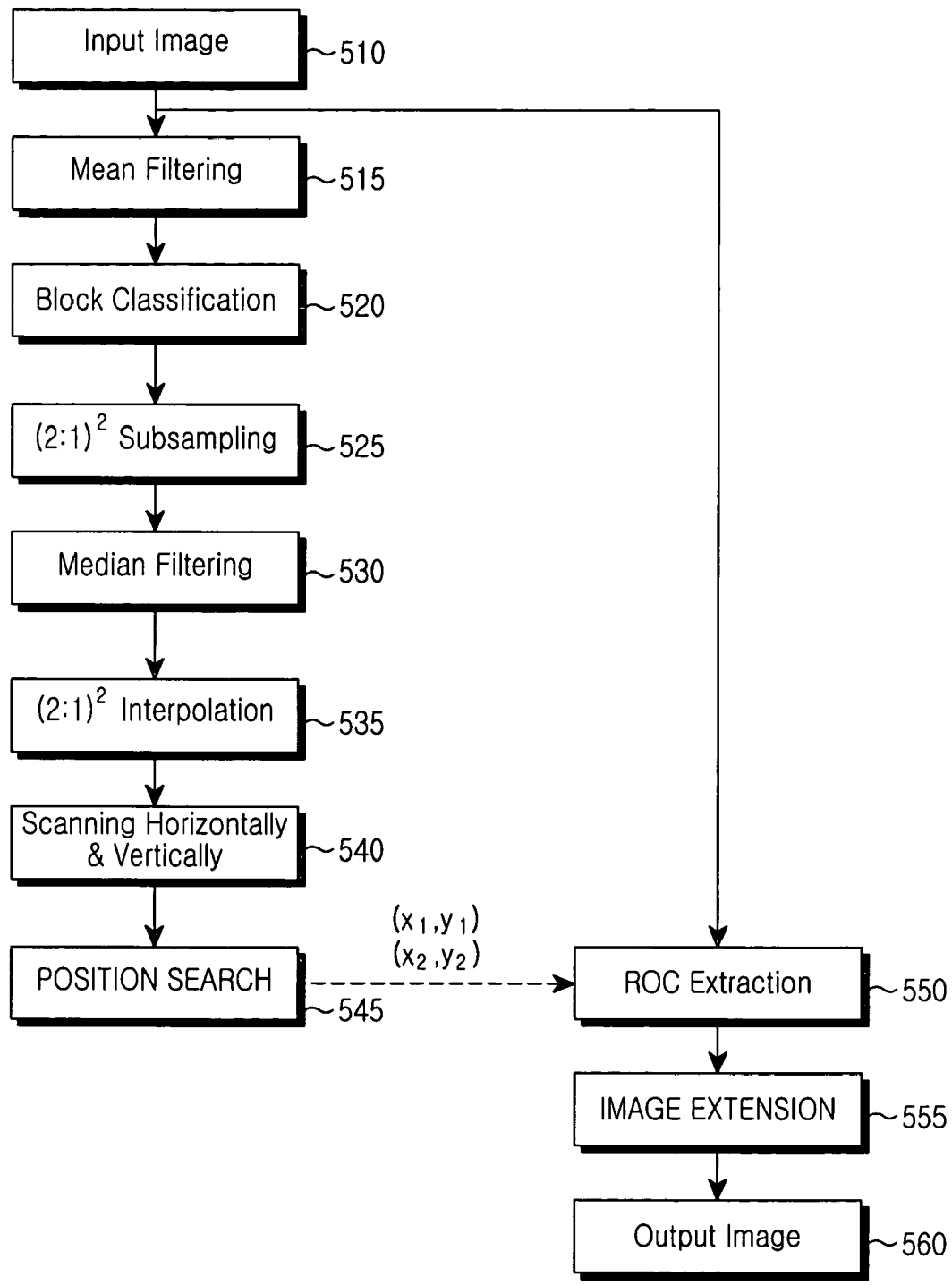
FIG. 25 is a flowchart illustrating a procedure for extending a character region in an image by the ROC extension part according to an embodiment of the present invention.

FIG. 25 is a flowchart illustrating a procedure for extending a character region in an image according to an embodiment of the present invention. FIGS. 26A through 26H are diagrams illustrating images generated in the procedure of FIG. 25.

Figure 26A:
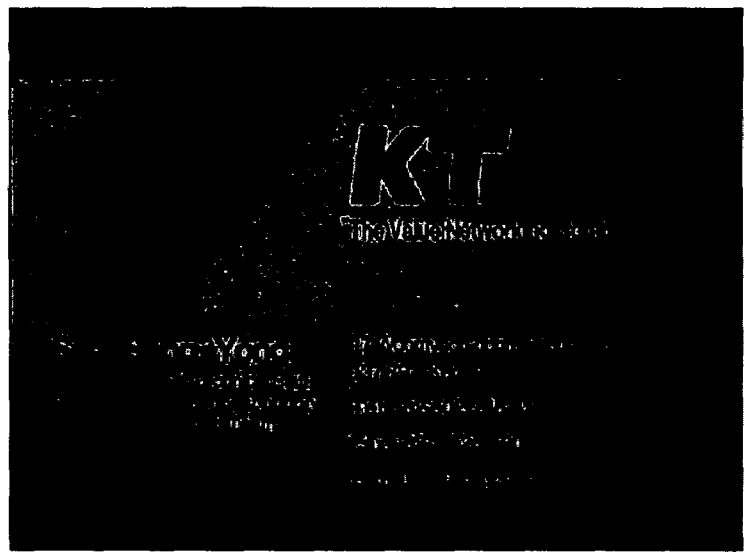
FIGS. 26A through 26H are diagrams illustrating images generated in the process of performing the procedure of FIG. 25.

A device for extending a character region in an image according to an embodiment of the present invention will now be description with reference to FIGS. 25 and 26A through 26H. In step 510, an input image shown in FIG. 26A is received. Here, the input image is comprised of 640 (column)×480 (row) pixels and can be a grayscale image having no color information. In the embodiment of the present invention, it is assumed that the image is a grayscale image. Thereafter, in step 515, the input image of FIG. 26A is mean-filtered, generating a blurred image shown in FIG. 26B such that the background region outside the character region of the image does not affect a block classification process.

Figure 26B:

Thereafter, in step 520 block classification is performed to divide the mean-filtered image of FIG. 26B into blocks having a predetermine size, analyzing pixels included in the divided blocks, classifying the blocks into character blocks and background blocks according to the analysis result, and converting pixels in the character blocks into pixels having a specified value. Through the block classification, the image is classified into character blocks and background blocks, pixels in the character blocks are converted to white pixels, and pixels in the background blocks are converted into black pixels. That is, the blocks of the image are filled with white or black pixels according to whether they are classified as character blocks or background blocks. The image corrected with pixel values of corresponding blocks after being divided into character blocks and background blocks is shown in FIG. 26C.

Figure 26C:
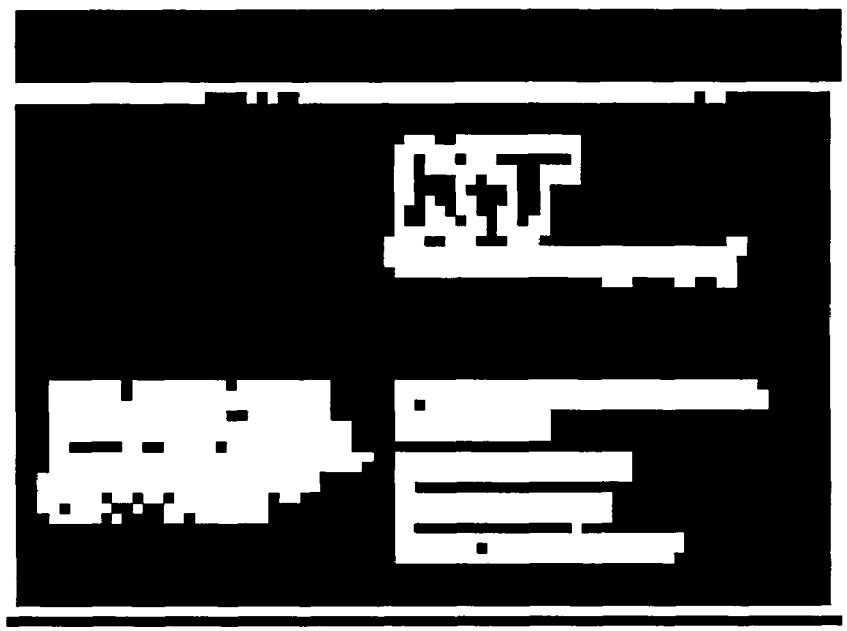
Figure 26D:

If the corrected image of FIG. 26C is generated in step 520, the image of FIG. 26C is subsampled in step 525, generating an image of FIG. 26D in which the number of vertical and horizontal pixels is reduced. The subsampling is performed to increase a filtering rate by decreasing a filter window in the following median filtering process. FIG. 26D shows an image subsampled at a subsampling ratio $(2:1)^2$. After the subsampling is performed, the subsampled image of FIG. 26D is median-filtered in step 530. The median filtering is performed to remove isolated character blocks erroneously classified as character blocks due to the edges or noises of the input image.

Figure 26E:

The median-filtered image is shown in FIG. 26E. After the incorrectly classified character blocks are removed through the median filtering, horizontal and vertical pixels of the median-filtered image shown in FIG. 26E are interpolated in step 535 to extend a size of the image to that of the input image as shown in FIG. 26F.

Figure 26F:
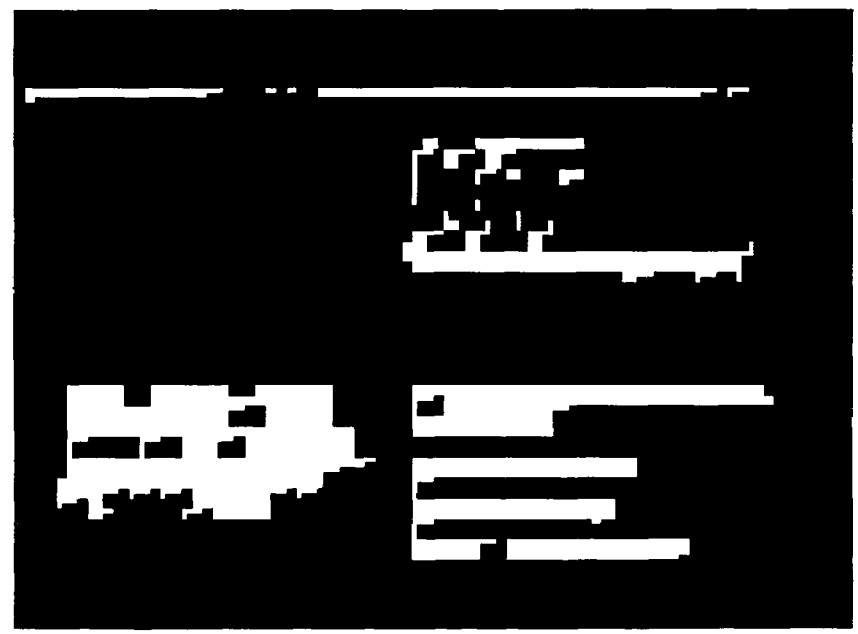

In step 540, the interpolated image shown in FIG. 26F is horizontally and vertically scanned to search for a position of a character region. In the position search process, the median-filtered image is horizontally scanned to search for a point x1 at the leftmost character block and a point x2 at the rightmost character block. Further, the median-filtered image is vertically scanned to search for a point y1 at the topmost character block and a point y2 at the bottommost character block. Thereafter, in step 545, left top and right bottom points (x1, y1) and (x2, y2) of the character region in the image are determined according to a result of the search. The left top and right bottom points (x1, y1) and (x2, y2) of the character region are determined based on an aspect ratio of the input image, such that distortion of the image can be prevented when the image is extended in the following ROC extension process.

Figure 26G:
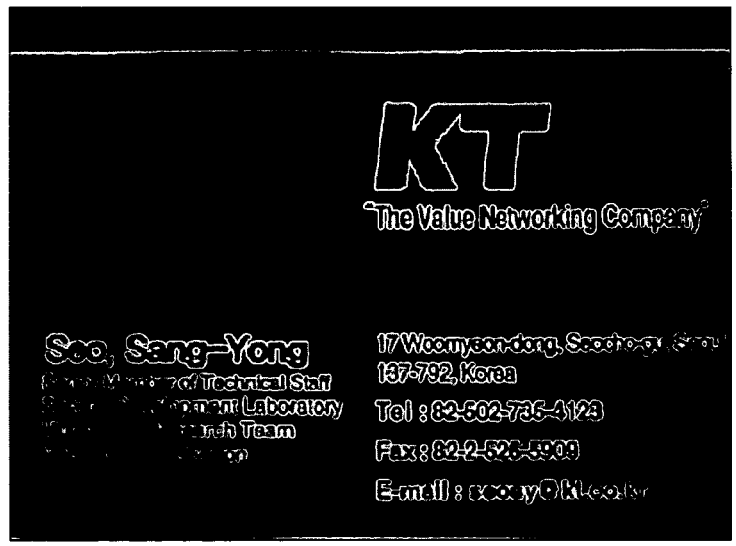

After the position of the character region is searched, an image existing in the searched position of the character region is extracted from the input image of FIG. 26A in step 550. In the ROC extraction process, an image existing between the left top and right bottom points (x1, y1) and (x2, y2) of the character region is extracted from the image of FIG. 26A, outputting the extracted image shown in FIG. 26G. The extracted image of the character region, shown in FIG. 26G, is located between the point x1 and the point x2 in the horizontal direction and between the point y1 and the point y2 in the vertical direction in the input image. The image of the character region becomes an image of the character region in which a background region is removed from the input image.

Figure 26H:

After the image of the character region is extracted, the image extension part 450 extends in step 555 the image of the character region, shown in FIG. 26G, to a size of the input image as shown in FIG. 26H. The image extension can be implemented by interpolation. In the embodiment of the present invention, the image extension can be implemented by bilinear interpolation. In step 560, the extended image of FIG. 26H is output to the character recognition part 50 or stored to be used for other purposes.

Fourth, an operation of the noise reduction part 30 shown in FIGS. 1 to 7 will now be described.

Generally, an image of an object photographed by a digital camera includes noises. Typical such noises are Gaussian noises. To reduce the Gaussian noises, various types of noise reduction filters are used. For example, however, an image obtained by photographing a business card has a large amount of information at edges of a character region. Therefore, if a simple noise reduction filter is used for the image of a business card, character information can be seriously damaged. Accordingly, there is a demand for a particular noise reduction filter for reducing image noises while conserving the information at the edges. In the embodiment of the present invention, a directional Lee filter is used, by way of example. The directional Lee filter can be expressed as $$\hat{x}(i, j) = m_x(i, j) + \frac{\sigma_x^2(i, j)}{\sigma_x^2(i, j) + \sigma_n^2}[\tilde{y}(i, j) - m_x(i, j)] \quad (13)$$

where, $m_x(i,j)$: average of local signals for a particular neighbor region in a pixel point (i,j), $\sigma_x^2(i,j)$: distribution of local signals for a particular neighbor region in a pixel point (i,j), $\sigma_x^2$: distribution of noises estimated from the entire image, $\tilde{y}(i,j)$: average of pixels multiplied by directional weights for major edges, and $\hat{x}(i,j)$: noise-reduced image.

In Equation (13), filter parameters are adaptively controlled using an average and distribution of local signals for a particular region in an image. According to Equation (13), in a background region of an image, distribution of noises is much larger than distribution of local signals as shown in Equation (14) below, so a noise-reduced output image becomes a local average. In an edge region of the image, distribution of local signals is much larger than distribution of noises, so a noise-reduced output image becomes an average of pixels multiplied by a directional weight for the edge. In this manner, the directional Lee filter reduces noises at edge regions while conserving the information at the edges.

$$\text{IF } \sigma_n^2 >> \sigma_x^2, \hat{x}(i,j) = m_x(i,j) = m_y(i,j)$$

$$\text{IF } \sigma_n^2 << \sigma_x^2, \hat{x}(i,j) = \tilde{y}(i,j) \quad (14)$$

Figures 27A, 27B:
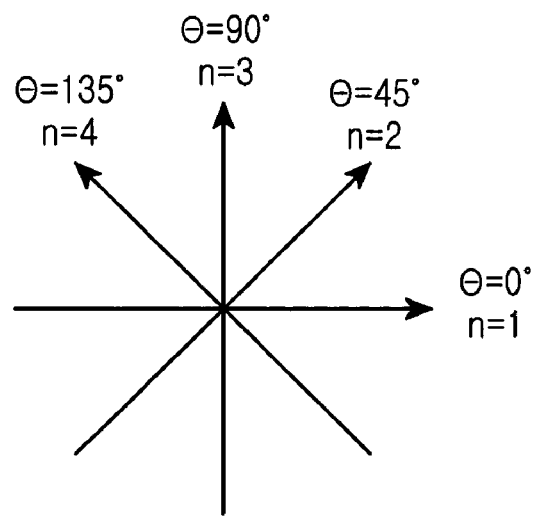
FIG. 27A is a diagram illustrating neighboring pixels processed in a noise reduction part.
FIG. 27B is a diagram illustrating four directions of a central pixel processed in the noise reduction part.

In an edge region of an image, in order to reduce noises while conserving edge components, a sum of values determined by multiplying outputs $y_\theta$ of a one-dimensional mean filter for the directions (0°, 45°, 90°, 135°) orthogonal to the major edge directions (90°, 135°, 0°, 45°) by directional weights $w_\theta$ for the respective edges directions is calculated as shown in Equation (15) and FIG. 27B.

$$\tilde{y}(i, j) = \sum_\theta w_\theta y_\theta(i, j) \quad (15)$$

$$y_\theta(i, j) = \frac{y_0}{2} + \frac{1}{4}(y_n + y_{n+4}), n = 1, 2, 3, 4 \quad (16)$$

Equation (16) shows an operation of performing one-dimensional mean filtering in the directions (0°, 45°, 90°, 135°) orthogonal to the edge directions while varying n from 1 to 4 in a 3×3 filter window based on FIGS. 27A and 27B.

Weights multiplied by outputs of the one-dimensional mean filter for the directions (0°, 45°, 90°, 135°) orthogonal to the edge directions (90°, 135°, 0°, 45°) are calculated by Equation (18) below. For the weights $w_\theta$, degrees $D_\theta$ of edges are calculated by Equation (17) below for the edge directions (90°, 135°, 0°, 45°) while varying n from 1 to 4 in a 3×3 filter window as shown in FIGS. 28A to 28D, and then the weights of the edge directions are normalized by Equation (18). A detailed description is given in a reference entitled "Adaptive Image Restoration Using Local Statistics and Directional Gradient Information," by N. C. Kim, IEE Electronic Letters 4th, Vol. 23, no. 12, pp. 610-611, June 1987, the contents of which are incorporated herein by reference.

$$D_\theta = \frac{1}{3}\left|\sum_{R_\theta^1} y_i - \sum_{R_\theta^2} y_i\right| \quad (17)$$

$$w_\theta = \frac{D_\theta}{\sum_\theta D_\theta} \quad (18)$$

Figure 28C:
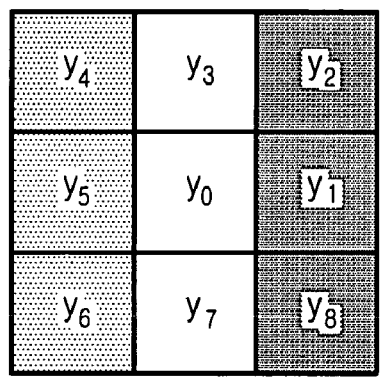
Figure 28D:
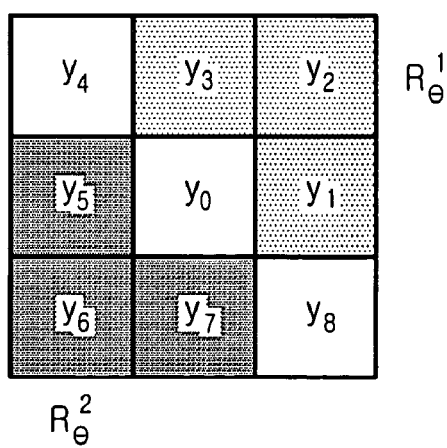
Figure 28E:
FIGS. 28E and 28F illustrate a resultant image obtained by binarizing a business card image by block adaptive binarization (BAB) without noise reduction and a resultant image obtained by binarizing a noise-reduced image by BAB, respectively
Figure 28F:

FIGS. 28E and 28F illustrate a resultant image obtained by binarizing a business card image by block adaptive binarization (BAB) without noise reduction and a resultant image obtained by binarizing a noise-reduced image by BAB, respectively It can be noted from FIGS. 28E and 28F that spots around small letters and tiny holes within large letters are decreased in number in the resultant image binarized after noise reduction, contributing to an improvement in a character recognition rate.

Fifth, a detailed structure of the image binarization part 40 according to the first to seventh embodiment of the present invention will now be described.

Figure 29:
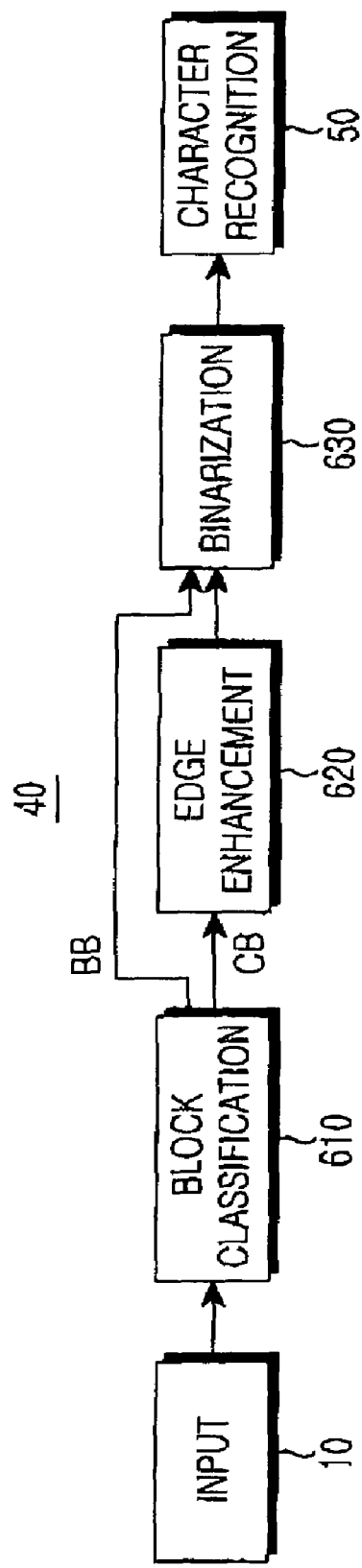
FIG. 29 is a block diagram illustrating a detailed structure of the image binarization part according to a first embodiment of the present invention.

FIG. 29 is a block diagram illustrating a detailed structure of the image binarization part 40 according to a first embodiment of the present invention. Referring to FIG. 29, an input image can be an image output from the input part 10, the object skew correction part 60, the ROC extension part 70, or the noise reduction part 30. It is assumed herein that the input image is comprised of 640 (column)×480 (row) pixels.

A block classification part 610 divides the input image into blocks having a predetermined size, and classifies the divided blocks into character blocks and background blocks by analyzing pixels included in the divided blocks. The block classification part 610 classifies the divided blocks into character blocks and background blocks in order to selectively perform binarization only on the region where characters are included. It is assumed herein that each of the blocks has a size of 8×8 pixels.

An edge enhancement part 620 enhances edges of the character blocks using relationships between character pixels and their neighboring pixels in the character blocks classified by the block classification part 610, and generates pixels in which noise components are reduced. Further, the edge enhancement part 620 calculates a pixel threshold used for binarizing the pixels. The edge enhancement part 620 can use a quadratic filter or an improved quadratic filter.

A binarization part 630 compares the pixels of the character blocks output from the edge enhancement part 620 with the pixel threshold, and binarizes character pixels and background pixels into a first brightness value and a second brightness value, respectively, according to the comparison result. In addition, the binarization part 630 binarizes the pixels of the background pixels output from the block classification part 610 into the second brightness value. The binarization part 630 can include a compressor for compressing the binarized image prior to sending it to the character recognition part 50, in order to improve storage efficiency.

The character recognition part 50 recognizes characters in the binarized image output from the binarization part 630.

Figure 30:
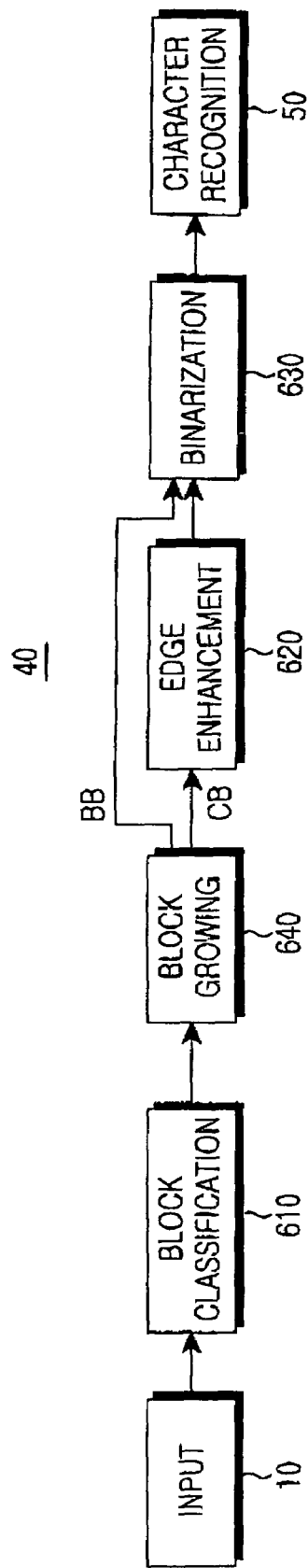
FIG. 30 is a block diagram illustrating a detailed structure of the image binarization part according to a second embodiment of the present invention.

FIG. 30 is a block diagram illustrating a detailed structure of the image binarization part 40 according to a second embodiment of the present invention. Referring to FIG. 30, an input image can be an image output from the input part 10, the object skew correction part 60, the ROC extension part 70, or the noise reduction part 30. It is assumed herein that the input image is comprised of 640 (column)×480 (row) pixels.

A block classification part 610 divides the input image into blocks having a predetermined size, and classifies the divided blocks into character blocks and background blocks by analyzing pixels included in the divided blocks. The block classification part 610 classifies the divided blocks into character blocks and background blocks in order to selectively perform binarization only on the region where characters are included. It is assumed herein that each of the blocks has a size of 8×8 pixels.

A block growing part 640 extends the character blocks classified by the block classification part 610. In the block classification process, a block containing character pixels can be incorrectly classified as a background block due to the influence of a background between character pixels. The block growing part 640 grows the character blocks in order to extend a character block incorrectly classified as a background block.

The edge enhancement part 620 enhances edges of the character blocks using relationships between character pixels and their neighboring pixels in the character blocks output from the block growing part 640, and generates pixels in which noise components are reduced. Further, the edge enhancement part 620 calculates a pixel threshold used for binarizing the pixels. The edge enhancement part 620 can include a quadratic filter or an improved quadratic filter.

The binarization part 630 compares the pixels of the character blocks output from the edge enhancement part 620 with the pixel threshold, and binarizes character pixels and background pixels into a first brightness value and a second brightness value, respectively, according to the comparison result. In addition, the binarization part 630 binarizes the pixels of the background pixels output from the block growing part 640 into the second brightness value. The binarization part 630 can include a compressor for compressing the binarized image prior to sending it to the character recognition part 50, in order to improve storage efficiency.

The character recognition part 50 recognizes characters in the binarized image output from the binarization part 630.

Figure 31:
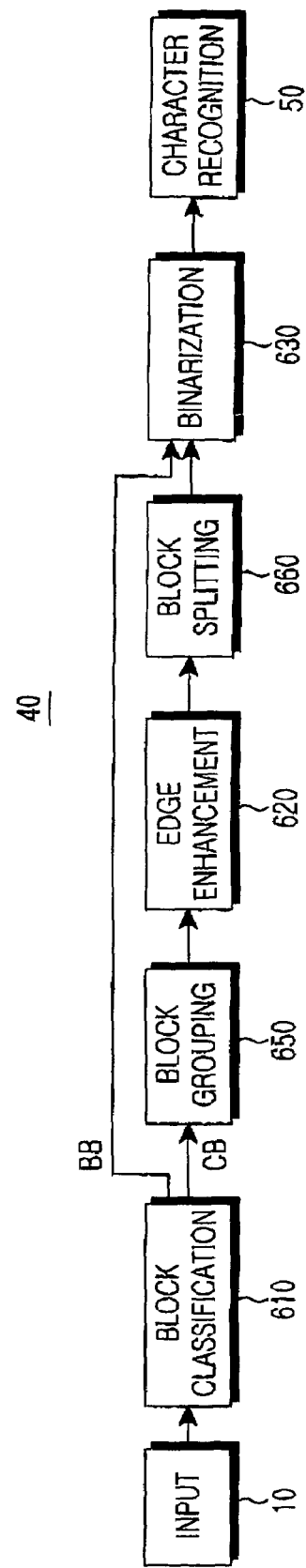
FIG. 31 is a block diagram illustrating a detailed structure of the image binarization part according to a third embodiment of the present invention.

FIG. 31 is a block diagram illustrating a detailed structure of the image binarization part 40 according to a third embodiment of the present invention. Referring to FIG. 31, an input image can be an image output from the input part 10, the object skew correction part 60, the ROC extension part 70, or the noise reduction part 30. It is assumed herein that the input image is comprised of 640 (column)×480 (row) pixels.

The block classification part 610 divides the input image into blocks having a predetermined size, and classifies the divided blocks into character blocks and background blocks by analyzing pixels included in the divided blocks. The block classification part 610 classifies the divided blocks into character blocks and background blocks in order to selectively perform binarization only on the region where characters are included. It is assumed herein that each of the blocks has a size of 8×8 pixels.

A block grouping part 650 groups each of the character blocks output from the block classification part 610 with its 8 neighboring blocks, generating grouped blocks. If a threshold for the binarization process is determined using only one character block, discontinuity may occur between blocks in the binarized image due to a large difference between the threshold for distinguishing background and character pixels and a threshold of neighboring blocks. The block grouping part 650 performs the block grouping in order to extend a character block region and increase binarization reliability on the character blocks.

The edge enhancement part 620 enhances edges of the character blocks using relationships between character pixels and their neighboring pixels in the grouped character blocks output from the block grouping part 650, and generates pixels in which noise components are reduced. Further, the edge enhancement part 620 calculates a pixel threshold used for binarizing the pixels. The edge enhancement part 620 can include a quadratic filter or an improved quadratic filter.

A block splitting part 660 receives the grouped blocks from the edge enhancement part 620, and separates the character blocks from the grouped blocks. In other words, the block splitting part 660 performs a function of separating only character blocks for binarization from the blocks grouped by the block grouping part 650.

The binarization part 630 compares the pixels of the character blocks separated by the block splitting part 660 with the pixel threshold, and binarizes character pixels and background pixels into a first brightness value and a second brightness value, respectively, according to the comparison result. In addition, the binarization part 630 binarizes the pixels of the background pixels output from the block classification part 610 into the second brightness value. The binarization part 630 can include a compressor for compressing the binarized image prior to sending it to the character recognition part 50, in order to increase storage efficiency.

The character recognition part 50 recognizes characters in the binarized image output from the binarization part 630.

Figure 32:
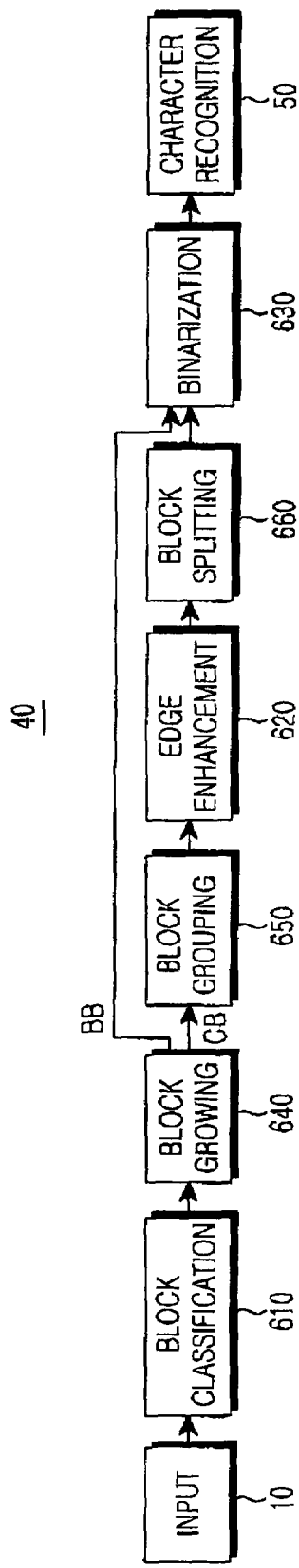
FIG. 32 is a block diagram illustrating a detailed structure of the image binarization part according to a fourth embodiment of the present invention.

FIG. 32 is a block diagram illustrating a detailed structure of the image binarization part 40 according to a fourth embodiment of the present invention. Referring to FIG. 32, an input image can be an image output from the input part 10, the object skew correction part 60, the ROC extension part 70, or the noise reduction part 30. It is assumed herein that the input image is comprised of 640 (column)×480 (row) pixels.

A block classification part 610 divides the input image into blocks having a predetermined size, and classifies the divided blocks into character blocks and background blocks by analyzing pixels included in the divided blocks. The block classification part 610 classifies the divided blocks into character blocks and background blocks in order to selectively perform binarization only on the region where characters are included. It is assumed herein that each of the blocks has a size of 8×8 pixels.

The block growing part 640 extends the character blocks classified by the block classification part 610. In the block classification process, a block containing character pixels can be incorrectly classified as a background block due to the influence of a background between character pixels. The block growing part 640 grows the character blocks in order to extend a character block incorrectly classified as a background block.

The block grouping part 650 groups each of the character blocks output from the block growing part 640 with its 8 neighboring blocks, generating grouped blocks. If a threshold for distinguishing character and background pixels is determined for the binarization process using only one 8×8 character block, discontinuity may occur between blocks in the binarized image due to a large difference between the determined threshold and a threshold of neighboring blocks. The block grouping part 650 performs the block grouping in order to extend a character block region and increase binarization reliability on the character blocks.

The edge enhancement part 620 enhances edges of the character blocks using relationships between character pixels and their neighboring pixels in the grouped character blocks output from the block grouping part 650, and generates pixels in which noise components are reduced. Further, the edge enhancement part 620 calculates a pixel threshold used for binarizing the pixels. The edge enhancement part 620 can use a quadratic filter or an improved quadratic filter.

The block splitting part 660 receives the grouped blocks from the edge enhancement part 620, and separates the character blocks from the grouped blocks. That is, the block splitting part 660 performs a function of separating only character blocks for binarization from the blocks grouped by the block grouping part 650.

The binarization part 630 compares the pixels of the character blocks separated by the block splitting part 660 with the pixel threshold, and binarizes character pixels and background pixels into a first brightness value and a second brightness value, respectively, according to the comparison result. In addition, the binarization part 630 binarizes the pixels of the background pixels output from the block classification part 610 into the second brightness value. The binarization part 630 can include a compressor for compressing the binarized image prior to sending it to the character recognition part 50, in order to increase storage efficiency.

The character recognition part 50 recognizes characters in the binarized image output from the binarization part 630.

Summarizing, the image binarization part 40 according to the first embodiment classifies an input image into blocks, and then classifies the divided blocks into character blocks and background blocks. The image binarization part 40 classifies the input image into character blocks and background blocks in order to perform edge enhancement and binarization operations on the pixels in the character blocks and to fix pixels in the background blocks to a specified brightness value in the binarization process.

The image binarization part 40 according to the second embodiment grows the character blocks classified by the block classification part 610 prior to edge enhancement, in order to prevent character pixels from being included in a background block in the block classification process. After growing the classified character blocks, if character pixels are included in a block classified as a background block, the image binarization part 40 corrects this block as a character block.

The image binarization part 40 according to the third embodiment groups character blocks classified by the block classification part 610 with their neighboring blocks prior to edge enhancement, enhances edges of the grouped blocks, separates the original character blocks from the edge-enhanced blocks, and then performs binarization on the separated character blocks. The reason for performing block grouping on the character blocks is as follows. Since the character block consists of a very small number of pixels, the character block is grouped with its neighbor blocks to extend its block region so as to enhance edges of the grouped block.

Finally, the image binarization part 40 according to the fourth embodiment further includes the block growing part 640 and the block grouping part 650. Herein, a detailed description of the present invention will be made with reference to the image binarization part 40 according to the fourth embodiment. In addition, it will be assumed that the image used herein is an image of a business card.

The input image can be a color image or grayscale image having no color information. In the embodiment of the present invention, it is assumed that the image is a grayscale image. The input image is divided into blocks and then classified into character blocks and background blocks by the block classification part 610.

Figure 33:
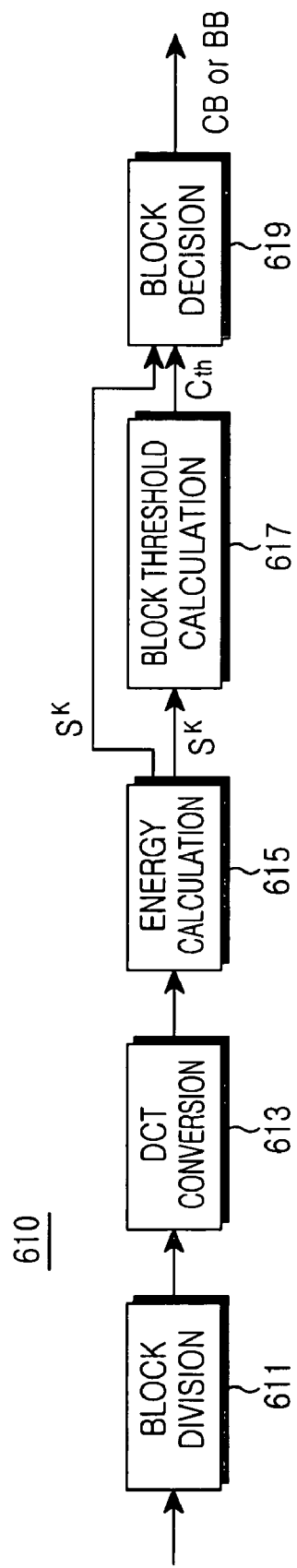
FIG. 33 is a block diagram illustrating a detailed structure of the block classification part in FIGS. 29 through 32 according to an embodiment of the present invention.

FIG. 33 is a block diagram illustrating a detailed structure of the block classification part 610 according to an embodiment of the present invention. The block classification part 610 can be constructed in the same way as the block classification part 110 of the blurring decision part 20. Therefore, the block classification part 610 of FIG. 33 is identical to the block classification part 110 of FIG. 9 not only in structure but also in an operation of classifying blocks in the image. Therefore, a detailed discussion of FIG. 33 is not necessary since the components of FIG. 33 are discussed above with reference to FIG. 9.

Pixels in the character blocks classified by the classification part 610 can have gray levels between 0 and 255. The character blocks output from the block classification part 610 can be input to the edge enhancement part 620, the block growing part 640, and the block grouping part 650. Herein, it will be assumed that the character blocks are input to the block growing part 640.

The block growing part 640 grows a region of the classified character blocks. In the block classification process, a block containing character pixels may be incorrectly classified as a background block due to the influence of a background between character pixels. The block growing part 640 grows a character block in order to change a background block containing character pixels to a character block by extending the character block.

The block growing part 640 can be implemented using a morphological filter. The morphological filter grows a character block through an erosion operation subsequent to a dilation operation for the character block, called a closing operation. The closing operation serves to fill holes within a region. First, the character block is extended through the dilation operation, background blocks isolated between the character blocks are converted into the character blocks, and an original block size is recovered through the erosion in accordance with the closing operation. The morphological filter is disclosed in a reference entitled "Digital Image Processing," by R. C. Gonzalez, R. Woods, et al., $2^{nd}$ ed., Prentice Hall, pp. 519-560, 2002, which is incorporated herein by reference. The block growing part 640 changes a background block containing character pixels to a character block in the block growing process.

The character blocks output from the block growing part 640 can be input to the block grouping part 650 or the edge enhancement part 620. Herein, it will be assumed that the character blocks are input to the block grouping part 650.

The block grouping part 650 groups each of the character blocks output from the block classification part 610 or the block growing part 640 with its 8 neighboring blocks, thereby generating grouped blocks each consisting of 24×24 pixels. A character block has a size of 8×8 pixels. If a threshold for distinguishing character and background pixels is determined for the binarization process using only one 8×8 character block, discontinuity may occur between blocks in the binarized image due to a large difference between the determined threshold and a threshold of neighboring blocks. Therefore, the block grouping part 650 generates grouped blocks to extend regions to be binarized, thereby increasing binarization reliability.

The grouped block containing a character block output from the block grouping part 650 is applied to the edge enhancement part 620. The edge enhancement part 620 can receive blocks output from the block classification part 610, the block growing part 640, or the block grouping part 650. Here, the blocks output from the block classification part 610 and the block growing part 640 are 8×8-pixel blocks, while the grouped block output from the block grouping part 650 is a 24×24-pixel block made by grouping a character block to be binarized with its 8 neighboring blocks.

Figure 34:
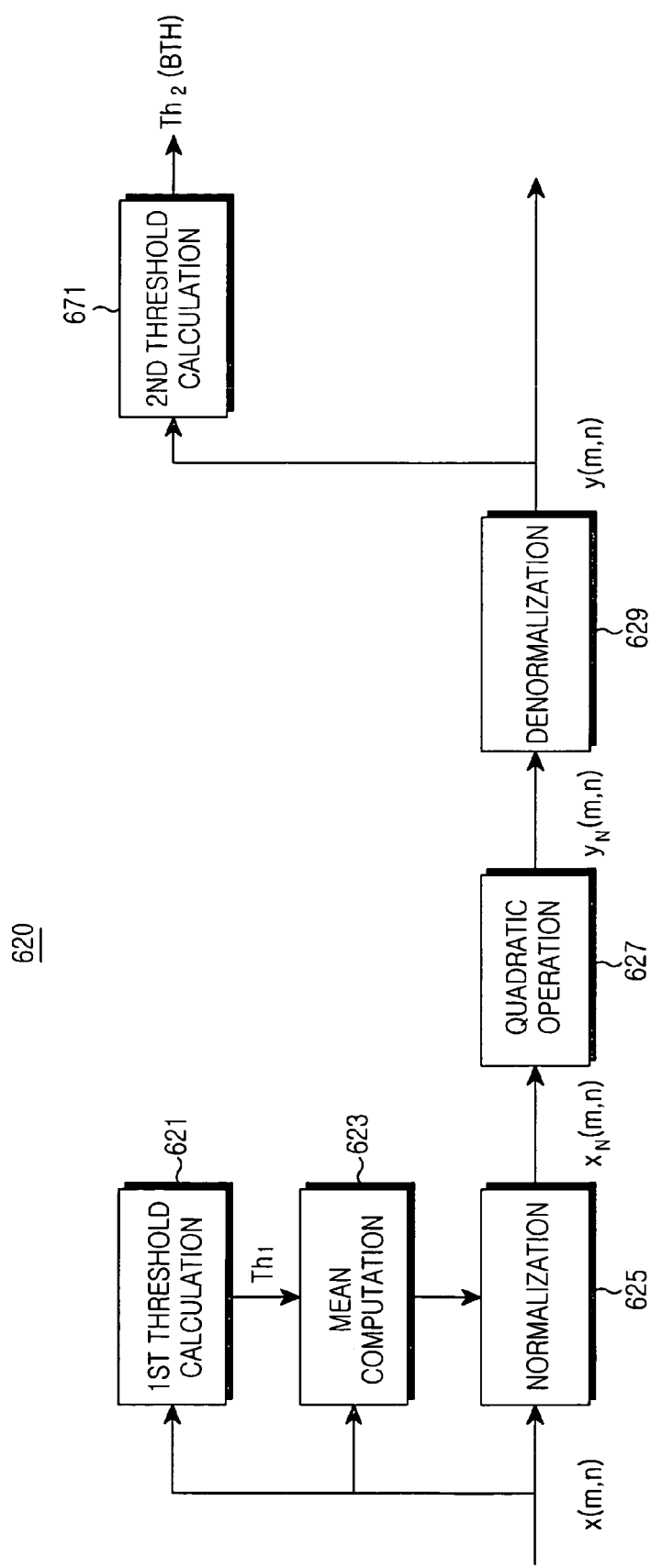
FIG. 34 is a block diagram illustrating an example of a detailed structure of the edge enhancement part of FIGS. 29 through 32 according to an embodiment of the present invention.
Figures 35, 36:
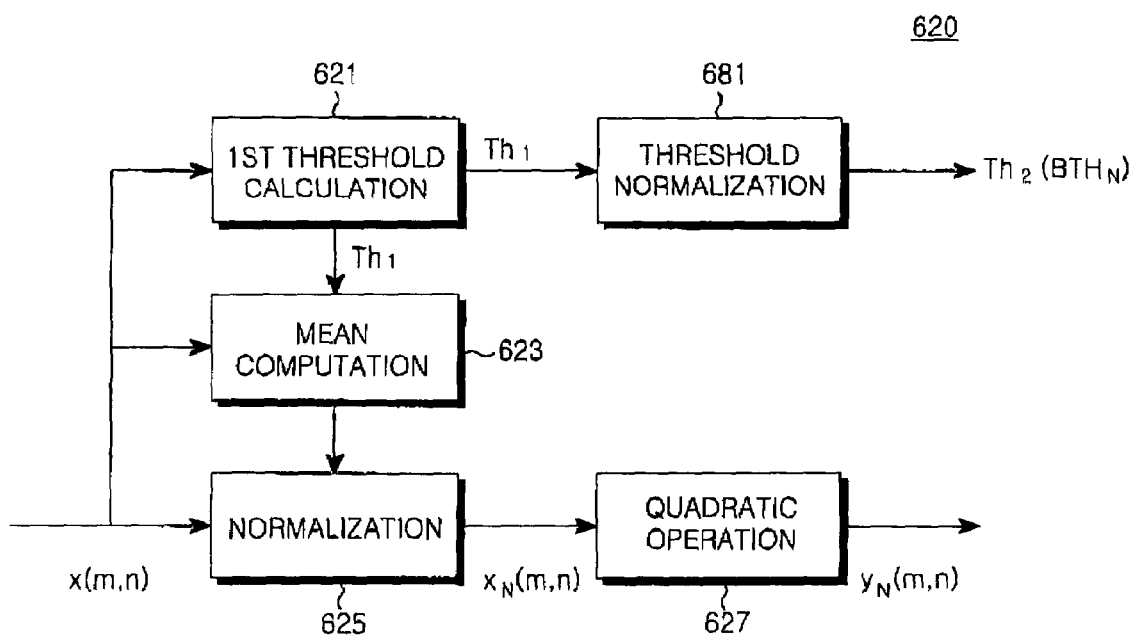
FIG. 35 is a diagram for explaining an operation of enhancing edges of a character block by the edge enhancement part.
FIG. 36 is a block diagram illustrating another example of a detailed structure of the edge enhancement part of FIGS. 29 through 32 according to an embodiment of the present invention.

The edge enhancement part 620 can use a quadratic filter (QF) or an improved quadratic filter (IQF). As shown in FIG. 34, the quadratic filter normalizes a character block, enhances edges of the normalized character block, denormalizes the edge-enhanced character block to convert the character block in the range of a brightness value before normalization, and generates, from the denormalized character block, a threshold BTH used for binarizing pixels of the character block. As shown in FIG. 36, the improved quadratic filter normalizes a character block, enhances edges of the normalized character block, normalizes a threshold calculated from the character block, and generates a threshold $BTH_N$ for binarizing pixels in the character block.

First, an operation of enhancing the edges of a character block using the quadratic filter will be described with reference to FIG. 34.

Referring to FIG. 34, a first threshold calculation part 621 calculates a first threshold Th1 for classifying pixels of the character block into character pixels and background pixels. The first threshold calculation part 621 calculates the first threshold Th1 which is used for discriminating character and background pixels and normalizing two types of the discriminated pixels in the next process. The first threshold Th1 is selected as a gray value corresponding to the maximum between-class variance between the two types of discriminated pixels. The first threshold Th1 can be calculated using Otsu's method or Kapur's method. Otsu's method for calculating the first threshold Th1 is based on Equation (19) below. The method proposed by N. Otsu is disclosed in a paper entitled "A Threshold Selection Method from Gray-Level Histograms," *IEEE Trans. Systems, Man and Cybernetics*, Vol. SMC-9, No. 1, pp. 62-66, January 1979, which is incorporated herein by reference.

$$Th_1 = \underset{T}{\operatorname{argmax}} \sigma_B^2(T) \qquad (19)$$

$$\sigma_B^2(T) = P_1(\mu_1(T) - \mu)^2 + P_2(T)(\mu_2(T) - \mu)^2$$

$$= P_1(T)P_2(T)(\mu_1(T) - \mu_2(T))^2$$

$\sigma_B^2(T)$: between-class variance $T$: gray value $\mu$: mean of the total pixels $\mu_i(T)$: mean of each class defined by T $P_i(T)$: relative frequency of each class A mean computation part 623 classifies pixels of the character block into character and background pixels on the basis of the first threshold Th1, and calculates mean brightness values for the character and background pixels for the character block. In a process of mean computation for two classes, pixels of a character block x(m, n) are classified into character pixels (CPs) and background pixels (BPs) on the basis of the first threshold Th1 in accordance with Equation (20) below, and then a mean brightness value $\mu_0$ for the character pixels and a mean brightness value $\mu_1$ for the background pixels are calculated in accordance with Equation (21) below.

If $x(m,n) \geq \text{Th1}$ then CP else BP (20)

In Equation (20), x(m,n) denotes a character block, and Th1 denotes a threshold for classifying the pixels of the character block into character and background pixels.

$$\mu_0 = \frac{S_c}{N_c} \qquad (21)$$

$$\mu_1 = \frac{S_b}{N_b}$$

In Equation (21), $S_c$ denotes a sum of brightness values for the character pixels, $N_c$ denotes the number of character pixels, $S_b$ denotes a sum of brightness values for the background pixels, and $N_b$ denotes the number of background pixels.

A normalization part 625 normalizes the pixels of the character block x(m,n) using the mean brightness value $\mu_0$ for the character pixels and the mean brightness value $\mu_1$ for the background pixels from the mean computation part 623 so that the character pixels have values close to '1' while the background pixels have values close to '0'. The normalization part 625 performs a function of reducing a dynamic range of the brightness values for the input character block pixels by normalizing the pixels of the character block x(m,n) in accordance with Equation (22) below.

$$x_N(m, n) = \frac{(x(m, n) - \mu_1)}{(\mu_0 - \mu_1)} \qquad (22)$$

In Equation (22), $x_N(m,n)$ denotes a normalized character block, $\mu_0$ denotes a mean brightness value for the character pixels, and $\mu_1$ denotes a mean brightness value for the background pixels.

The normalized character block $x_N(m,n)$ is subject to a quadratic operation in a quadratic operation part 627, so that edges of the character block are enhanced and their noise components are reduced. The quadratic operation part 627 performs a function of enhancing edges using relationships between the normalized pixels and their surrounding pixels, and reducing the noise components. FIG. 35 shows a central pixel and its surrounding pixels processed by the quadratic operation part 627. Equation (23) shows a characteristic of the quadratic operation part 627 that enhances the edges and reduces the noise components by performing a quadratic operation on the character pixels. The quadratic operation part 627 darkly processes the character pixels and brightly processes the background pixels on the basis of a large gray level difference, such that character edges are clearly processed and simultaneously their noise components are removed.

$$y_0 = \left(h_0 x_0 + h_1 \sum_{i=1}^{4} x_{2i-1} + h_2 \sum_{i=1}^{4} x_{2i}\right) + \left(h_3 x_0^2 + h_4 \sum_{i=1}^{4} x_{2i-1}^2 + h_5 \sum_{i=1}^{4} x_{2i}^2\right) + \left(h_6 \sum_{i=1}^{4} x_0 x_{2i-1} + h_7 \sum_{i=1}^{4} x_0 x_{2i}\right) + \left(h_8 \sum_{i=1}^{4} x_{2i-1} x_{2i^*-1} + h_9 \sum_{i=1}^{4} x_{2i-1}(x_{2i} + x_{2i^{**}})\right) \text{ where}$$

$i^* = (i+1) \bmod 4$, and $i^{**} = (i+3) \bmod 4$.

An output of the quadratic operation part 627 is input to a denormalization part 629, and the denormalization part 629 generates an output y(m,n) by denormalizing the quadratic-processed character block $y_N(m,n)$. The denormalization part 629 performs a function of converting pixels of the normalized character block in the range of a brightness value before normalization. The denormalization part 629 performs the denormalization operation in accordance with Equation (24) below.

$$y(m,n) = y_N(m,n)(\mu_0 - \mu_1) + \mu_1 \quad (24)$$

The character block y(m,n) output from the denormalization part 629 is applied to the binarization part 630 and a second threshold calculation part 671. The second threshold calculation part 671 calculates a second threshold Th2 used when the binarization part 630 binarizes pixels of the character block into character pixels and background pixels. The second threshold Th2 corresponds to a threshold BTH of the binarization part 630. The second threshold calculation part 671 is used because the denormalization part 629 denormalized the normalized character block back into a character block having its original brightness. The second threshold calculation part 671 can calculate the threshold BTH (or second threshold Th2) using Otsu's method or Kapur's method. When Otsu's method is used, the second threshold calculation part 671 calculates the threshold BTH by calculating pixels of the denormalized character block in accordance with Equation (19).

The edge enhancement part 620 shown in FIG. 34 reduces a dynamic range by normalizing the character and background pixels in a received character block (or a grouped block containing the character block), performs a quadratic operation on the normalized pixels to enhance the edges of the character block (or the grouped block containing the character block), and denormalizing the normalized pixels of the normalized character block (or the grouped block containing the character block) in the original gray level range of the pixels. From the pixels of the denormalized character block, the edge enhancement part 620 calculates a threshold for binarizing pixels of the character block.

It is also possible to enhance edges of a character block (or a grouped block containing the character block) using the improved quadratic filter shown in FIG. 36, which is an improvement of the quadratic filter of FIG. 34. FIG. 36 is a block diagram illustrating a structure of the edge enhancement part 620 using the improved quadratic filter.

Referring to FIG. 36, the first threshold calculation part 621 calculates the first threshold Th1 for classifying pixels of the character block into character pixels and background pixels. The first threshold calculation part 621 is identical in operation to the first threshold calculation part 621 of FIG. 34.

The mean computation part 623 classifies pixels of the character block into character and background pixels on the basis of the first threshold Th1, and calculates mean brightness values for the character and background pixels for a character block. The mean computation part 623 is also identical in operation to the mean computation part 623 of FIG. 34.

The normalization part 625 normalizes the pixels of the character block x(m,n) using the mean brightness value $\mu_0$ for the character pixels and the mean brightness value $\mu_1$ for the background pixels from the mean computation part 623 so that the character pixels have values close to '1' while the background pixels have values close to '0'. The normalization part 625 is also identical in operation to the normalization part 625 of FIG. 34.

The quadratic operation part 627 performs a function of enhancing edges and reducing the noise components using relationships between the normalized pixels and their surrounding pixels. FIG. 35 shows a central pixel and its surrounding pixels processed by the quadratic operation part 627. Equation (23) shows a characteristic of the quadratic operation part 627 that enhances the edges and reduces the noise components by performing a quadratic operation on the character pixels. The quadratic operation part 627 is also identical in operation to the quadratic operation part 627 of FIG. 34.

The normalized character block (or a grouped block containing the character block) output from the quadratic operation part 627 is output without denormalization. Thus, in order to generate the threshold $BTH_N$ used by the binarization part 630 in binarizing pixels of the character block, a threshold normalization part 681 in the improved quadratic filter generates the second threshold Th2 by normalizing the first threshold Th1 calculated by the first threshold calculation part 621. The second threshold Th2 is used as a pixel threshold $BTH_N$ for binarizing the character block pixels by the binarization part 630.

The threshold normalization part 681 normalizes the first threshold Th1 using a method equal to the normalization method of the normalization part 625. The threshold normalization part 681 normalizes the first threshold Th1 in accordance with Equation (25) below, to generate the second threshold Th2 (or the threshold $BTH_N$).

$$Th2 = \frac{(Th1 - \mu_1)}{(\mu_0 - \mu_1)} \quad (25)$$

In Equation (25), Th2 denotes a normalized threshold $BTH_N$ for distinguishing the character and background pixels by the binarization part 630, $\mu_0$ denotes a brightness value for the character pixels, and $\mu_1$ denotes a mean brightness value for the background pixels.

The edge enhancement part 620 shown in FIG. 36 reduces the dynamic range by normalizing the character and background pixels in a character block (or a grouped block containing the character block), and performs a quadratic operation on the normalized pixels to enhance the edges of the character block (or the grouped block containing the character block). Since the character block (or the grouped block containing the character block) output from the quadratic operation part 627 is a normalized block, the threshold BTH$_N$ for binarization of the character block pixels is generated by normalizing the first threshold Th1.

As described above, in the image binarization part 40 according to the first to fourth embodiments of the present invention, the edge enhancement part 620 can be implemented using the quadratic filter of FIG. 34 or the improved quadratic filter of FIG. 36. The edge enhancement part 620 using the improved quadratic filter performs a function of enhancing edges while solving a drawback that a black block surrounding characters of the binarized image occurs after the character block (or the grouped block containing the character block) is binarized. When the improved quadratic filter is used, the denormalization operation used in the quadratic filter is not performed. Therefore, when the quadratic filter is used, the edge enhancement part 620 denormalizes the quadratic-processed character block (or a grouped block containing the character block), and at the same time, calculates a threshold BTH from the denormalized character block (or the grouped block containing the character block). However, when the improved quadratic filter is used, the edge enhancement part 620 uses the intact quadratic-processed normalized character block (or the grouped block containing the character block), and calculates the pixel threshold BTH$_N$ by normalizing the first threshold Th1.

When a character block is output from the edge enhancement part 620, the character block is applied to the binarization part 630, and when a grouped block containing a character block is output from the edge enhancement part 620, the grouped block is applied to the block splitting part 660. The block splitting part 660 receiving the grouped block containing a character block separates the character blocks from the grouped block. This is to restore the grouped block made by grouping a character block with its surrounding blocks by the block grouping part 650 to its original blocks. That is, the block splitting part 660 separates the 8×8 center block from the 24×24 grouped block.

The character blocks output from the block splitting part 660 or the edge enhancement part 620 are input to the binarization part 630. The binarization part 630 receives the threshold output from the edge enhancement part 620 to binarize the pixels in the character blocks. The character blocks input to the binarization part 630 are y(m,n) (corresponding to character blocks output from the quadratic filter of FIG. 34) or y$_N$(m,n) (corresponding to character blocks output from the improved quadratic filter of FIG. 36). Thus, the threshold becomes BTH or BTH$_N$.

The binarization part 630 performs the binarization operation by classifying the received character block pixels into the character and background pixels using the threshold, and converting the classified character and background pixels into the two different brightness values. In other words, the binarization part 630 compares the threshold corresponding to the input character block with values of the character block pixels, classifies the pixels as character pixels if the values of the character block pixels are equal to or larger than the threshold as a result of the comparison, and classifies the pixels as background pixels if the values of the character block pixels are smaller than the threshold. The binarization part 630 performs the binarization operation by converting the character pixels into a brightness value "α" and the background pixels into a brightness value "β" according to a result of classifications. A method for binarizing character block pixels by the binarization part 630 is defined as $$y_B(m,n) = \begin{cases} \alpha, & \text{if } y(m,n) \geq BTH \text{ or if } y_N(m,n) \geq BTH_N \\ \beta, & \text{otherwise} \end{cases} \quad (26)$$

In Equation (26), y(m,n) and BTH denote a character block and a threshold output from the quadratic filter, respectively, y$_N$(m,n) and BTH$_N$ denote a character block and a threshold output from the improved quadratic filter, respectively, and y$_B$(m,n) denotes the binarized character block.

The binarization part 630 receives pixels of a background block output from the block classification part 610 or the block growing part 640, and collectively converts the background block pixels into the brightness value "β".

An operation of enhancing edges of a character block using the quadratic filter of FIG. 34 will now be described.

First, the first threshold Th1 for classifying pixels of the character block into character pixels and background pixels is calculated. The first threshold Th1 is used for discriminating character and background pixels and normalizing two types of the discriminated pixels in the next process. The first threshold Th1 is selected as a gray value corresponding to the maximum between-class variance between the two types of discriminated pixels in accordance with Equation (19).

Second, pixels of the character block are classified into character and background pixels on the basis of the first threshold Th1, and mean brightness values for the character and background pixels for a character block are calculated. In a process of mean computation for two classes, pixels of the character block x(m,n) are classified into character pixels and background pixels on the basis of the first threshold Th1 in accordance with Equation (20), and then a mean brightness value $\mu_0$ for the character pixels and a mean brightness value $\mu_1$ for the background pixels are calculated in accordance with Equation (21).

Third, the pixels of the character block x(m, n) are normalized using the mean brightness value $\mu_0$ for the character pixels and the mean brightness value $\mu_1$ for the background pixels from the mean computation part 623 so that the character pixels have values close to '1' while the background pixels have values close to '0'. The character block normalization method normalizes the pixels of the character block x(m,n) in accordance with Equation (22).

Fourth, the normalized character block x$_N$(m,n) is subject to a quadratic operation, so that edges of the character block are enhanced and their noise components are reduced. In the quadratic operation process, the character pixels are darkly processed and the background pixels are brightly processed on the basis of a large gray level difference, such that character edges are clearly processed and simultaneously their noise components are removed. Such an operation is performed in accordance with Equation (23).

Fifth, an output y(m,n) is generated by denormalizing the quadratic-processed character block y$_N$(m,n). The denormalization process performs a function of converting pixels of the normalized character block in the range of a brightness value before normalization. The denormalization operation is performed in accordance with Equation (24).

Sixth, the second threshold Th2 is calculated using the character block y(m,n) generated in the denormalization process. The second threshold Th2 corresponds to a pixel threshold BTH for binarizing pixels of the character block into character pixels and background pixels. The second threshold Th2 can be calculated using Otsu's method or Kapur's method. When Otsu's method is used, the second threshold Th2 (or the pixel threshold BTH) is determined by calculating pixels of the denormalized character block in accordance with Equation (19).

An operation of enhancing edges of a character block using the improved quadratic filter of FIG. 36 will now be described.

First, the first threshold Th1 for classifying pixels of the character block into character pixels and background pixels is calculated. The first threshold calculation method is identical to the first threshold calculation method of FIG. 34.

Second, pixels of the character block are classified into character and background pixels on the basis of the first threshold Th1, and then mean brightness values for the character and background pixels for a character block are calculated. The mean brightness value calculation method is identical to the mean brightness value calculation method of FIG. 34.

Third, the pixels of the character block x(m,n) are normalized using the mean brightness value $\mu_0$ for the character pixels and the mean brightness value $\mu_1$ for the background pixels so that the character pixels have values close to '1' while the background pixels have values close to '0'. The normalization method is also identical to the normalization method of FIG. 34.

Fourth, by performing a quadratic operation using relationships between the normalized pixels and their surrounding pixels, edges of the character block are enhanced and the noise components of the character block are reduced. The quadratic operation method is also identical to the quadratic operation method of FIG. 34.

Fifth, the second threshold Th2 is calculated by normalizing the first threshold Th1. This is because the normalized character block is delivered to the binarization part 630 without denormalization of the quadratic-processed character block. If the improved quadratic filtering of FIG. 36 is used, the second threshold Th2 (or threshold $BTH_N$) is calculated by normalizing the first threshold Th1 in accordance with Equation (25).

As described above, in the embodiments of the present invention, the quadratic filter of FIG. 34 or the improved quadratic filter of FIG. 36 can be used to enhance edges of a character block. The improved quadratic filter performs a function of enhancing edges while resolving a drawback that a black block surrounding characters of the binarized image occurs after the character block is binarized using the quadratic filter. When the improved quadratic filter is used, the denormalization operation used in the quadratic filter is not performed. Therefore, when the quadratic filter is used, the quadratic-processed character block is denormalized, and at the same time, a threshold BTH is calculated from the denormalized character block. However, when the improved quadratic filter is used, the intact quadratic-processed normalized character block is used, and the threshold $BTH_N$ is calculated by normalizing the first threshold Th1.

Figure 37:
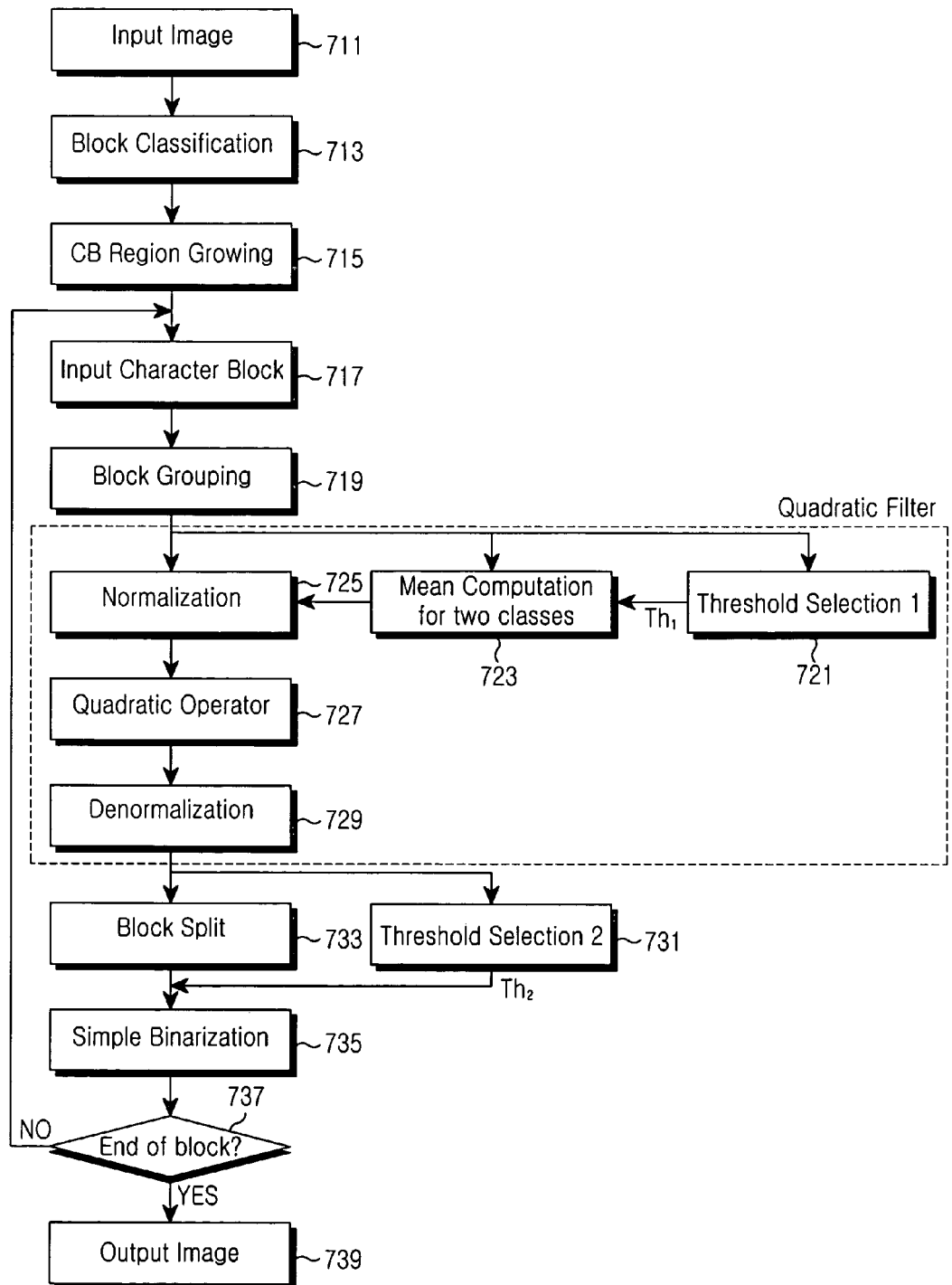
FIG. 37 is a flowchart illustrating a procedure for binarizing an image by the image binarization part using a quadratic filter according to an embodiment of the present invention.

FIG. 37 is a flowchart illustrating an example of a binarization method where the edge enhancement part 620 is implemented using the quadratic filter according to an embodiment of the present invention. FIG. 37 shows a binarization method according to the fourth embodiment in which the quadratic filter is used. FIGS. 38A through 38I are diagrams illustrating images generated when the binarization is performed in the procedure of FIG. 37.

Figure 38A:
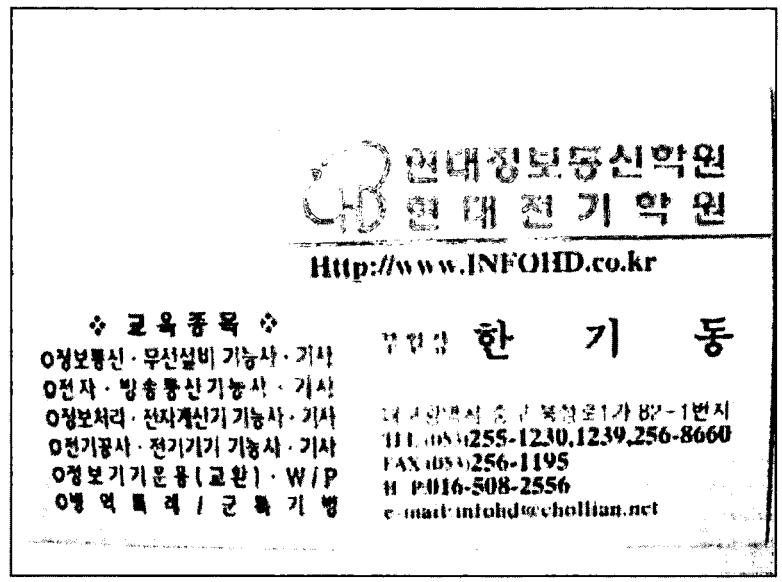
FIGS. 38A through 38I are diagrams illustrating images generated in each process of performing the binarization procedure of FIG. 37.
Figure 38B:
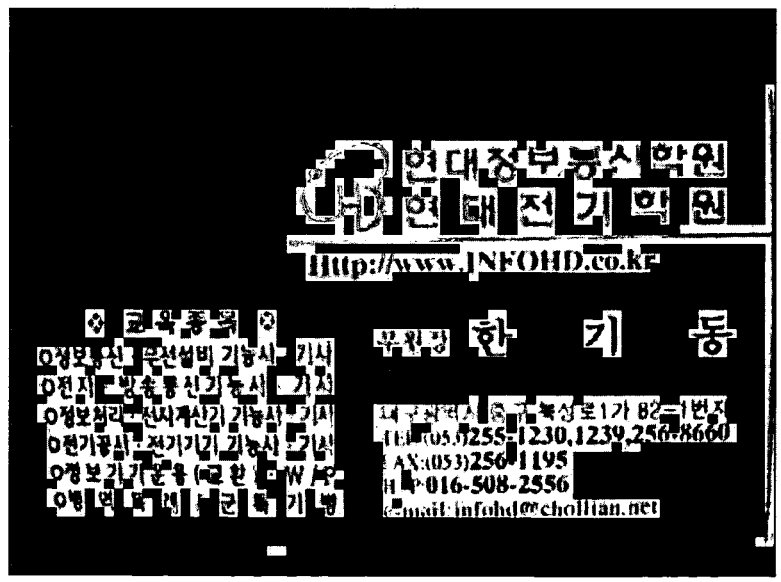

Referring to FIG. 37, in step 711, the input part 10 receives an input image shown in FIG. 38A. It is assumed herein that the image consists of 640 (columns)×480 (rows) pixels. In step 713, the block classification part 610 divides the input image of FIG. 38A received from the input part 10 into blocks, analyzes pixels of the divided blocks, and classifies the divided blocks into character blocks and background blocks according to the result of the analysis. Here, each of the blocks has a size of 8×8 pixels, and then are classified into character blocks and background blocks shown in FIG. 38B through a block classification process. In FIG. 38B, gray portions represent regions classified as character blocks, while black portions represent regions classified as background blocks.

Figure 38C:
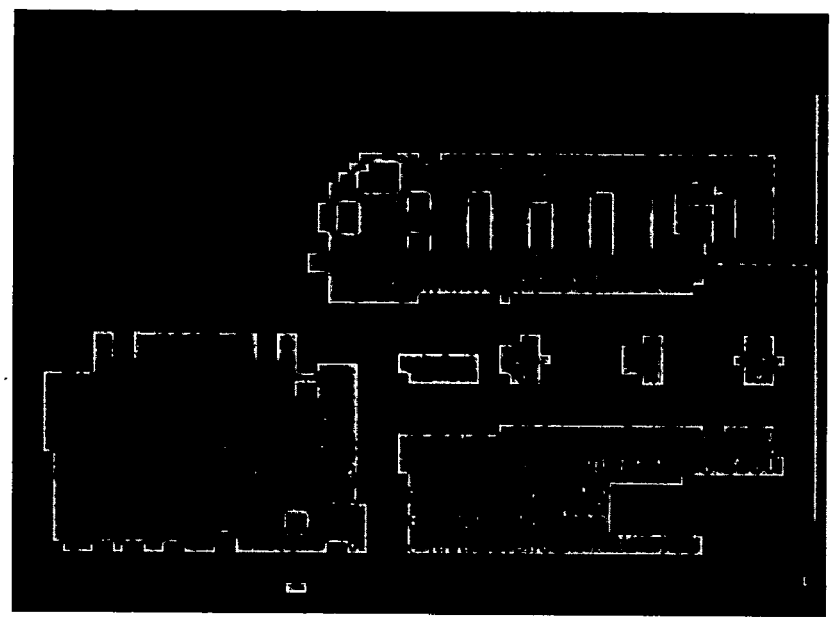
Figure 38D:

In step 715, the block growing part 640 extends the character blocks classified by the block classification part 610 as shown in FIG. 38C. In the block classification process, a block containing character pixels can be incorrectly classified as a background block due to the influence of a background between character pixels. The block growing part 640 grows the character blocks in order to extend pixels in a character block erroneously classified as a background block. Thereafter, in step 717, the block growing part 640 sequentially outputs the grown character blocks of FIG. 38C to the block grouping part 650. At this time, the image output to the block grouping part 650 corresponds to the character blocks shown in FIG. 38D. In step 719, the block grouping part 650 receives the character blocks of FIG. 38D output from the block growing part 640, and groups each of the character blocks with its 8 adjacent blocks, generating the grouped blocks of FIG. 38E.

Figure 38E:
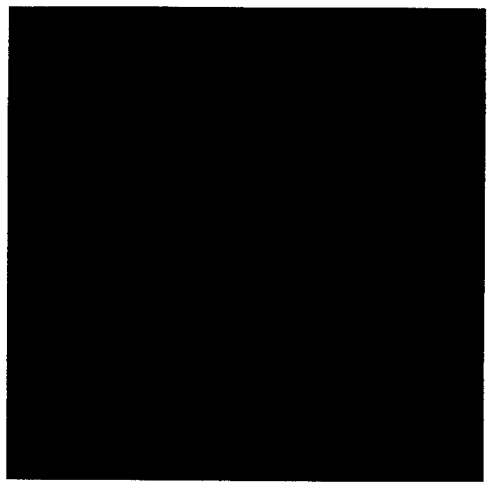

The grouped blocks of FIG. 38E are input to the edge enhancement part 620. Here, the edge enhancement part 620 is comprised of the quadratic filter. In step 721, the quadratic filter calculates the first threshold value Th1 for classifying each pixel of the character block as a character or background pixel. The first threshold value Th1 can be calculated using Equation (19). In step 723, the mean computation part 623 classifies pixels of the character block into character and background pixels on the basis of the first threshold value Th1, and calculates mean brightness values for the character and background pixels for the character block, in accordance with Equation (20) and Equation (21). In step 725, the normalization part 625 normalizes the pixels of a character block x(m,n) using the mean brightness value $\mu_0$ for the character pixels and the mean brightness value $\mu_1$ for the background pixels so that the character pixels have values close to a '1' while the background pixels have values close to '0'. The normalization part 625 normalizes the pixels of the character block x(m,n) in accordance with Equation (22).

Figure 38F:
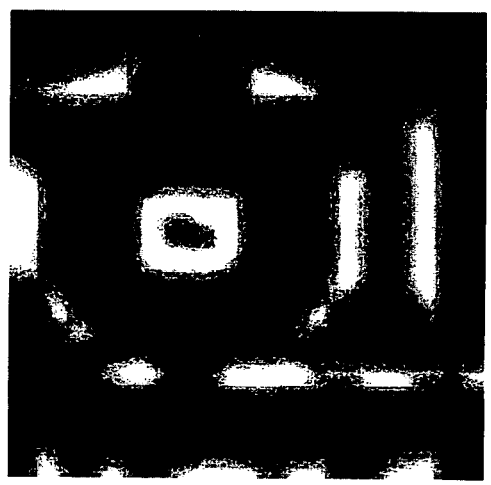

In step 727, the quadratic operation part 627 performs quadratic filtering on the normalized character block $x_N(m,n)$ to enhance edges of the character block and reduce their noise components. The quadratic operation part 627 performs a calculation of Equation (23). In step 729, the denormalization part 629 denormalizes the quadratic-processed character block $y_N(m,n)$ and generates an output block y(m,n). The denormalization part 629 converts pixels of the character block normalized by the normalization part 625 in the range of a brightness value before normalization in accordance with Equation (24). An image output from the denormalization part 629 is shown in FIG. 38F. In step 731, the second threshold calculation part 671 generates a second threshold Th2 for binarizing pixels of the character block in the denormalized image into character pixels and background pixels. The second threshold Th2 becomes the pixel threshold BTH for binarization.

Figure 38G:
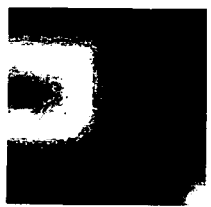
Figure 38H:
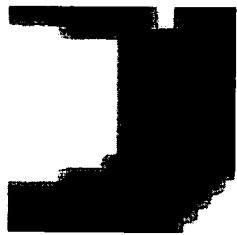

In step 733, the block splitting part 660 receives the edge-enhanced grouped block of FIG. 38F output from the quadratic filter, and separates the character block of FIG. 38G from the grouped block. That is, the block splitting part 660 performs a function of separating only a character block located at the center of the grouped block from the grouped block. In step 735, the binarization part 630 compares pixels of the separated character block of FIG. 38G with the threshold BTH, and binarizes the pixels into character and background pixels having the first and second brightness values as shown in FIG. 38H. Pixels of the background block output from the block classification part 610 or the block growing part 640 are binarized into the second brightness value.

Figure 38I:
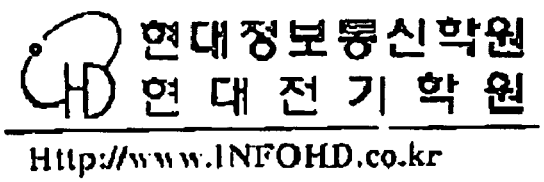

Through repetition of the above operation, the character blocks and the background blocks are binarized, and if it is determined in step 737 that the binarization is completed for all blocks of the image, the binarization part 630 outputs a binarized image of FIG. 38I in step 739.

Figure 39:
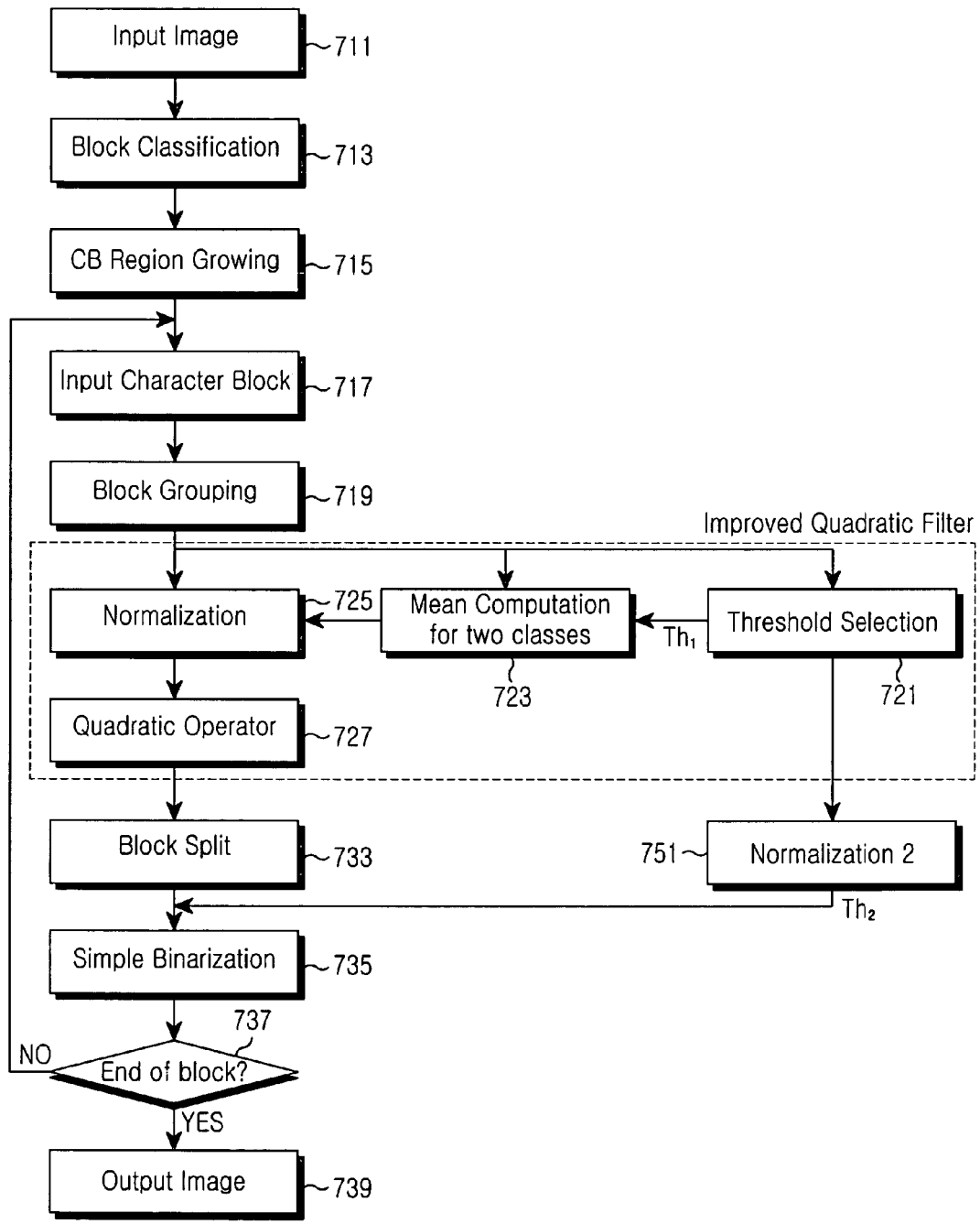
FIG. 39 is a flowchart illustrating a procedure for binarizing an image by the image binarization part using an improved quadratic filter according to an embodiment of the present invention.

FIG. 39 is a flowchart illustrating an example of a binarization method where the edge enhancement part 620 is implemented using the improved quadratic filter according to an embodiment of the present invention. FIGS. 40A through 40G are diagrams illustrating images generated when the binarization is performed in the procedure of FIG. 39. In addition, the flowchart of FIG. 39 uses some of the same steps shown in FIG. 37.

Figure 40A:
FIGS. 40A through 40G are diagrams illustrating images generated in each process of performing the binarization procedure of FIG. 39.
Figure 40B:
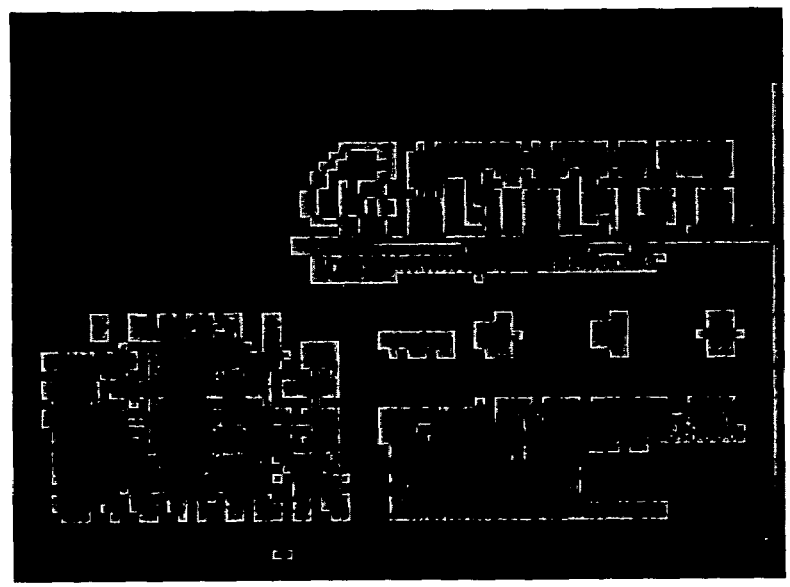

Referring to FIG. 39, in step 711, the input part 10 receives an input image shown in FIG. 40A. It is assumed herein that the image consists of 640 (columns)×480 (rows) pixels. In step 713, the block classification part 610 divides the input image of FIG. 40A received from the input part 10 into blocks, analyzes pixels of the divided blocks, and classifies the divided blocks into character blocks and background blocks according to the analysis result. Here, each of the blocks consists of 8×8 pixels. The input image of FIG. 40A is classified into character blocks and background blocks shown in FIG. 40B. In FIG. 40B, gray portions represent regions classified as character blocks, while black portions represent regions classified as background blocks.

Figure 40C:
Figure 40D:

In step 715, the block growing part 640 extends the character blocks classified by the block classification part 610 as shown in FIG. 40C. In the block classification process, a block containing character pixels can be incorrectly classified as a background block due to the influence of a background between character pixels. The block growing part 640 grows the character blocks in order to extend pixels in a character block erroneously classified as a background block. Thereafter, in step 717, the block growing part 640 sequentially outputs grown character blocks of FIG. 40C to the block grouping part 650. At this time, the image output to the block grouping part 650 corresponds to the character blocks shown in FIG. 40D. In step 719, the block grouping part 650 receives the character blocks of FIG. 40D output from the block growing part 640, and groups each of the character blocks with its 8 adjacent blocks, generating the grouped blocks of FIG. 40E.

Figure 40E:

The grouped block image of FIG. 40E is input into the edge enhancement part 620. Here, the edge enhancement part 620 is comprised of the improved quadratic filter. In step 721, the improved quadratic filter calculates the first threshold value Th1 for classifying each pixel of the character block as a character or background pixel. The first threshold value Th1 can be calculated using Equation (19). In step 723, the mean computation part 623 classifies pixels of the character block into character and background pixels on the basis of the first threshold value Th1, and calculates mean brightness values for the character and background pixels for the character block, in accordance with Equation (20) and Equation (21). In step 725, the normalization part 625 normalizes the pixels of the character block x(m,n) using the mean brightness value $\mu_0$ for the character pixels and the mean brightness value $\mu_1$ for the background pixels so that the character pixels have values close to a '1' while the background pixels have values close to '0'. The normalization part 625 normalizes the pixels of the character block x(m,n) in accordance with Equation (22).

In step 727, the quadratic operation part 627 performs improved quadratic filtering on the normalized character block $x_N(m,n)$ to enhance edges of the character block and reduce their noise components. The quadratic operation part 627 performs the calculation of Equation (23). In step 751, the threshold normalization part 681 normalizes the first threshold Th1 using a method equal to the normalization method of the normalization part 625. The threshold normalization part 681 normalizes the first threshold Th1 in accordance with Equation (25) to generate the second threshold Th2 (or the pixel threshold $BTH_N$).

Figure 40F:

In step 733, the block splitting part 660 receives the grouped block that underwent improved quadratic filtering, and separates the character block from the grouped block. That is, the block splitting part 660 performs a function of separating only a character block located at the center of the grouped block from the grouped block. In step 735, the binarization part 630 compares pixels of the character block separated by the block splitting part 660 with the pixel threshold $BTH_N$, and binarizes the pixels into character and background pixels having the first and second brightness values as shown in FIG. 40F. Pixels of the background block output from the block classification part 610 or the block growing part 640 are binarized into the second brightness value.

Figure 40G:

Through repetition of the above operation, the character blocks and the background blocks are binarized, and if it is determined in step 737 that the binarization is completed for all blocks of the image, the binarization part 630 outputs a binarized image of FIG. 40G in step 739.

If an input image is preprocessed by the preprocessing device according to the first to seventh embodiments of the present invention before character recognition, recognition performance of characters included in the image can be improved. A result of an experiment for recognizing characters using the preprocessing device according to an embodiment of the present invention will now be described. In the experiment, Nexicam, a digital camera for HP IPAQ pocket PC, manufactured by Nevicom Co. was used for the input art 10, and FineReader 5.0 office trial version manufactured by ABBYY Co., which mainly recognizes English language, and GN2000 test version manufactured by HIART corporation, which recognizes Korean and English characters, were used for the character recognition part 50.

A comparison of a recognition rate will be made between a character recognition method with the preprocessing device and a character recognition method without the preprocessing device. The recognition rate is defined as $$\text{Recognition Rate} = \frac{\text{\# of recognized characters}}{\text{total \# of characters}} \qquad (27)$$

In the experiment, a skewed image, a normal image, and an ill-conditioned image were used. Here, the ill-conditioned image can be a shadowed image, an irregularly illuminated image, or a slightly blurred image.

Experiment #1

Figure 41A:
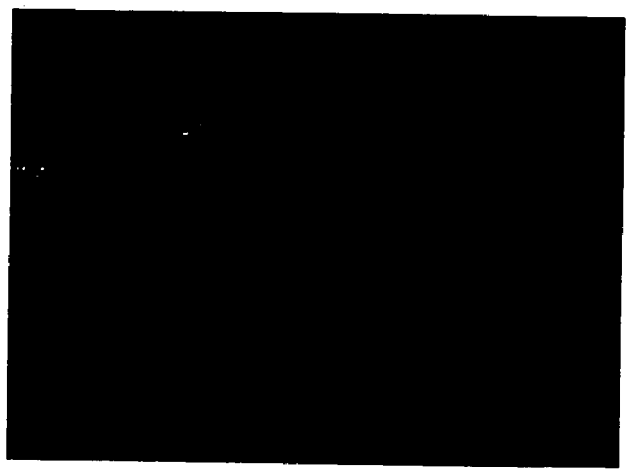
FIGS. 41A and 41B are diagrams illustrating a process of recognizing characters in an image with a skewed object according to an embodiment of the present invention.
Figures 41B, 42A:
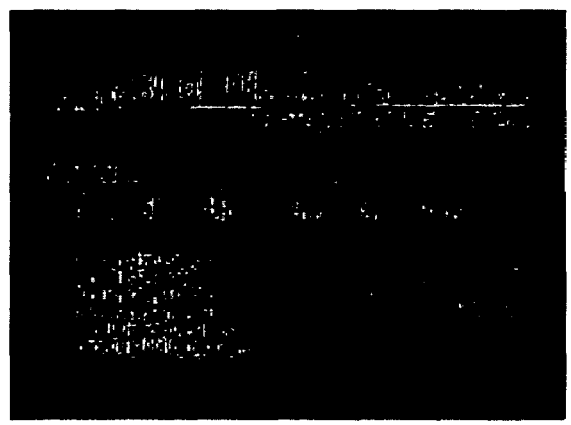
FIGS. 42A through 42C are diagrams illustrating a process of recognizing characters in an image after ROC extension and without ROC extension according to an embodiment of the present invention.

In a first experiment, characters in a skewed image were recognized. FIG. 41A illustrates an input image skewed by about 15°, and FIG. 41B illustrates an image of characters recognized after a skew of an object of the skewed imaged is corrected by the preprocessing device. Here, FineReader was used as the character recognition part 50, and the image for experiment was obtained by photographing a skewed English business card. When the image of FIG. 41A where an object is skewed was subject to character recognition after skew correction, a recognition rate of the character recognition part 50 became 96%. However, when the skewed image was subject to character recognition without skew correction, a recognition rate of the character recognition part 50 became 0%.

Experiment #2

Figure 42B:
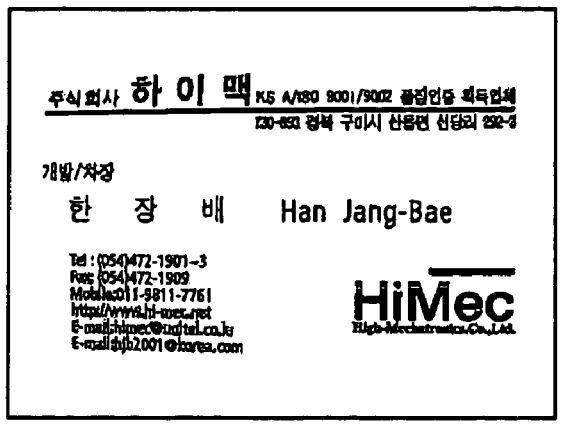
Figure 42C:
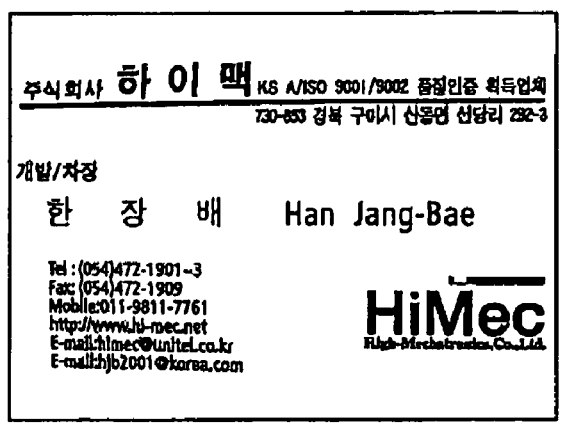

In a second experiment, a region of characters (ROC) in the image was extended prior to character recognition. FIG. 42A illustrates an input image, FIG. 42B illustrates an image of characters recognized without ROC extension, and FIG. 42C illustrates an image of characters recognized after the character region (ROC) is extended by the preprocessing device. Here, GN2000 was used as the character recognition part 50. When the image of FIG. 42A was subject to character recognition after ROC extension, a recognition rate became 55% as shown in FIG. 42C, whereas when the image was subject to character recognition without ROC extension, a recognition rate became 38% as shown in FIG. 42B. Table 1 below shows a comparison of experimental results between a character recognition method after ROC extension and a character recognition method without ROC extension.

TABLE 1

|  | without ROC extension | with ROC extension | software |
|---|---|---|---|
| Image 1 | 89% (126/141) | 92% (130/141) | FineReader |
| Image 2 | 75% (103/136) | 85% (116/136) |  |
| Image 3 | 97% (162/166) | 96% (160/166) |  |
| Image 4 | 38% (68/177) | 55% (98/177) | GN2000 |
| Image 5 | 52% (58/112) | 78% (87/112) |  |

Experiment #3

Figure 43A:
Figure 43B:
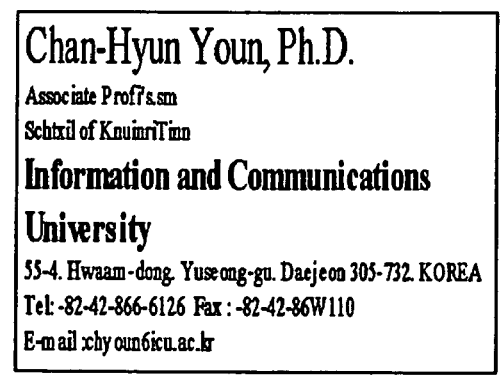
Figures 43C, 44A:

In a third experiment, characters in a normal image were recognized. FIG. 43A illustrates an input image, FIG. 43B illustrates an image of characters recognized from the input image of FIG. 43A without preprocessing, and FIG. 43C illustrates an image of characters recognized after preprocessing. Here, FineReader was used as the character recognition part 50. When the image of FIG. 43A was subject to character recognition after being preprocessed by the preprocessor according to an embodiment of the present invention, a recognition rate became 93% as shown in FIG. 43C, whereas when the image was subject to character recognition without preprocessing, a recognition rate became 82% as shown in FIG. 43B. Table 2 shows a comparison of recognition results on the normal image input from FineReader between a character recognition method after preprocessing and a character recognition method without preprocessing.

TABLE 2

|  | Without preprocessing | With preprocessing |
|---|---|---|
| Image 1 | 86% (291/337) | 92% (321/337) |
| Image 2 | 68% (130/189) | 85% (167/189) |
| Image 3 | 82% (145/176) | 96% (165/176) |
| Image 4 | 77% (126/163) | 55% (154/163) |
| Image 5 | 87% (177/202) | 78% (186/202) |

Experiment #4

In a fourth experiment, characters in an ill-conditioned image were recognized. FIG. 44A illustrates an input image, FIG. 44B illustrates an image of characters recognized from the input image of FIG. 44A without preprocessing, and FIG. 44C illustrates an image of characters recognized after preprocessing. Here, FineReader was used as the character recognition part 50. When the image of FIG. 44A was subject to character recognition after being preprocessed by the preprocessor according to an embodiment of the present invention, a recognition rate became 83% as shown in FIG. 44C, whereas when the image was subject to character recognition without preprocessing, a recognition rate became 63% as shown in FIG. 44B. Table 3 below shows a comparison of recognition results on the ill-conditioned image input from FineReader between a character recognition method after preprocessing and a character recognition method without preprocessing, and Table 4 below shows a comparison of recognition results on the ill-conditioned image input from GN2000 between a character recognition method after preprocessing and a character recognition method without preprocessing.

TABLE 3

|  | Without preprocessing | With preprocessing |
|---|---|---|
| Image 1 | 38% (43/112) | 90% (101/112) |
| Image 2 | 36% (88/238) | 54% (130/238) |
| Image 3 | 63% (152/238) | 83% (199/238) |
| Image 4 | 26% (60/229) | 68% (157/229) |
| Image 5 | 31% (59/189) | 61% (116/189) |

TABLE 4

|  | Without preprocessing | With preprocessing |
|---|---|---|
| Image 1 | 45% (63/137) | 59% (82/137) |
| Image 2 | 51% (69/135) | 61% (83/135) |
| Image 3 | 14% (12/84) | 86% (73/84) |
| Image 4 | 21% (28/129) | 42% (55/129) |
| Image 5 | 45% (37/81) | 70% (57/81) |

First, according to an embodiment of the present invention, whether an input image is blurred is determined in a preprocessing process prior to characters in the image are recognized, thereby improving character recognition reliability. In addition, decision on blurring of an input image is performed only on the character blocks, contributing to simplification of a blurring decision process.

Second, in a preprocessing process for recognizing image characters, a skew of an object of an input image is calculated to determine a skew angle corresponding to the skew, and then the image is rotated by a skew correction part to correct a skew of the object, thereby improving character recognition performance. In addition, pixels at the edges of the image occurring due to the rotation of the image are corrected in order to correct an image caused by the rotation.

Third, in a preprocessing process for recognizing image characters, a position of a character region in an input image is searched, an image of the searched character region is extracted, and the image of the extracted character region is extended to a size of the input image to recognize characters only in the character region, thereby improving character recognition performance. In addition, the image is classified into character regions and background regions, and the regions incorrectly classified as character regions are removed to improve search performance for the character regions.

Fourth, in a preprocessing process for recognizing image characters, an input image is divided into blocks, the divided blocks are classified into character blocks and background blocks, only the character blocks are binarized into character pixels and background pixels after being quadratic-processed, and pixels of the background blocks are collectively binarized into background pixels. Therefore, binarization reliability can be improved even for the shadowed image or the irregularly illuminated image. In addition, a character block incorrectly classified as a background block in a block classification process is grown to improve reliability of block classification. Further, in a binarization process, a character block is grouped with its 8 neighboring blocks prior to being quadratic-processed, and then the character block is separated from the grouped block prior to binarization, thereby improving binarization reliability on the character block.

As described above, the new preprocessing device can perform various preprocessing operations prior to character recognition on an image, contributing to an increase in character recognition rate.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A device for recognizing characters in an image, comprising:
    an input part for receiving the image;
    a blurring decision part for classifying the received image into character blocks and background blocks, calculating an average energy ratio of the character blocks, and comparing the average energy ratio with a predetermined threshold to determine whether the received image is blurred;
    an object skew correction part for classifying, if the received image is not blurred, stripes having or exceeding a predetermined length in the received image, calculating direction angles of the classified stripes to measure a skew of an object, determining a skew angle corresponding to the measured skew, and rotating the image by the determined skew angle to correct the skew of the object in the image;
    an image binarization part for classifying the skew-corrected image into character blocks and background blocks, comparing pixels in the character blocks with a pixel threshold, binarizing the pixels in the character blocks into a brightness value for a character pixel and a brightness value for a background pixel based on the comparison, and binarizing pixels in the background blocks into the brightness value for a background pixel; and
    a character recognition part for recognizing characters in the binarized image.

2. The device of claim 1, wherein the blurring decision part comprises:
    a block classification part for dividing the received image into the blocks, and classifying the divided blocks into character blocks and background blocks;
    an average character block energy calculation part for calculating an average energy ratio of the character blocks classified by the block classification part; and
    a blurring detection part for comparing the average energy ratio with a predetermined threshold, and determining whether the image is blurred based on the comparison.

3. The device of claim 2, wherein the block classification part comprises:
    a block division part for dividing the received image into blocks having a predetermined size;
    a Discrete Cosine Transform (DCT) conversion part for DCT-converting the blocks output from the block division part;
    an energy calculation part for calculating a sum of absolute values of dominant DCT coefficients in each of the DCT-converted blocks, and outputting the calculated sum as an energy value of a corresponding block;
    a block threshold calculation part for summing energy values of the blocks output from the energy calculation part, calculating an average by dividing the summed energy value by the total number of the blocks, and outputting the calculated average as a block threshold; and
    a block decision part for sequentially receiving the energy values of the blocks output from the energy calculation part, comparing the received energy values of the blocks with the threshold, and classifying the blocks as character blocks or background blocks based on the comparison.

4. The device of claim 3, wherein the average character block energy calculation part comprises:
    an energy ratio calculation part for calculating an energy ratio of DCT coefficients in each of the character blocks; and
    an average energy ratio calculation part for calculating an average energy ratio of the character blocks by averaging the energy ratios of the character blocks.

5. The device of claim 1, wherein the image binarization part comprises:
    a block classification part for dividing the image into blocks, and classifying the divided blocks into character blocks and background blocks;
    an edge enhancement part for enhancing edges of the character blocks classified by the block classification part using a relationship between neighboring pixels in the character blocks, and generating a pixel threshold for distinguishing between character pixels and background pixels in the character blocks; and
    a binarization part for comparing pixels in the character blocks output from the edge enhancement part with the threshold, binarizing the pixels into a first brightness value for a character pixel and a second brightness value for a background pixel based on the comparison, and binarizing pixels in the background blocks output from the block classification part into the second brightness value.

6. The device of claim 5, wherein the edge enhancement part comprises:
    a first threshold calculation part for calculating a first threshold for classifying pixels in the character block into character pixels and background pixels;
    a mean computation part for classifying pixels in the character block into character pixels and background pixels on the basis of the first threshold, and calculating mean brightness values for the character pixels and the background pixels in the character block;
    a normalization part for normalizing the pixels in the character block using a mean brightness value for a character pixel and a mean brightness value for a background pixel output from the mean computation part so that the character pixels have a value close to '1' and the background pixels have a value close to '0';
    a quadratic operation part for performing a quadratic operation on the normalized character block to enhance edges of the character block and reduce noises of the character block;
    a denormalization part for denormalizing an image of the quadratic-processed character block, and outputting the denormalized character block to the binarization part; and
    a second threshold calculation part for calculating a second threshold for classifying pixels in the denormalized character block into character pixels and background pixels, and outputting the second threshold as a threshold for the binarization part.

7. The device of claim 5, wherein the block classification part comprises:
    a block division part for dividing the received image into blocks having a predetermined size;
    a DCT conversion part for DCT-converting the blocks output from the block division part;
    an energy calculation part for calculating a sum of absolute values of dominant DCT coefficients in each of the DCT-converted blocks, and outputting the calculated sum as an energy value of a corresponding block;

a block threshold calculation part for summing energy values of the blocks output from the energy calculation part, calculating an average by dividing the summed energy value by the total number of the blocks, and outputting the calculated average as a block threshold; and a block decision part for sequentially receiving the energy values of the blocks output from the energy calculation part, comparing the received energy values of the blocks with the threshold, and determining the blocks as character blocks or background blocks based on the comparison.

8. The device of claim 5, wherein the edge enhancement part comprises:

a first threshold calculation part for calculating a first threshold for classifying pixels in the character block into character pixels and background pixels;

a mean computation part for classifying pixels in the character block into character pixels and background pixels on the basis of the first threshold, and calculating mean brightness values for character pixels and background pixels in the character block;

a normalization part for normalizing the pixels in the character block using a mean brightness value for a character pixel and a mean brightness value for the background pixel output from the mean computation part so that the character pixels have a value close to '1' and the background pixels have a value close to '0';

a quadratic operation part for performing a quadratic operation on the normalized character block to enhance edges of the character block and reduce noises of the character block; and a second threshold calculation part for normalizing the first threshold to calculate a second threshold for classifying the pixels into character pixels and background pixels, and outputting the second threshold as a threshold for the binarization part.

9. The device of claim 1, wherein the image binarization part comprises:

a block classification part for dividing the image into the blocks, and classifying the divided blocks into character blocks and background blocks;

a block growing part for growing the character blocks to restore a block including character pixels, incorrectly classified as a background block, to a character block;

an edge enhancement part for enhancing edges of the character block output from the block growing part using a relationship between neighboring pixels in the character block, and generating a threshold for distinguishing between character pixels and background pixels in the character block; and a binarization part for comparing pixels in the character blocks output from the edge enhancement part with the threshold, binarizing the pixels into a first brightness value for a character pixel and a second brightness value for a background pixel according to the comparison result, and binarizing pixels in the background pixels output from the block growing part into the second brightness value.

10. The device of claim 9, wherein the block growing part comprises:

a dilation part for dilating a character block and converting a block containing character pixels, incorrectly classified as a background block, to a character block; and a closing part for eroding the dilated character block to separate connected blocks.

11. The device of claim 1, wherein the image binarization part comprises:

a block classification part for dividing the image into the blocks, and classifying the divided blocks into character blocks and background blocks;

a block grouping part for grouping each of the character blocks classified by block classification part with neighboring blocks thereof to generate a grouped block;

an edge enhancement part for enhancing edges of the grouped block using a relationship between neighboring pixels in the grouped block, and generating a threshold for distinguishing between character pixels and background pixels in the character block;

a block splitting part for separating the character block from the grouped block output from the edge enhancement part; and a binarization part for comparing pixels in the separated character block with the threshold, binarizing the pixels into a first brightness value for a character pixel and a second brightness value for a background pixel based on the comparison, and binarizing pixels in the background pixels output from the block classification part into the second brightness value.

12. The device of claim 1, wherein the image binarization part comprises:

a block classification part for dividing the image into the blocks, and classifying the divided blocks into character blocks and background blocks;

a block growing part for growing the character blocks to restore a block including character pixels, incorrectly classified as a background block, to a character block;

a block grouping part for grouping a character block output from the block growing part with neighboring blocks thereof to generate a grouped block;

an edge enhancement part for enhancing edges of the grouped block using a relationship between neighboring pixels in the grouped block, and generating a threshold for distinguishing between character pixels and background pixels in the character block;

a block splitting part for separating the character block from the grouped block output from the edge enhancement part; and a binarization part for comparing pixels in the separated character block with the threshold, binarizing the pixels into a first brightness value for a character pixel and a second brightness value for a background pixel based on the comparison, and binarizing pixels in the background pixels output from the block growing part into the second brightness value.

13. The device of claim 1, further comprising a noise reduction part for reducing noises of the received image and outputting the noise-reduced image to the image binarization part.

14. The device of claim 13, wherein the noise reduction part comprises a directional Lee filter.

15. The device of claim 1, wherein the object skew correction part comprises:

a binarization part for binarizing pixels in the image into a brightness value for a character pixel and a brightness value for a background pixel;

a candidate stripe generation part for generating candidate stripes by performing dilation on character regions in the binarized image;

a stripe classification part for classifying, as stripes, candidate stripes having an eccentricity and a blob size having or exceeding a predetermined value among the candidate stripes;

a skew angle decision part for calculating direction angles of the classified stripes, and determining a direction angle having the largest count value as a skew angle; and a skew correction part for correcting a skew of the image by rotating the image by the skew angle.

16. The device of claim 15, further comprising an image correction part for filling blank spaces at corners of the image in which a skew of an object is corrected by the skew correction part, with pixels close to the blank space in a horizontal direction.

17. The device of claim 15, wherein the binarization part comprises:
   a block classification part for dividing the image into blocks having a predetermined size, calculating pixel energies of the divided blocks, and classifying the blocks into character blocks and background blocks according to the calculated pixel energies;
   a pixel threshold calculation part for calculating a pixel threshold using Otsu's method that calculates a brightness value having the maximum between-class variance between character pixels and background pixels in the character blocks output from the block classification part; and
   a binarization part for comparing pixels in the character blocks output from the block classification part with the pixel threshold, binarizing the pixels into a brightness value for a character pixel and a brightness value for a background pixel based on the comparison, and binarizing pixels in the background blocks into the brightness value for a background pixel.

18. The device of claim 17, further comprising a block grouping part, interconnected between the block classification part and the pixel threshold calculation part, for grouping the character block classified by block classification part with neighboring blocks thereof to generate a grouped block, and outputting the grouped block to the pixel threshold calculation part.

19. The device of claim 15, wherein the candidate stripe generation part comprises:
   a dilation part for dilating a region of the binarized character block and generating candidate stripes in which neighboring characters are connected; and
   an erosion part for eroding the candidate stripes so that candidate stripes located up and down the dilated candidate stripes are separated.

20. The device of claim 15, wherein the stripe classification part calculates a length of a candidate stripe through calculation of a blob size and eccentricity based on a moment of the candidate stripe, and classifies the corresponding candidate stripe as a valid stripe when the eccentricity and the blob size are larger than or equal to their predetermined thresholds.

21. The device of claim 15, wherein the skew angle decision part calculates direction angles of the classified stripes, and determines a direction angle having the largest count value as a skew angle.

22. The device of claim 1, wherein the object skew correction part comprises:
   a binarization part for binarizing pixels in the image into a brightness value for a character pixel and a brightness value for a background pixel;
   a horizontal pixel subsampling part for performing horizontal subsampling on the binarized image at a predetermined subsampling rate;
   a candidate stripe generation part for generating candidate stripes by dilating character blocks in the binarized image;
   a vertical pixel subsampling part for performing vertical subsampling on an image having the candidate stripes at a predetermined subsampling rate;
   a stripe classification part for classifying, as stripes, candidate stripes having an eccentricity and a blob size having or exceeding a predetermined value among the vertical-subsampled candidate stripes;
   a skew angle decision part for calculating direction angles of the classified stripes, accumulating count values of the direction angles, and determining a direction angle having the largest count value as a skew angle; and
   a skew correction part for correcting a skew of an object in the image by rotating the image by the skew angle.

23. The device of claim 22, further comprising an image correction part for filling blank spaces at corners of the image in which a skew of an object is corrected by the skew correction part, with pixels close to the blank space in a horizontal direction.

24. The device of claim 1, further comprising a Region Of Contents (ROC) extension part for classifying the image in which a skew of an object is corrected into character blocks and background blocks, extracting a character region by searching for a position of the character blocks in the image, and extending an image of the extracted character region to a size of the received image; and
   when the device comprises the Region of Contents (ROC) extension part, the image binarization part classifies the ROC-extended image into character blocks and background blocks, compares pixels in the character blocks with a pixel threshold, binarizes the pixels into a brightness value for a character pixel and a brightness value for a background pixel based on the comparison result, and binarized pixels in the background blocks into the brightness value for a background pixel.

25. The device of claim 24, wherein the ROC extension part comprises:
   a block classification part for classifying the image into character blocks and background blocks, and converting the character blocks into pixels having a first brightness value and the background blocks into pixels having a second brightness value;
   a position search part for searching for left, right, top and bottom positions of a character region by horizontally and vertically scanning the block-classified image, and determining a position of the character region according to the search result;
   an ROC extraction part for extracting an image in the determined position of the character region from the received image; and
   an image extension part for extending the extracted image of the character region to a size of the received image.

26. The device of claim 25, wherein the block classification part comprises:
   a block division part for dividing the received image into blocks having a predetermined size;
   a Discrete Cosine Transform (DCT) conversion part for DCT-converting the blocks output from the block division part;
   an energy calculation part for calculating a sum of absolute values of dominant DCT coefficients in each of the DCT-converted blocks, and outputting the calculated sum as an energy value of a corresponding block;
   a block threshold calculation part for summing energy values of the blocks output from the energy calculation part, calculating an average by dividing the summed energy value by the total number of the blocks, and outputting the calculated average as a block threshold; and a block decision part for sequentially receiving the energy values of the blocks output from the energy calculation part, comparing the received energy values of the blocks with the threshold, and classifying the blocks as character blocks or background blocks based on the comparison.

27. The device of claim 25, wherein the position search part searches a position of a character region by horizontally and vertically scanning the block-classified image, and determines a position of the character region based on the search result so that the character region has an aspect ratio of the received image.

28. The device of claim 25, wherein the image extension part extends an image of the extracted character region by bilinear interpolation.

29. The device of claim 28, wherein the median filter determines isolated character blocks as incorrectly classified character blocks.

30. The device of claim 24, wherein the ROC extension part comprises:

a block classification part for classifying the image into character blocks and background blocks, and converting the character blocks into pixels having a first brightness value and the background blocks into pixels having a second brightness value;

a median filter for median-filtering an image output from the block classification part to remove blocks incorrectly classified as character blocks;

a position search part for searching for left, right, top and bottom positions of a character region by horizontally and vertically scanning the median-filtered image, and determining a position of the character region based on the search result;

an ROC extraction part for extracting an image in the determined position of the character region from the received image; and an image extension part for extending an image of the extracted character region to a size of the received image.

31. The device of claim 24, wherein the ROC extension part comprises:

a mean filter for mean-filtering the received image to blur the received image;

a block classification part for classifying the mean-filtered image into character blocks and background blocks, and converting the character blocks into pixels having a first brightness value and the background blocks into pixels having a second brightness value;

a median filter for median-filtering an image output from the block classification part to remove blocks incorrectly classified as character blocks;

a position search part for searching for left, right, top and bottom positions of a character region by horizontally and vertically scanning the median-filtered image, and determining a position of the character region according to the search result;

an ROC extraction part for extracting an image in the determined position of the character region from the received image; and an image extension part for extending an image of the extracted character region to a size of the received image.

32. The device of claim 24, wherein the ROC extension part comprises:

a mean filter for mean-filtering the received image to blur the received image;

a block classification part for classifying the mean-filtered image into character blocks and background blocks, and converting the character blocks into pixels having a first brightness value and the background blocks into pixels having a second brightness value;

a subsampling part for subsampling pixels in the image output from the block classification part to reduce the number of the pixels;

a median filter for median-filtering the subsampled image to remove blocks incorrectly classified as character blocks;

an interpolation part for interpolating pixels in the median-filtered image to extend the median-filtered image to a size of the received image;

a position search part for searching for left, right, top and bottom positions of a character region by horizontally and vertically scanning the block-classified image, and determining a position of the character region according to the search result;

an ROC extraction part for extracting an image in the determined position of the character region from the received image; and an image extension part for extending an image of the extracted character region to a size of the received image.

33. A method for recognizing characters in an image, comprising the steps of:

receiving the image;

classifying the received image into character blocks and background blocks, calculating an average energy ratio of the character blocks, and comparing the average energy ratio with a predetermined threshold to determine whether the received image is blurred;

an object skew correction part for classifying, if the received image is not blurred, stripes having or exceeding a predetermined length in the received image, calculating direction angles of the classified stripes to measure a skew of an object, determining a skew angle corresponding to the measured skew, and rotating the image by the determined skew angle to correct the skew of the object in the image;

classifying the skew-corrected image into character blocks and background blocks, comparing pixels in the character blocks with a pixel threshold, binarizing the pixels in the character blocks into a brightness value for a character pixel and a brightness value for a background pixel based on the comparison, and binarizing pixels in the background blocks into the brightness value for a background pixel; and recognizing characters in the binarized image.

34. The method of claim 33, further comprising a nose reduction part for reducing noises of the received image and outputting the noise-reduced image to the image binarization part.

35. The method of claim 33, further comprising the steps of:

classifying the skew-corrected image into character blocks and background blocks, extracting a character region by searching for a position of the character blocks in the image, and extending an image of the extracted character region to a size of the received image; and when extending an image of the extracted character region to a size of the received image, classifying a Region Of Contents (ROC)-extended image into character blocks and background blocks, comparing pixels in the character blocks with a pixel threshold, binarizing the pixels into a brightness value for a character pixel and a brightness value for a background pixel based on the comparison, and binarizing pixels in the background blocks into the brightness value for a background pixel.

36. The method of claim 35, further comprising the step of reducing noises of the ROC-extended image and then proceeding to the image binarization step.

* * * * *